(12) United States Patent
Chung

(10) Patent No.: US 8,480,987 B2
(45) Date of Patent: Jul. 9, 2013

(54) METHOD OF PREPARING NANOPARTICLES OF LITHIUM TRANSITION METAL PHOSPHATES, LITHIUM TRANSITION METAL PHOSPHATES, AND METHOD OF PREPARING THE SAME

(76) Inventor: Sung Yoon Chung, Incheon (KR)

( * ) Notice: Subject to any disclaimer, the term of this patent is extended or adjusted under 35 U.S.C. 154(b) by 628 days.

(21) Appl. No.: 12/633,836

(22) Filed: Dec. 9, 2009

(65) Prior Publication Data

US 2010/0086461 A1 Apr. 8, 2010

Related U.S. Application Data

(63) Continuation-in-part of application No. 12/593,291, filed as application No. PCT/KR2007/006977 on Dec. 28, 2007.

(30) Foreign Application Priority Data

Apr. 20, 2007 (KR) .................. 10-2007-0038984
Dec. 16, 2008 (KR) .................. 10-2008-0128019

(51) Int. Cl.
*C01B 25/30* (2006.01)

(52) U.S. Cl.
USPC ....................... 423/306; 429/231.1

(58) Field of Classification Search
USPC ............... 423/306; 429/218.1, 221, 223, 224, 429/231.1
See application file for complete search history.

(56) References Cited

U.S. PATENT DOCUMENTS

| 5,322,559 A | 6/1994 | Sleight |
| 6,794,084 B2 | 9/2004 | Adamson et al. |

(Continued)

FOREIGN PATENT DOCUMENTS

| CN | 1785800 A | 6/2006 |
| CN | 101049922 A | 10/2007 |

(Continued)

OTHER PUBLICATIONS

L.M. Hirsch et al., "Quantitative olivine-defect chemical model: insights on electrical conduction, diffusion, and the role of Fe content", Geophys. J. Int,. vol. 114, p. 21-35 (1993).

(Continued)

*Primary Examiner* — Wayne Langel
*Assistant Examiner* — Syed Iqbal
(74) *Attorney, Agent, or Firm* — Renaissance IP Law Group LLP

(57) ABSTRACT

Provided are lithium transition metal phosphates where the cation anti-site defects between lithium and transition metals in a lithium transition metal phosphate with a cation well-ordered olivine structure are arranged only in a 1D crystal direction, and a method of preparing the same. The method comprises adding any one selected from the group consisting of an alkali element and an element that has a valence of $5^+$ or any combination thereof to a solid salt comprising lithium, transition metals, and phosphorus as a starting material to produce a first intermediate material; subjecting the first intermediate to a first heat treatment at a temperature of approximately 250° C. to approximately 400° C. to produce a second amorphous material; and cooling the second intermediate material to room temperature, followed by a second heat treatment at a temperature of approximately 400° C. to approximately 800° C. to produce a final material in which the cation-distribution defect is locally clustered and the distribution has a 1D-oriented arrangement parallel to any one axis direction in the crystal.

16 Claims, 29 Drawing Sheets

U.S. PATENT DOCUMENTS

| | | |
|---|---|---|
| 7,998,618 B2 | 8/2011 | Nuspl |
| 2004/0005265 A1* | 1/2004 | Chiang et al. .............. 423/306 |
| 2011/0212365 A1 | 9/2011 | Audemer et al. |

FOREIGN PATENT DOCUMENTS

| | | |
|---|---|---|
| KR | 10-2001-0080496 | 8/2001 |
| KR | 10-2004-0011498 | 2/2004 |
| KR | 10-2006-0054709 | 5/2006 |
| KR | 10-2006-0101508 | 9/2006 |
| KR | 100821832 B1 | 4/2008 |
| WO | 2008/145034 A1 | 12/2008 |

OTHER PUBLICATIONS

C.M.B.Henderson et al., "High Temperature Study of Octahedral Cation exchange in Olivine by Neutron Powder Diffraction", Science, vol. 271, p. 1713-1715 (1996).

C.M.B. Henderson et al., "High Temperature Study of Octahedral Cation exchange in Olivine by Neutron Powder Diffraction", Science, vol. 271, p. 1713-1715 (1996).

A.K. Padhi et al., "Phospho-olivines as Positives-Electrode Materials for Rechargeable Lithium Batteries", J. Electrochem. Soc., vol. 144, No. 4, p. 1188-1194 (1997).

H. Huang et al., "Approaching Theoretical Capacity of LeFiPO4 at Room Temperature at High Rates", Electrochem. Solid-State Lett., vol. 4, p. A170-A172 (2001).

J.-M. Tarascon el al., "Issues and challenges facing rechargeable lithium batteries", Nature, vol. 414, p. 359-367 (2001).

F. Croce et al., "A Novel Concept for the Synthesis of an Improved LiFePO4 Lithium Battery Cathode", Electrochem. Solid-State Lett., vol. 5, p. A47-A50 (2002).

Sung-Yoon et al., "Microscale Measurements of the Electrical Conductivity of Doped LiFePO4", Electrochem. and Solid-State Lett. 6, p. A278-A281 (2003).

D. Morgan et al., "Li Conductivity in LixMPO4 (M=Mn, Fe, Co, Ni) Olivine Materials", Electrochem. Solid-State Lett., vol. 7, p. A30-A32 (2004).

M.S. Islam et al., "Atomic-Scale Investigation of Defects, Dopants, and Lithium Transport in the LiFePO4 Olivine-Type Battery Materials", Chem. Mater, vol. 17, p. 5085-5092 (2005).

M. Varela et al., "Materials Characterization in the Aberration-Corrected Scanning Transmission Electron Microscope", Korea Advanced Institute of Science and Technology, p. 539-569 and c-1-c-12 (2006).

Y.-H. Huang et al., "Improving Lithium Batteries by Tethering Carbon-Coated LiFePO4 to Polypyrole", J. Electrochem. Soc., vol. 153, p. A2282-A2286 (2006).

Shin-Ichi Nishimura et al., "Experimental Visualization of Lithium diffusion of LixFePO4", Nature Materials, vol. 7, p. 707-711 (2008).

D.B. Williams et al., "Transmission Electron Microscopy, A Textbook for Materials Science (Part 3. Imaging)", Plenum Press, p. 351-360, (1996).

G.-A. Nazzri et al., "Lithium Batteries", Kluwer Academic Publisher, p. 3-11, (2004).

Sung-Yoon Chung et al., "Orientation-Dependent Arrangement of Antisite Defects in Lithium Iron(II) Phosphate Crystals", Angew. Chem. Int. Ed., p. 543-546 (2009).

Office action issued May 24, 2012 corresponding to U.S. Appl. No. 12/593,291.

* cited by examiner c : 4% K added LiFe$_{0.98}$PO$_4$, 350C, 2 h
b : 4% Na added LiFe$_{0.98}$PO$_4$, 350C, 2 h
a : undoped LiFePO$_4$, 350C, 2 h 4% Na added LiFe$_{0.98}$PO$_4$, 350C, 2 h 4% K added LiFePO$_4$, 350C, 5 h a : 4 mol% Na added LiFe$_{0.98}$PO$_4$, 450C, 3 h b : 4 mol% K added LiFe$_{0.98}$PO$_4$, 450C, 3 h 4 mol% Na added LiFe$_{0.98}$PO$_4$, 450C, 3 h 4 mol% K added LiFePO$_4$, 450C, 3 h 2% Er added –LiFePO4 (500C, 10h)

2% Ce added –LiFePO4 (500C, 10h)

2% Er added –LiFePO4 (500C, 10h)

4% K added LiFePO$_4$

4% K added Li$_{0.85}$FePO$_4$

4% K added Li$_{0.70}$FePO$_4$

4% K added Li$_{0.50}$FePO$_4$ 350C, 5 h

4% K added LiFePO$_4$
4% K added Li$_{0.85}$FePO$_4$
4% K added Li$_{0.70}$FePO$_4$
4% K added Li$_{0.50}$FePO$_4$ 450C, 3 h (Li0.95Na0.05)MnPO4, 450C, 2h (Li0.95Na0.05)FePO4, 450C, 2h (Li0.95Na0.05)CoPO4, 450C, 1h Li(Co$_{0.96}$Na$_{0.04}$)PO$_4$, 700C, 20 h

Ordered Olivine Structure

- Li
- M (M = Fe, Mn, Co, Ni, Cu)
- O

[010] projection

[010] projection a)

5 Å

[001] projection b)

● Li
● Fe
● P

5 Å

US 8,480,987 B2

METHOD OF PREPARING NANOPARTICLES OF LITHIUM TRANSITION METAL PHOSPHATES, LITHIUM TRANSITION METAL PHOSPHATES, AND METHOD OF PREPARING THE SAME

CROSS-REFERENCE TO RELATED APPLICATION

This application is a continuation-in-part application of U.S. patent application Ser. No. 12/593,291, filed on Sep. 27, 2009, which is a U.S. national phase application of PCT International Application PCT/KR2007/006977, filed Dec. 28, 2007, which claims priority to Korean Patent Application No. 10-2007-0038984, filed Apr. 20, 2007, the contents of which are incorporated herein by reference in their entirety. This application also claims priority under 35 USC 119 to Korean Patent Application No. 10-2008-0128019 filed on Dec. 16, 2008, the contents of which are incorporated herein by reference in their entirety.

BACKGROUND

The present invention relates to synthesis and process conditions for lithium transition metal phosphate having an olivine structure, which is receiving a great deal of attention as a next-generation cathode material for a lithium ion secondary battery, e.g. $LiMPO_4$ (M=Fe, Mn, Co, Ni, Ti, Cu, or any combination thereof, and hereinafter M is referred to as this.), and applications thereof. More specifically, the present invention relates to a process for preparing a nanoparticle powder of lithium transition metal phosphate, involving synthesis of lithium transition metal phosphate ($LiMPO_4$) (M=Fe, Mn, Co, Ni, Ti, Cu or any combination thereof) into a nanoparticle powder having a particle size of less than 100 nm to thereby significantly reduce a diffusion distance of lithium ions within particles, which consequently results in full exploitation of a capacity of an electrode material corresponding up to a theoretical capacity thereof and formation of nano-particles having a high electrical conductivity within a short period of time, and which is also capable of achieving efficient industrial-scale production of a desired compound via a heat treatment at a low temperature of less than 600° C. for a short period of time of less than 4 hours while overcoming a shortcoming of a low electrical conductivity, using solid raw materials.

The present invention also relates to a lithium transition metal phosphate with cation exchange defects or cation anti-site defects between lithium and transition metal, which are arranged only in the 1D crystal orientation in the lithium transition metal phosphate ($LiMPO_4$) having an olivine structure in which cations are orderly arranged, and a method of preparing the same.

Most of the oxides having an olivine structure represented by a formula of M'M" ($XO_4$) (M' and M" are each a metal cation including a transition metal, and X is any one selected from the group consisting of P, S, As, Mo, Si, and B) have high melting points and thermally and chemically very stable properties. Therefore, they have been widely used as insulators and refractories requiring excellent thermochemical stability.

Olivine is originally a mineral name of $MgFeSiO_4$, and many oxides having the same crystal structure as this are generally referred to as an olivine-type oxide. Referring to crystallographical properties of olivine-type oxides, an M' ion is positioned in oxygen octahedral interstitials sharing edges and an M" ion is positioned in oxygen octahedral interstitials sharing corners.

That is, as shown in FIG. 21, M' and M" cations are positioned in different kinds of oxygen octahedra, and sites in each oxygen octahedron are called "M1 site" and "M2 site". An X atom is relatively small such that it is positioned in tetrahedral sites of carbons. In addition, it forms a polyanion framework of [$XO_4$] as a whole because there are more components of covalent bonding than in M' and M" cations. Due to these crystallographic factors, most of the olivine-type oxides are thermally and chemically very stable.

In various oxides of olivine structure, cations are generally positione in the M1 and M2 sites and mixed with each other rather than being orderly arranged. However, there are many cases where the degrees of the two kinds of cations being orderly arranged in each of M1 and M2 sites significantly change as the temperature and pressure change (See C. M. B. Henderson et al., Science, vol. 271, 1713-1715 (1996)).

Therefore, because various physical properties such as electrical conductivity, diffusivity of each ion, plastic deformation of a crystal, etc. can significantly change according to how these two different kinds of cations are distributed in each oxygen octahedron, much research has been conducted on anti-site defects and cation partitioning in oxides of olivine structure (See L. M. Hirsch and T. J. Shankland, Geophys. J. Int., vol. 114, 21-35 (1993)).

Among lithium transition metal phosphates ($LiMPO_4$) having the olivine-structure, $LiFePO_4$ and $Li(Fe,Mn)PO_4$ are natural minerals well known as Triphylite. Lithium is positioned in an oxygen octahedral interstitial of the M1 site in $LiMPO_4$, slightly different from other oxides having an olivine structure, and transition metal (M) is positioned in an oxygen octahedral interstitial of the M2 site, showing characteristics of a very ordered olivine structure has. That is, as shown in FIG. 21, the oxygen octahedra including the transition metal (M) are linked in the form of a 1D-chain in $LiMPO_4$, and it is expected that because lithium ion in another oxygen octahedron is sharing edges and orderly arranged in a 1D fashion in the y-axis direction, e.g., b-axis direction, the migration of the lithium ion would be very fast in the y-axis direction (See D. Morgan et al., Electrochem. Solid-State Lett., Vol. 7, p.A30 (2004)).

Further, recent high temperature neutron diffraction experiments and experimental results using a maximum entropy method show that lithium ion moves in a linear fashion in the b-axis direction inside the lattices (See S.-I. Nishimura et al., Nature Mater. Vol. 7, p. 707 (2008)).

Therefore, the use of a lithium transition metal phosphates (LiMPO4) having an olivine structure as a cathode material for the lithium ion battery can permit intercalation or deintercalation of fast lithium ions at room temperature, exhibiting excellent electrochemical performances. However, upon intercalation or deintercalation of lithium ions, an anti-site defect such as the position of transition metal (M) in the M1 site where lithium should be positioned would interfere with the migration of lithium ions in the b-axis direction, and these defects should be controlled for maximal inhibition. In addition, when the anti-site defect is thermodynamically inevitable, a locally 1-D arrangement need to be constructed in order to maximally inhibit those defects which are 3-dimensionally randomly arranged.

SUMMARY

The present disclosure provides a process for preparing a nanoparticle powder of lithium transition metal phosphate, which involves synthesis of LiMPO$_4$ (M=Fe, Mn, Co, Ni, Ti, Cu or any combination thereof) into a nanoparticle powder having a particle size of less than 100 nm to thereby significantly reduce a diffusion distance of lithium ions within particles, which consequently results in full exploitation of a capacity of an electrode material corresponding up to a theoretical capacity thereof.

The present disclosure also provides a process for preparing a nanoparticle powder of lithium transition metal phosphate, which is capable of forming nanoparticles having a high electrical conductivity within a short period of time, by addition of alkali elements having a relatively large ion radius, such as potassium (K) and sodium (Na), and lanthanide elements such as lanthanum (La), cerium (Ce), praseodymium (Pr), neodymium (Nd), samarium (Sm), gadolinium (Gd) and erbium (Er), to a basic composition of conventional solid-state synthesis involving a first heat treatment of materials at a temperature of less than 400° C. to decompose carbon (C), hydrogen (H), oxygen (O) and ammonium (NH$_4$) contained in starting materials such as carbonates, oxalates, and ammonium phosphates, and a second heat treatment of the first heat-treated materials at a temperature of more than 400° C. to achieve crystallization thereof.

The present disclosure also provides a process for preparing a nanoparticle powder of lithium transition metal phosphate, which is capable of achieving efficient industrial-scale production of a nanoparticle powder of fine lithium transition metal phosphate (LiMPO$_4$) having a particle size of several tens of nanometers via a heat treatment at a low temperature of less than 600° C. for a short period of time of less than 4 hours while overcoming a shortcoming of a low electrical conductivity, using solid-sate raw materials.

The present disclosure also provides a process for preparing a nanoparticle powder of lithium transition metal phosphate which has a high energy density and high-rate charge/discharge performance capable of achieving rapid charge within a short period of time of several minutes, and is therefore capable of exhibiting discharge performance of a high power density. Various processes have been proposed for preparing single-component metal nanoparticles consisting of a single composition or nanoparticles of a binary intermetallic compound or an oxide thereof, so it is possible to easily prepare such nanoparticles. However, it is very difficult and complicated to synthesize nanoparticles for a material which consists of four different elements and is also required to have an ordered arrangement of each element in the crystal structure, as shown in the LiMPO$_4$. Therefore, it is technically important to propose a method for preparing LiMPO$_4$ which involves a simplified manufacturing process and is capable of easily achieving large-scale synthesis.

In addition, the present disclosure also provides lithium transition metal phosphates, in which the anti-site defect distribution between Li ion in the M1 site and the transitional metal ion in the M2 site is controlled at the atomic level, and a process for preparing the same.

The present disclosure provides a method including: preparing a nanoparticle powder of lithium transition metal phosphate, using lithium-, transition metal- and phosphorus-containing salts as starting materials, with addition of any one element or any combination selected from the group consisting of sodium (Na), potassium (K), lanthanum (La), cerium (Ce), praseodymium (Pr), neodymium (Nd), samarium (Sm), gadolinium (Gd) and erbium (Er) in an amount of less than 10 at % to thereby inhibit unintentional crystal growth in a first heat treatment; subjecting the reactants to the first heat treatment at a temperature of 250° C. to 400° C. for 2 to 10 hours; and subjecting the thus-treated reactants to a second heat treatment at a temperature of 400° C. to 700° C. for 2 to 24 hours to uniformly form crystalline nuclei so as to induce homogeneous growth of nanocrystalline particles.

The starting materials may be selected from the group consisting of carbonates, oxalates, acetates, and ammonium phosphates.

The carbonate may include lithium carbonate (Li$_2$CO$_3$), the oxalate includes MC$_2$O$_4$(2H$_2$O) (M=Fe, Mn, Co, Ni, Ti, Cu or any combination thereof), and the ammonium phosphate includes ammonium dihydrogen phosphate (NH$_4$H$_2$PO$_4$).

An additive for Na may include sodium carbonate (Na$_2$CO$_3$), an additive for K includes potassium carbonate (K$_2$CO$_3$), and an additive for the lanthanide element includes A$_2$(C$_2$O$_4$)$_3$(nH$_2$O) (A=La, Ce, Pr, Nd, Sm, Gd, or Er, and 1=n=9) as a salt material, containing carbon.

The additive for the lanthanide element may be at least one selected from the group consisting of Ce$_2$(C$_2$O$_4$)$_3$(9H$_2$O), Nd$_2$(C$_2$O$_4$)$_3$(5H$_2$O), Gd$_2$(C$_2$O$_4$)$_3$(5H$_2$O), Er$_2$(C$_2$O$_4$)$_3$(5H$_2$O) and any combination thereof.

In accordance with still another exemplary embodiment, the additive element is added to make an initial stoichiometric composition of (Li$_{1-x}$A$_x$)(M$_{1-y}$B$_y$)PO4 or (LiA$_x$)(MB$_y$)PO$_4$ (A or B=Na, K, La, Ce, Pr, Nd, Sm, Gd, or Er, 0<x<0.1, 0<y<0.1, and M=Me, Mn, Co, Ni, Ti, Cu, or any combination thereof).

In accordance with yet still another exemplary embodiment, the mixed powder is preferably obtained by suction-mixing the starting materials and additives in acetone as a solvent and drying the mixture.

In accordance with a further exemplary embodiment, the first heat treatment and the second heat treatment are preferably carried out under a gas atmosphere of any one selected from argon (Ar), nitrogen (N2), and carbon monoxide/carbon dioxide (CO/CO$_2$) at a flow rate of 100 to 500 cc/min.

The first heat treatment may be preferably carried out at 350° C. for 5 hours or less.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, the process of the present invention according to the aforesaid constitution will be described in more detail.

Figure 1:
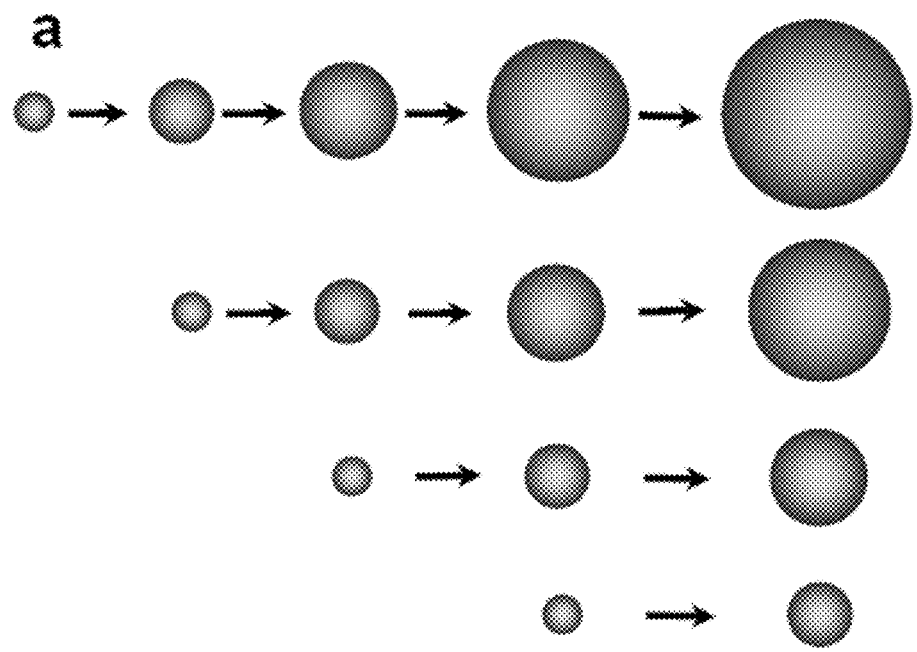
FIG. 1 is a schematic comparison of concepts necessary for preparation of nanoparticles having a uniform particle size in the present invention.
Figure 1:
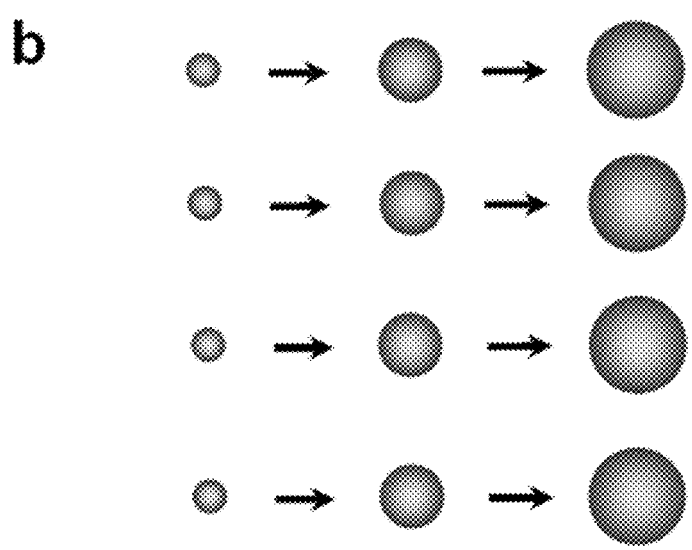

FIG. 1 schematically shows a concept which controls nucleation and subsequent growth of nanocrystals during crystallization to obtain a fine particle size and is also capable of narrowing distribution of the final particle size. An effort should be made to minimize inhomogeneous formation of crystalline nuclei which may occur during the heat treatment throughout the entire synthesis process, as shown in FIG. 1*a*. For this purpose, the initial heat treatment should be controlled to achieve uniform formation of nuclei, such that it is possible to obtain final particles with fine size and uniform distribution, as shown in FIG. 1*b*.

In order to ensure uniform formation of nuclei upon the initial heat treatment as above, alkali metal ions or lanthanide metal ions are added. First, various salts such as carbonates, oxalates, acetates, ammonium phosphates, which contain lithium, transition metals and phosphorus, are used as starting materials, and any one element selected from the group consisting of Na, K, La, Ce, Pr, Nd, Sm, Gd, and Er, or any combination thereof is added in an amount of less than 10 mol % to thereby make an initial stoichiometric composition of $(Li_{1-x}A_x)(M_{1-y}B_y)PO4$ or $(LiA_x)(MB_y)PO4$ (A or B=Na, K, La, Ce, Pr, Nd, Sm, Gd, or Er, 0<x<0.1, 0<y<0.1, and M=Fe, Mn, Co, Ni, Ti, Cu, or any combination thereof).

Next, these raw material powders in conjunction with the additive powders are subjected to mixing in acetone as a solvent, followed by drying. The resulting mixture of the raw material powders is then subjected to first calcination at a temperature between 250° C. and 400° C. for 2 to 10 hours. The calcination heat treatment is carried out under a gas atmosphere of Ar, $N_2$, or $CO/CO_2$ at a flow rate of 100 to 500 cc/min. Such a first heat treatment leads to decomposition of C, H, O, and $NH_3$ contained in the raw material powders, thereby resulting in formation of an amorphous $LiMPO_4$. If the heat treatment is carried out at a temperature of more than 400° C. for 10 hours or more, this results in gradual formation of crystalline nuclei from the amorphous material, finally leading to the formation of non-uniformly coarsened particles. Therefore, in order to suppress the inhomogeneous nucleation, the first heat treatment may be preferably carried out at 350° C. for 5 hours or less.

Next, the thus-obtained amorphous powder is cooled to room temperature and then subjected to a second heat treatment at a temperature of 400° C. to 700° C. for 2 to 24 hours under the same gas atmosphere. The second heat treatment results in formation of crystalline nuclei from an amorphous phase, finally leading to growth of nanoscale particles from the thus-formed crystalline nuclei. Therefore, it is possible to prepare nanoparticles of the $LiMPO_4$ (M=Fe, Mn, Co, Ni, Ti, Cu, or any combination thereof) having a desired particle size by appropriately controlling the temperature and time of the second heat treatment.

Generally, a melting point of the salts containing an alkali metal ion, such as $Na_2CO_3$ and $K_2CO_3$, is usually very low. Therefore, these additives bring about an effective reaction of lithium-, transition metal- and phosphorus-containing salts even at a relatively low temperature of 250° C. to 400° C. upon the first heat treatment, thereby serving to synthesize an amorphous starting material with efficient inhibition of inhomogeneous crystalline nucleation. Further, since the second heat treatment, which will be carried out at a higher temperature than the first heat treatment, leads to growth of nanoparticles from the uniformly formed crystalline nuclei, it is possible to prepare nanocrystalline particles of the $LiMPO_4$ having a particle size of several tens of nanometers from the amorphous phase, by appropriately controlling the heat treatment temperature and time.

Further, it was discovered through various experiments that alkali metals such as Na and K, as well as lanthanide elements such as La, Ce, Pr, Nd, Sm, Gd and Er exhibit the same effects as described above.

In the present invention, one of the most important points is to control the heat treatment condition to thereby maintain the amorphous phase of the starting materials, such that formation of undesired large and coarse particles does not occur upon the first heat treatment. Additives of the aforementioned alkali metal ions and lanthanide metal ions enable the reaction between the starting materials at a lower temperature upon the first heat treatment, easily resulting in an amorphous state of the mixture of the starting materials, and also serve to effectively inhibit a phase transition into a crystalline phase from an amorphous phase. Further, upon the second heat treatment which is carried out at a relatively higher temperature, such additives serve to help uniform formation of crystalline nuclei from the amorphous phase, finally leading to the growth of ultrafine crystalline particles which have a similar particle size at the nanometer level.

Therefore, the present invention enables final production of fine and uniform nanoparticles of $LiMPO_4$ (M=Fe, Mn, Co, Ni, Ti, Cu, or any combination thereof) by adding the alkali elements and the lanthanide elements in an amount of less than 10 mol % to thereby induce a uniform nucleation rate of crystalline particles.

Even though $LiMPO_4$ (M=Fe, Mn, and Co) is known to be an electrical insulator having an electrical conductivity of $10^{-9}$ to $10^{-12}$ S/cm, as conventionally measured by other research groups, the particles prepared by the method of the present invention exhibit an improved electrical conductivity of at least $10^{-3}$ S/cm. Additives of the alkali elements and the lanthanide elements have an ionic radius much larger than that of lithium ions or transition metal ions (such as $Fe^{2+}$, $Mn^{2+}$, $Co^{2+}$, $Ni^{2+}$, $Ti^{2+}$, and $Cu^{2+}$), so they are not soluble into crystal lattices of $LiMPO_4$ and finally most of them form a secondary phase. For reference, the ionic radius (unit: nm) of each element is as follows: 0.076 for $Li^+$, 0.078 for $Fe^{2+}$, 0.083 for $Mn^{2+}$, 0.075 for $Co^{2+}$, 0.069 for $Ni^{2+}$, 0.086 for $Ti^{2+}$, 0.073 for $Cu^{2+}$, 0.138 for $K^+$, 0.102 for $Na^+$, 0.103 for $La^{3+}$, 0.087 for Ce4+, 0.098 for Nd3+, 0.096 for $Sm^{3+}$, 0.094 for $Gd^{3+}$, and 0.089 for $Er^{3+}$. When the thus-added ions are subjected to the second heat treatment at a temperature of 400° C. or higher, it was confirmed through high-temperature in situ observation under a high-resolution transmission electron micrograph (HRTEM) that they play an important role in growth and coarsening (Ostwald ripening) of crystals which occur relatively rapidly from the crystalline nuclei. During the fast growth of such nuclei that is thermodynamically metastable, lithium ion vacancies are formed inside the crystal lattice, or otherwise residual carbon atoms in the starting materials may migrate into the crystal lattice to thereby replace phosphorus ions. In this case, lithium ion vacancies and carbon atoms are ionized to have an effectively negative charge. Because the overall charge neutrality condition should be always maintained throughout the inside of the crystal lattice, some of transition metal ions will have an atomic value of $3^+$ instead of $2^+$ so as to compensate the resulting negatively charged lithium ion vacancies or replaced carbon atom. Therefore, it is possible to obtain conductivity-enhancing effects by the electron hole transfer between $M^{2+}$ and $M^{3+}$. In particular, if the carbon atoms, which were initially present in the starting materials, become soluble during the heat treatment, the negatively charged impurities that should be compensated increase. As a result, the concentration of the transition metals that have an atomic valence of 3+ instead of 2+ becomes higher. Accordingly, more preferably, when nanoparticles are prepared using carbonates, oxalates, acetates, and ammonium phosphates, which contain carbon atoms, as the starting materials, it is possible to prepare $LiMPO_4$ particles having a superior electrical conductivity.

Further, the present invention enables production of particles with ordered olivine structure where lithium and transition metals are well ordered in the crystal lattices, within a short period of time. As mentioned above, upon theoretical review of the unit lattice of the $LiMPO_4$, lithium is positioned in an oxygen octahedron of the M' site, and the transition metal (M) is positioned in an oxygen octahedron of the M" site, thereby forming an ordered olivine structure. However, as already reported in the mineral olivine of $MgFeSiO_4$, a material with an olivine structure may have random intermixing defects wherein cations of M' and M" sites are disorderly positioned with respect to each other. In particular, a recent study has reported that the formation energy for such random anti-site intermixing defects in LiFePO$_4$ is lower than the formation energy for other ionic vacancies (M. S. Islam, D. J. Driscoll, C. A. J. Fisher, and P. R. Slater, Chem. Mater., Vol. 17, p. 5085 (2005)). Thus, it can be seen that the intermixing anti-site defects are one of the most probable defects that may easily occur upon high-temperature heat treatment in LiMPO$_4$. If transition metal ions are positioned in the M' site where lithium ions are occupied, the presence of transition metal ions on a migration path of lithium ions upon a charge/discharge reaction interferes with migration of lithium ions in the crystal lattice, which consequently decreases a discharge capacity and also inhibits rapid diffusion of lithium ions, thus deteriorating output power properties of the cells. Accordingly, it is very important to prepare the LiMPO$_4$ having a crystallographically ordered cation arrangement.

From the image of the LiMPO$_4$ prepared according to the present invention using high-angle annular dark field (HAADF) scanning transmission electron microscopy (STEM), it was confirmed that the product of the present invention has a highly ordered cation arrangement. In particular, it was also confirmed that even when particles are prepared to have a lithium ion:transition metal ion ratio of 1-x:1 or 1:1-x ($0<x<0.1$) as well as an exact stoichiometry of 1:1 in the initial composition of the product upon synthesis of the LiMPO$_4$, all of LiMPO$_4$ particles are uniformly synthesized into ultrafine nanocrystalline particles. Moreover, it was found that even upon synthesis of nanoparticles starting from the ratio of lithium ion:transition metal ion which is not 1:1, there is no effect of such an ionic ratio between lithium (Li) and transition metal (M) on size control, electrical conductivity and electrochemical properties of final particles. Therefore, since nanoparticles will have a significantly broader range of a non-stoichiometric ratio due to no need for precise control of the cation ratio upon preparation of nanoparticles, it is possible to take a significant advantage associated with the convenience for synthesis of the nanoparticles.

The present invention demonstrates that nanocrystalline LiMPO$_4$ particles having a size of less than 100 nm can be prepared by adding elements of Na, K, La, Ce, Pr, Nd, Sm, Gd and Er in an amount of less than 10 mol % to make an initial stoichiometric composition of $(Li_{1-x}A_x)(M_{1-y}B_y)PO_4$ or $(LiA_x)(MB_y)PO_4$ (A or B=Na, K, La, Ce, Pr, Nd, Sm, Gd, or Er, $0<x<0.1$, $0<y<0.1$, and M=Fe, Mn, Co, Ni, Ti, Cu or any combination thereof), followed by synthesis of particles at a lower temperature for a short period of time, as compared to previous methods.

Then, the thus-prepared crystalline LiMPO$_4$ particles exhibit a significantly enhanced electrical conductivity as compared to those prepared by previous synthesis methods, and a well-ordered arrangement of lithium ions and transition metal ions on the M' and M" sites within the crystal lattices.

Due to these various advantages, when such particles of the present invention are used as a cathode material for electrochemical cells such as lithium-ion secondary batteries, it is possible to obtain a charge/discharge capacity value approximate to a theoretical capacity of 160 mAh/g. Further, particles of the present invention can involve fast migration of lithium ions within the crystal lattices, and therefore can also exhibit excellent electrochemical properties capable of being charged/discharged within several minutes, i.e. a high power density.

Now, preferred embodiments of the present invention will be described in more detail with reference to the following Examples, Analysis Examples and Test Examples in conjunction with the accompanying drawings, such that those skilled in the art can easily practice the present invention. These and other objects, advantages and features of the present invention will become apparent from the detailed embodiments given below which are made in conjunction with the following Examples.

The present invention may be embodied in different forms and should not be misconstrued as being limited to the embodiments set forth herein, and those skilled in the art will appreciate that various modifications, additions and substitutions are possible without departing from the scope and spirit of the invention as disclosed in the accompanying claims. Therefore, it should be understood that the embodiments disclosed herein are provided only for illustrating the present invention and should not be construed as limiting the scope and spirit of the present invention.

As used herein, the term "C rate" means that measurement conditions are controlled upon performing a battery test, such that charge or discharge can be carried out for 1 hour. More generally, the term "C/n rate" means that measurement conditions are established such that charge or discharge can be carried out for n hours.

Example 1

This example is intended to illustrate a process for preparing nanocrystalline particles of LiFePO$_4$ having a starting composition of $(Li_{1-x}A_y)FePO_4$ or $Li(Fe_{1-x}A_y)PO_4$ (A=Na or K, $0<x\leq0.1$, and $0<y\leq0.1$) with addition of an alkali element such as K or Na.

Starting material powders used for preparation of the nanocrystalline particles of LiFePO$_4$ were lithium carbonate (Li$_2$CO$_3$), iron (II) oxalate (FeC$_2$O$_4$(2H$_2$O)), and ammonium dihydrogen phosphate (NH$_4$H$_2$PO$_4$). The powders used as additives were sodium carbonate (Na$_2$CO$_3$) and potassium carbonate (K$_2$CO$_3$). Three starting material powders and additive powders were 99.5% pure or higher.

First, in order to synthesize pure LiFePO$_4$ powder without addition of the additives, a powder of Li$_2$CO$_3$, FeC$_2$O$_4$(2H$_2$O) and NH$_4$H$_2$PO$_4$ in a molar ratio of 0.5:1:1 was prepared. Then, these materials in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Further, in order to synthesize LiFePO$_4$ powder with addition of 4-mol % K or Na, a powder mixture was prepared in the same manner as above. In particular, the mixed powders having different stoichiometric ratios of Li and Fe were prepared and compared to each other.

First, in order to synthesize LiFePO$_4$ powder with addition of 4-mol % K, a mixed powder of Li$_2$CO$_3$, FeC$_2$O$_4$(2H$_2$O) and NH$_4$H$_2$PO$_4$ in a molar ratio of 0.5:1:1 was prepared. Second, in order to synthesize LiFe$_{0.98}$PO$_4$ powder with addition of 4-mol % K, a mixed powder of Li$_2$CO$_3$, FeC$_2$O$_4$(2H$_2$O) and NH$_4$H$_2$PO$_4$ in a molar ratio of 0.5:0.98:1 was prepared. Third, in order to synthesize LiFe$_{0.98}$PO$_4$ powder with addition of 4-mol % Na, a mixed powder of Li$_2$CO$_3$, FeC$_2$O$_4$(2H$_2$O) and NH$_4$H$_2$PO$_4$ in a molar ratio of 0.5:0.98:1 was prepared. Fourth, in order to synthesize Li$_{0.95}$FePO$_4$ powder with addition of 5-mol % Na, a mixed powder of Li$_2$CO$_3$, FeC$_2$O$_4$(2H$_2$O) and NH$_4$H$_2$PO$_4$ in a molar ratio of 0.475:1:1 was prepared.

In order to add 4- to 5-mol % Na or K to the four mixed powders thus prepared, $Na_2CO_3$ and $K_2CO_3$ were used. According to the same procedure as in preparation of a pure $LiFePO_4$ powder, mixing, milling and drying processes were carried out and the powder mixtures were stored in a glove box filled with argon. Then, each powder aggregate of four mixtures thus prepared was ground in the glove box using a mortar and pestle. Thereafter, each of the mixed powders was placed in an alumina crucible and subjected to first calcination at 350° C. for 2 to 5 hours. In order to prevent oxidation of iron ions due to inflow of oxygen, the heat treatment was carried out with introduction of >99.9% pure argon gas at a flow rate of 400 cc/min, thereby obtaining first synthetic powders.

Figure 2:
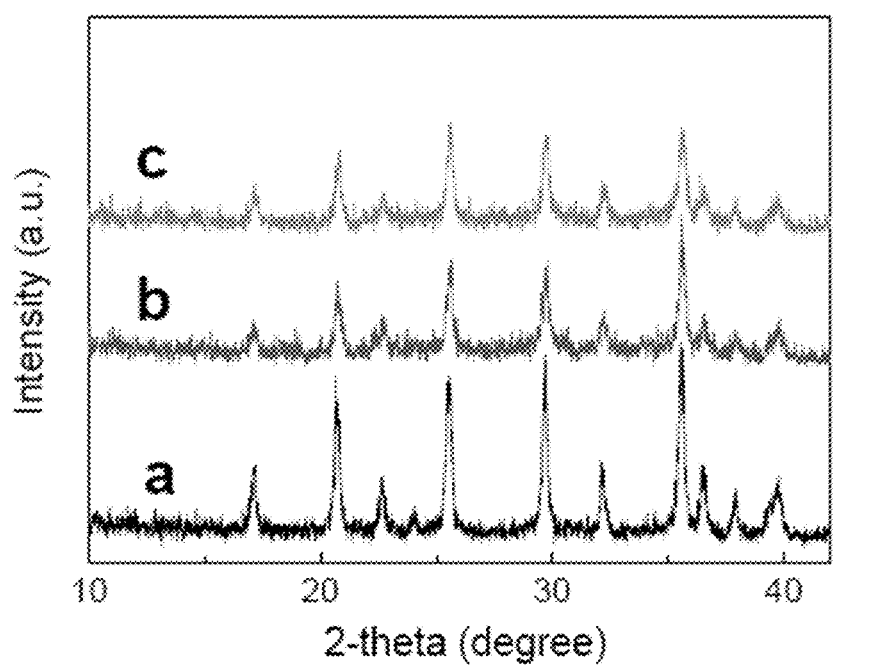
FIG. 2 is a graph showing comparison results of X-ray diffraction patterns for powder samples prepared in Example 1 of the present invention, wherein three samples of LiFePO$_4$ subjected to first calcination at 350° C. are compared therebetween.

FIG. 2 shows the results of X-ray diffraction patterns for synthesized powders. As can be seen in FIG. 2, a pure $LiFePO_4$ powder without addition of Na or K (FIG. 2a) exhibited relatively strong intensity in X-ray diffraction peaks, whereas the powder with addition of Na (FIG. 2b) and K (FIG. 2c) exhibited very weak intensity in diffraction peaks having a significantly broad full width at a half maximum (FWHM). Therefore, it can be found that the pure $LiFePO_4$ powder (Powder a) already underwent considerable crystallization and particle coarsening during the first calcination. On the other hand, based on the X-ray diffraction results, it is predicted that the powders with addition of Na or K (Powders b and c) mostly remain amorphous due to effects of additives and only some of them are present as small nanocrystalline nuclei.

Figure 3:
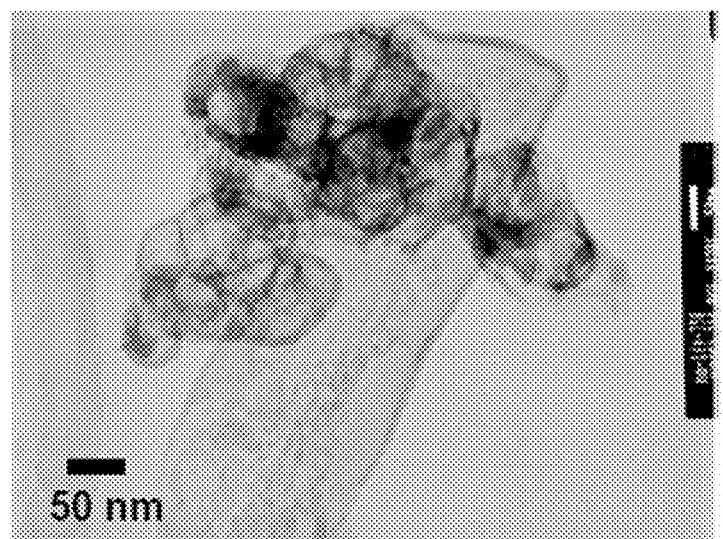
FIG. 3 shows transmission electron micrograph (TEM) images of powder samples after first calcination of LiFePO$_4$ with addition of 4-mol % Na and LiFePO$_4$ with addition of 4-mol % K at 350° C. in Example 1 of the present invention
Figure 3:
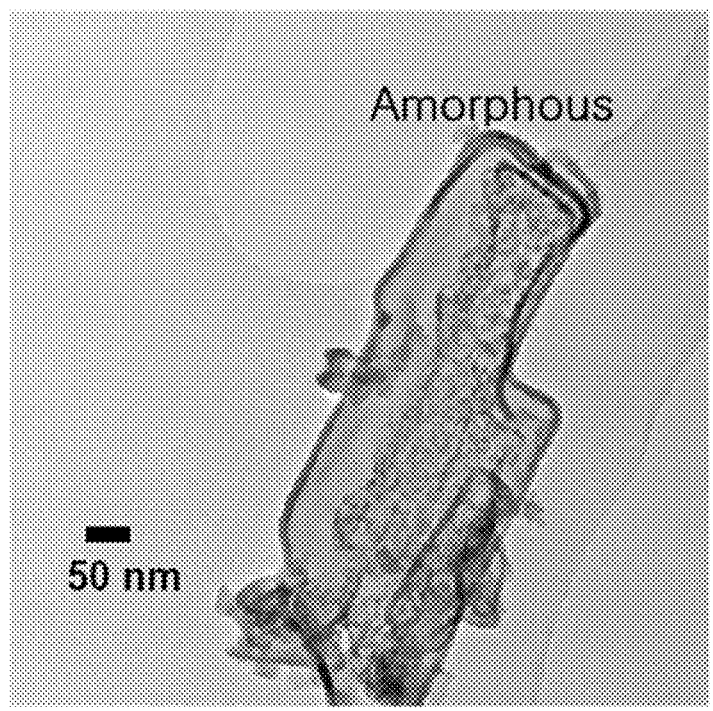

The effect of additives on the crystallization can also be confirmed through direct examination using transmission electron microscopy (TEM). FIG. 3 shows TEM images of powders after first calcination of a $LiFePO_4$ powder with addition of 4-mol % Na and a $LiFePO_4$ powder with addition of 4-mol % K at 350° C. As can be seen in FIG. 3, most of the powders were present as an amorphous phase, although a small amount of nano-clusters were observed during the TEM analysis. Further, it can be seen that these results are consistent with the results of X-ray diffraction, as shown in FIG. 2.

In such a manner, the starting materials were subjected to the first heat treatment at 350° C., and the aggregated materials were ground. In order to achieve more uniform distribution of the additives, this was followed by additional grinding for several minutes using a mortar and pestle.

Then, the thus-prepared powder was subjected to a second heat treatment at 450° C. to 500° C. for 2 to 10 hours with introduction of argon at the same flow rate of 400 cc/min, as in the first calcination. The second heat treatment causes gradual formation of crystalline nuclei for a phase transition from an amorphous phase to a crystalline phase, followed by growth of nanoscale particles from the thus-formed crystalline nuclei. Therefore, in order to inhibit inhomogeneous coarsening of particles while minimizing a residual amount of the amorphous phase, it is preferable to carry out the heat treatment at a temperature below 500° C. for less than 10 hours.

Figure 4:
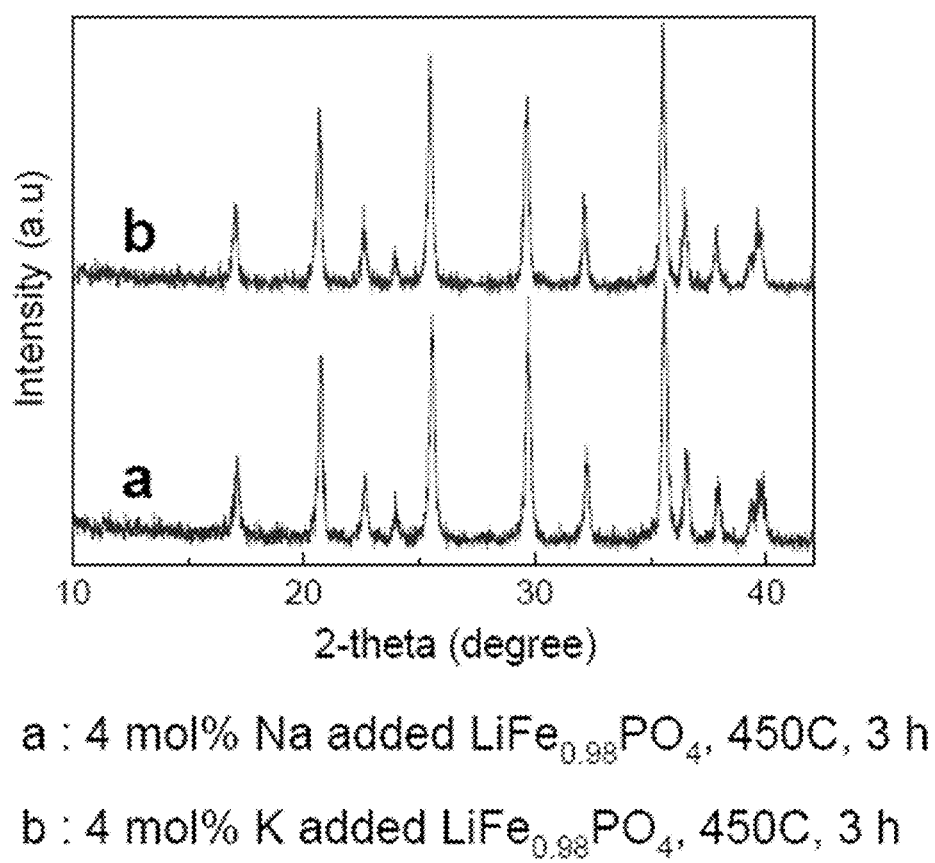
FIG. 4 is a graph showing X-ray diffraction patterns of nanoparticle samples after second calcination of LiFePO$_4$ with addition of 4-mol % Na and LiFePO$_4$ with addition of 4-mol % K at 450° C. in Example 1 of the present invention.

FIG. 4 is a graph showing analysis results of X-ray diffraction patterns for nanoparticle samples after second heat treatment of a $LiFe_{0.98}PO_4$ powder with addition of 4-mol % Na (Powder a) and a $LiFe_{0.98}PO_4$ powder with addition of 4-mol % K (Powder b) at 450° C. for 2 to 3 hours. It can be confirmed that both of Powders a and b were synthesized into $LiFePO_4$ having a single-phase olivine structure without formation of a secondary phase.

Figure 5:
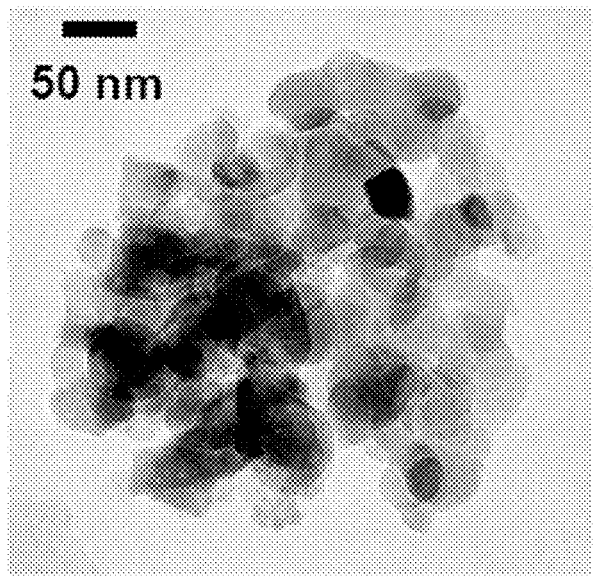
FIG. 5 shows TEM images of powder samples after second calcination of LiFePO$_4$ with addition of 4-mol % Na and LiFePO$_4$ with addition of 4-mol % K at 450° C. for 2 to 3 hours in Example 1 of the present invention.
Figure 5:
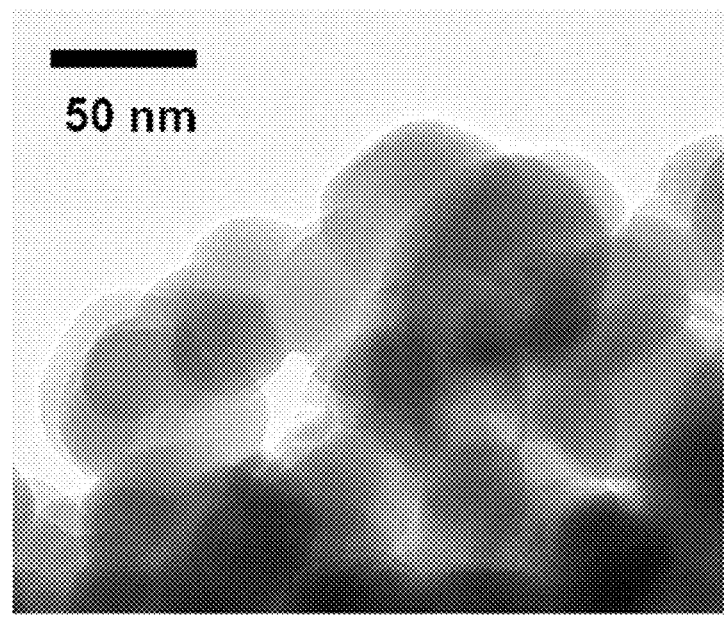

For direct examination of a particle size, FIG. 5 shows a TEM image of particle morphology and size of the $LiFePO_4$ powder. FIG. 5 is a TEM image of powders after second heat treatment of a $LiFePO_4$ powder with addition of 4-mol % Na and a $LiFePO_4$ powder with addition of 4-mol % K at 450° C. for 2 to 3 hours. As can be seen in FIG. 5, it was confirmed that all the powders exhibit a similar size distribution and are composed of nanocrystalline particles having a particle size of less than 50 nm.

Figure 6:
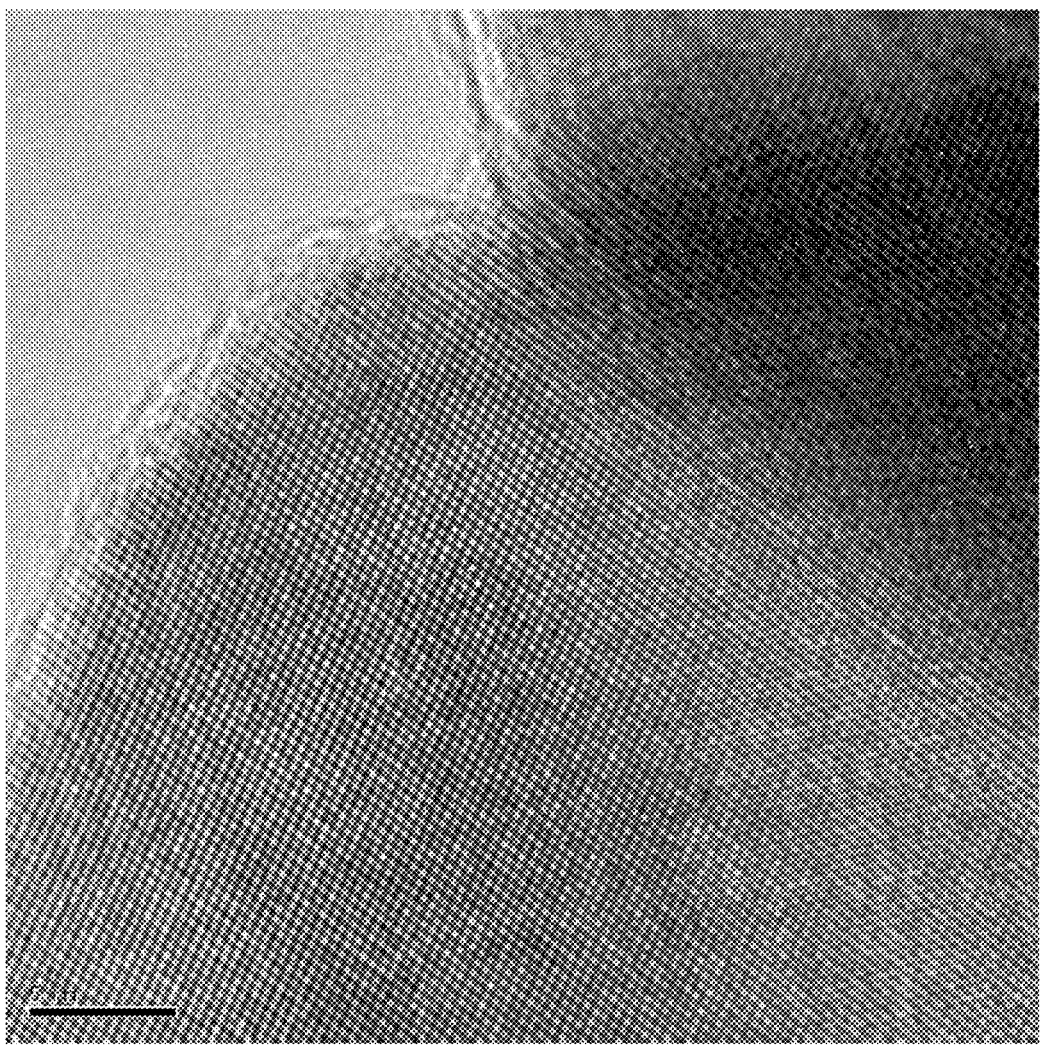
FIG. 6 is a high-resolution TEM (HRTEM) image showing a lattice image of a nanoparticle sample of $LiFePO_4$ with addition of 4-mol % K prepared in Example 1 of the present invention.

In particular, upon examination of the thus-prepared nanoparticles using HRTEM, it is possible to confirm the crystal lattice of an ordered olivine structure having excellent crystallinity at the atomic level. In order to confirm such characteristics, FIG. 6 shows a HRTEM lattice image of a nanoparticle powder sample of $LiFePO_4$ with addition of 4-mol % K.

More importantly, it is possible to prepare nanoparticles having a particle size of less than 100 nm, even without precise adjustment of the Li:Fe ratio to 1:1, upon preparation of nanoparticles from a mixture of starting materials with addition of Na or K, as shown in the present Example 1. Accordingly, there is a significantly broad non-stoichiometric margin in a chemical composition upon a practical manufacturing process, so advantageously it is possible to synthesize $LiFePO_4$ nanoparticles much more easily and conveniently.

Figure 7:
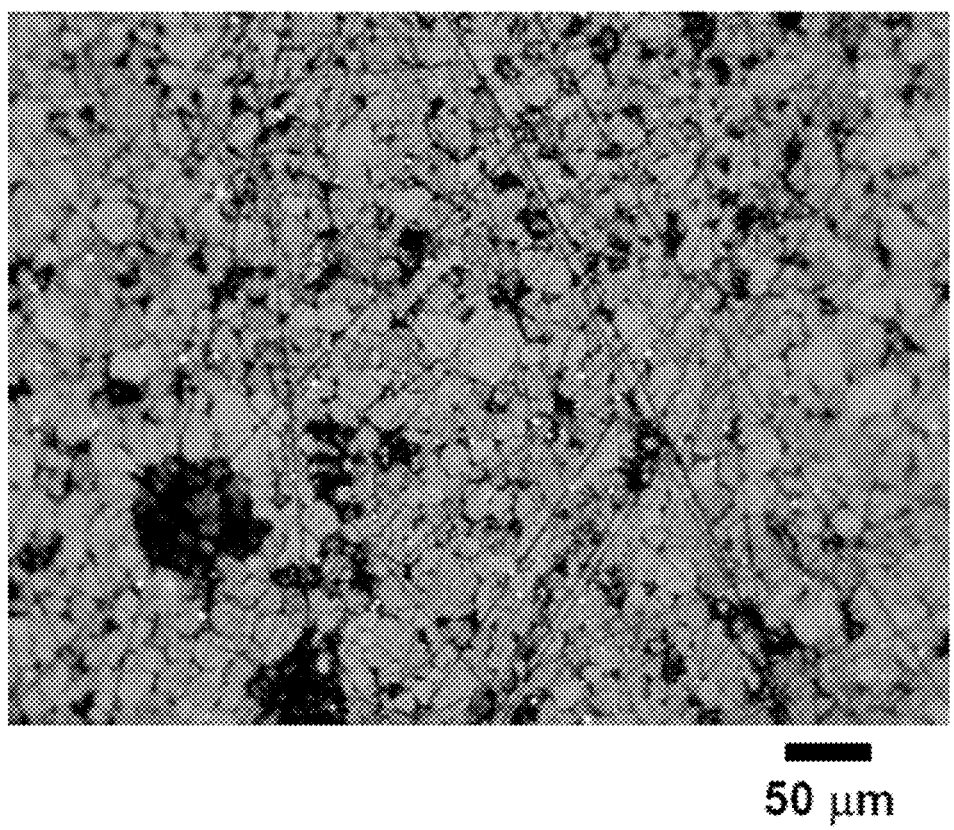
FIG. 7 is an optical micrograph image showing a microstructure of polycrystals after second sintering of $LiFePO_4$ with addition of 4-mol % K at 850° C. in Example 1 of the present invention.

The first-calcined powder of $LiFe_{0.98}PO_4$ with addition of 4-mol % K was put into a metal mold, and molded into a disk having a diameter of 9 mm and a thickness of 1 mm by application of 6 MPa uniaxial pressure. For the second heat treatment, the thus-prepared powder compact was heat-treated at 850° C. under the above-mentioned argon atmosphere for 5 hours to thereby prepare dense polycrystalline pellets having a homogeneous microstructure. FIG. 7 is an optical micrograph image showing a microstructure of the polycrystals thus obtained. As shown in FIG. 7, it was confirmed that individual grains have grown to a size of more than 50 μm for a short period of 5 hours at 850° C. Therefore, as mentioned above, upon the second heat treatment at a high temperature of more than 400° C., additive elements such as Na or K serve to facilitate a significantly fast grain growth. These results represent that the temperature and time of the second heat treatment are very important to control the size of final crystal grains.

In order to examine heat treatment conditions and crystal grain sizes for various kinds of nanoparticle powders prepared in Example 1, a size of crystal grains was calculated with main diffraction peaks within the range of 20 to 40 degrees among X-ray diffraction patterns, using the Scherrer equation well known in the art, $d=0.9 \lambda B \cos \theta$ (d: nanoparticle size, λ: wavelength of X-rays, B: FWHM of X-ray diffraction peak, and θ: Bragg diffraction angle). The results thus obtained are summarized in Table 1 below.

TABLE 1

| Composition | First calcination | Second heat-treatment | Particle size (nm) |
| --- | --- | --- | --- |
| $LiFePO_4$ (undoped) | 350° C. 8 h, Ar | 700° C. 20 h, Ar | N/A (1,000 nm or larger) |
| $LiFe_{0.98}K_{0.04}PO_4$ | 350° C. 8 h, Ar | 450° C. 4 h, Ar | 40-50 |
| $LiFe_{0.98}K_{0.04}PO_4$ | 350° C. 8 h, Ar | 500° C. 4 h, Ar | 44-46 |
| $LiFe_{0.98}K_{0.04}PO_4$ | 350° C. 8 h, Ar | 500° C. 10 h, Ar | 47-59 |
| $LiFe_{0.98}Na_{0.04}PO_4$ | 350° C. 8 h, Ar | 500° C. 10 h, $95N_2-5H_2$ | 47-55 |
| $LiFe_{0.98}Na_{0.04}PO_4$ | 350° C. 2 h, Ar | 450° C. 3 h, Ar | 35-42 |
| $LiFe_{0.98}Na_{0.04}PO_4$ | 350° C. 2 h, Ar | 500° C. 2 h, Ar | 44-55 |
| $Li_{0.95}Na_{0.05}FePO_4$ | 350° C. 5 h, Ar | 450° C. 2 h, Ar | 39-44 |
| $K_{0.04}LiFePO_4$ | 350° C. 5 h, Ar | 450° C. 2 h, Ar | 36-41 |

Example 2

This example is intended to illustrate a process for preparing nanocrystalline particles of $LiFePO_4$ having a starting composition of $(Li_{1-x}A_y)FePO_4$ or $Li(Fe_{1-x}A_y)PO_4$ (A=La, Ce, Pr, Nd, Sm, Gd, or Er, 0<x<0.1, and 0<y<0.1) with addition of lanthanide elements such as La, Ce, Pr, Nd, Sm, Gd and Er.

Starting material powders used for preparation of the $LiFePO_4$ nanocrystalline particles were $Li_2CO_3$, $FeC_2O_4$ ($2H_2O$), and $NH_4H_2PO_4$, as in Example 1. The powders used as additives were $Ce_2(C_2O_4)_3(9H_2O)$, $Nd_2(C_2O_4)_3(5H_2O)$, $Gd_2(C_2O_4)_3(5H_2O)$, and $Er_2(C_2O_4)_3(5H_2O)$. Three starting material powders and additive powders were 99.5% pure or higher.

In order to synthesize four $LiFePO_4$ powders with addition of each additive element of Ce, Nd, Gd and Er in an amount of 2 mol %, using the aforesaid oxalates, a powder of $Li_2CO_3$, $FeC_2O_4(2H_2O)$ and $NH_4H_2PO_4$ in a molar ratio of 0.5:1:1 was prepared. Then, these materials in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of four mixtures thus prepared was ground in the glove box using a mortar and pestle, in the same manner as in Example 1. Thereafter, each of the mixed powders was placed in an alumina crucible and subjected to first calcination at 350° C. for 8 hours. In order to prevent oxidation of iron ions due to inflow of oxygen, the heat treatment was carried out with introduction of >99.9% pure argon gas at a flow rate of 400 cc/min, thereby obtaining a first synthetic powder.

In such a manner, the starting materials were subjected to the first heat treatment at 350° C., and the aggregated materials were ground. In order to achieve more uniform distribution of the additives, this was followed by additional grinding for several minutes using a mortar and pestle.

Then, the thus-prepared powder was subjected to a second heat treatment at 500° C. for 10 hours with introduction of argon at the same flow rate of 400 cc/min, as in the first calcination. As shown in Example 1 with addition of alkali elements, the second heat treatment also causes gradual formation of crystalline nuclei for a phase transition from an amorphous phase to a crystalline phase, followed by growth of nanoscale particles from the thus-formed crystalline nuclei.

Figure 8:
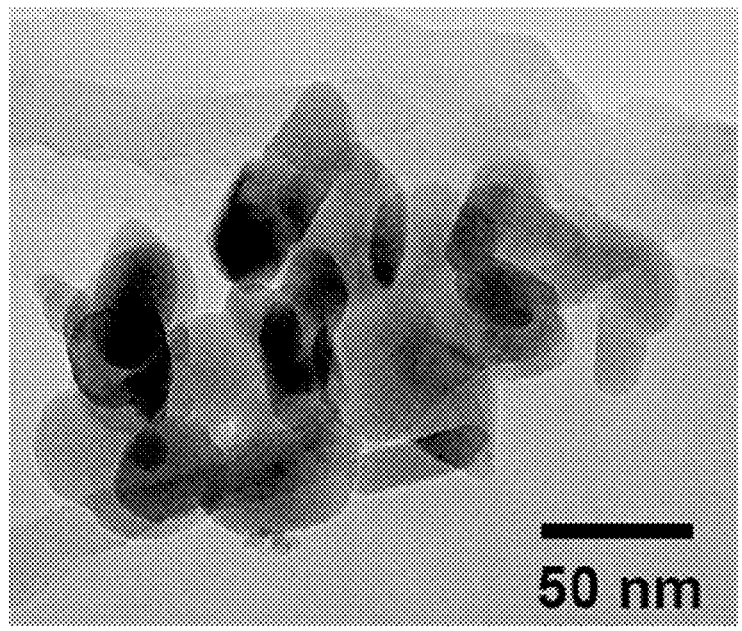
FIG. 8 shows TEM images of powder samples after second heat treatment of $LiFePO_4$ with addition of 2-mol % Er and $LiFePO_4$ with addition of 2-mol % Ce at 500° C. in Example 2 of the present invention.
Figure 8:
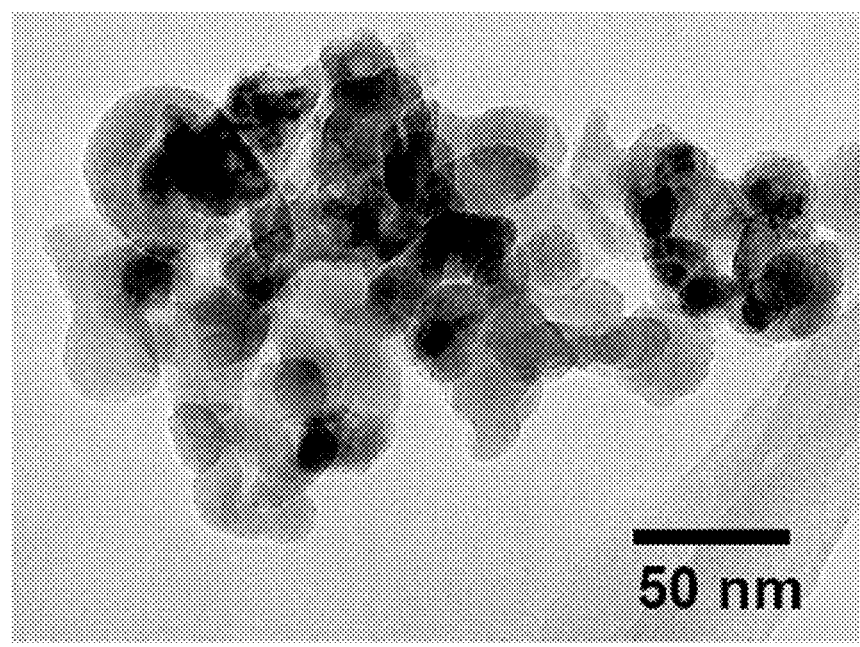

From X-ray diffraction analysis for samples of powders subjected to the second heat treatment as above, it can be confirmed that all the powders were synthesized into $LiFePO_4$ having a single-phase olivine structure without formation of a secondary phase. For direct examination of a particle size, the powders were observed using TEM. FIG. 8 shows TEM images of particle morphology and size of the $LiFePO_4$ powders.

FIG. 8 is TEM images of powders after second heat treatment of a $LiFePO_4$ powder with addition of 2-mol % Er and a $LiFePO_4$ powder with addition of 2-mol % Ce at 500° C. As can be seen in FIG. 8, it was confirmed that all the powders have a similar size distribution and are composed of nanocrystalline particles having a particle size of less than 50 nm.

Figure 9:
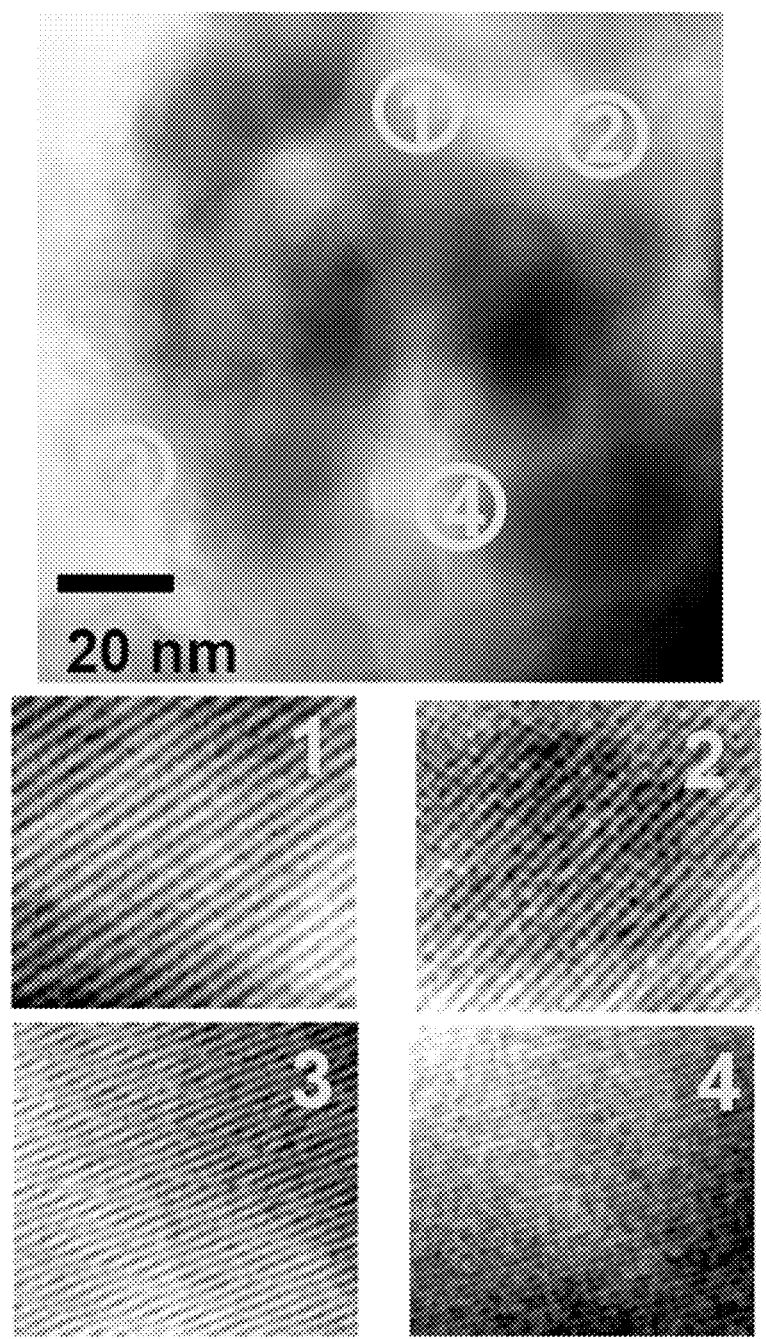
FIG. 9 shows a TEM image of nanoparticle samples obtained after second heat treatment of $LiFePO_4$ with addition of 2-mol % Er at 500° C. in Example 2 of the present invention, and HRTEM images representing different lattice images of $LiFePO_4$ in aggregated regions.

In particular, upon high-resolution lattice imaging of the thus-prepared nanoparticles at a unit of 10 to 20 nm in the aggregated region of particles, it can be confirmed that particles of each region have different crystal lattice orientations, as shown in FIG. 9. Therefore, it can be seen that the powder consists of very small nanoscale crystallites.

In order to examine heat treatment conditions and crystal grain sizes for various kinds of nanoparticle powders prepared in this Example 2, a size of crystal grains was calculated with main diffraction peaks within the range of 20 to 40 degrees, among X-ray diffraction patterns, using the same Scherrer equation as in Example 1. The results thus obtained are summarized in Table 2 below.

TABLE 2

| Composition | First calcination | Second heat treatment | Particle size (nm) |
|---|---|---|---|
| $Nd_{0.02}LiFePO_4$ | 350° C. 8 h, Ar | 500° C. 10 h, Ar | 30-38 |
| $Er_{0.02}LiFePO_4$ | 350° C. 8 h, Ar | 500° C. 10 h, Ar | 31-38 |
| $Er_{0.02}LiFePO_4$ | 350° C. 8 h, Ar | 600° C. 10 h, Ar | 36-47 |
| $Gd_{0.02}LiFePO_4$ | 350° C. 8 h, Ar | 500° C. 10 h, Ar | 32-35 |
| $Gd_{0.02}LiFePO_4$ | 350° C. 8 h, Ar | 600° C. 10 h, Ar | 40-45 |
| $Li_{0.95}Ce_{0.02}FePO_4$ | 350° C. 8 h, Ar | 500° C. 10 h, Ar | 33-38 |
| $LiFe_{0.98}Ce_{0.02}PO_4$ | 350° C. 5 h, Ar | 500° C. 10 h, Ar | 33-44 |
| $LiFe_{0.98}Ce_{0.02}PO_4$ | 350° C. 5 h, Ar | 600° C. 10 h, Ar | 44-49 |

Example 3

This example is intended to illustrate a process for preparing nanocrystalline particles of $LiFePO_4$ having a starting composition of $(Li_{1-x}A_y)FePO_4$ (A=K or Na, 0<x≦0.5, and 0<y≦0.1) with addition of alkali elements as additives. That is, Example 3 is to provide details for a method for controlling patterns of changes in overall phase formation and nanoparticle formation with a varying non-stoichiometry of Li ions, by controlling a non-stoichiometry of Li up to 50%.

Starting material powders used for preparation of the $LiFePO_4$ nanocrystalline particles were $Li_2CO_3$, $FeC_2O_4$ ($2H_2O$), and $NH_4H_2PO_4$, as in Examples 1 and 2. The powder used as an additive was $K_2CO_3$. The starting material powders and the additive powder were all 99.5% pure or higher.

In the present Example 3, four $LiFePO_4$ powders each with addition of 4-mol % K and having a different content of Li were prepared. For this purpose, mixed powders were prepared according to the same procedure as in Examples 1 and 2. First, in order to synthesize a $LiFePO_4$ powder with addition of 4-mol % K, a mixed powder of $Li_2CO_3$, $FeC_2O_4$ ($2H_2O$) and $NH_4H_2PO_4$ in a molar ratio of 0.5:1:1 was prepared. Second, in order to synthesize a $Li_{0.85}FePO_4$ powder with addition of 4-mol % K, a mixed powder of $Li_2CO_3$, $FeC_2O_4(2H_2O)$ and $NH_4H_2PO_4$ in a molar ratio of 0.425:1:1 was prepared. Third, in order to synthesize a $Li_{0.70}FePO_4$ powder with addition of 4-mol % K, a mixed powder of $Li_2CO_3$, $FeC_2O_4(2H_2O)$ and $NH_4H_2PO_4$ in a molar ratio of 0.35:1:1 was prepared. Fourth, in order to synthesize a $Li_{0.50}FePO_4$ powder with addition of 4-mol % K, a mixed powder of $Li_2CO_3$, $FeC_2O_4(2H_2O)$ and $NH_4H_2PO_4$ in a molar ratio of 0.25:1:1 was prepared.

Then, four mixed powders thus prepared in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of four mixtures thus prepared was ground in the glove box using a mortar and pestle, in the same manner as in Examples 1 and 2. Thereafter, each of the mixed powders was placed in an alumina crucible and subjected to first calcination at 350° C. for 5 hours. In order to prevent oxidation of iron ions due to inflow of oxygen, the heat treatment was carried out with introduction of >99.9% pure argon gas at a flow rate of 400 cc/min, thereby obtaining a first synthetic powder.

In such a manner, the starting materials were subjected to the first heat treatment at 350° C., and the aggregated materials were ground. In order to achieve more uniform distribution of the additives, this was followed by additional grinding for several minutes using a mortar and pestle. Then, the thus-prepared powder was subjected to a second heat treatment at 450° C. for 3 hours with introduction of argon at the same flow rate of 400 cc/min, as in the first calcination.

Figure 10:
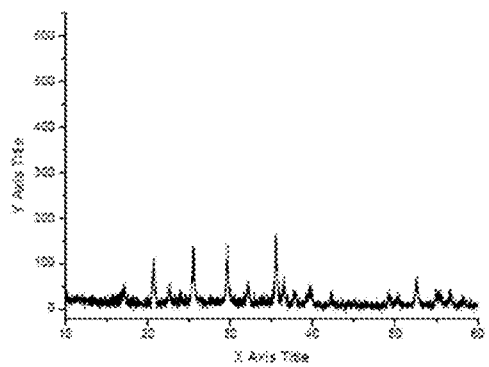
FIG. 10 is a group of graphs showing X-ray diffraction patterns of powder samples obtained after first calcination of $LiFePO_4$ with addition of 4-mol % K at 350° C. with various stoichiometric ratios of lithium in Example 3 of the present invention.
Figure 10:
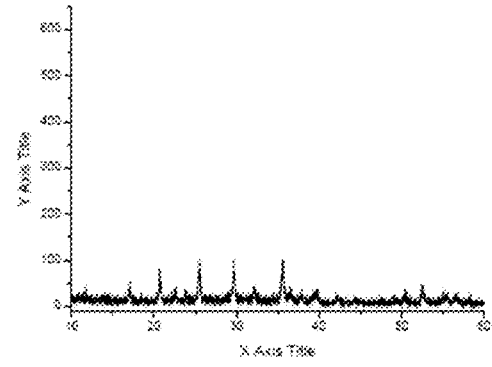
Figure 10:
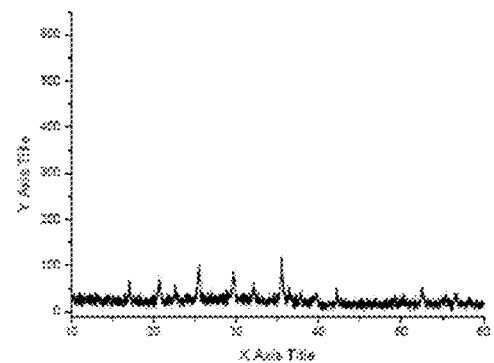
Figure 10:
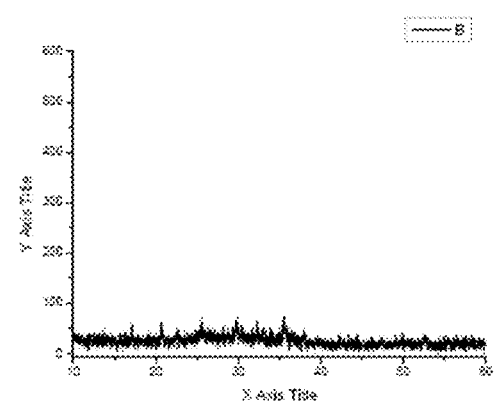

FIG. 10 shows X-ray diffraction patterns for four different powder samples subjected to first heat treatment at 350° C. for 5 hours, as described above. As shown in FIG. 10, a decreasing amount of Li leads to a decrease in the intensity of diffraction peaks and a gradual broadening in FWHM, as compared to the sample having the exact 1:1 stoichiometry of Li:Fe. That is, a decreasing amount of added lithium results in a decrease in amounts and numbers of nanoclusters which serve as nuclei for growth of crystals. As a result, it can be seen that the fourth $Li_{0.50}FePO_4$ powder with 50% Li-deficiency consists substantially of an amorphous phase. Therefore, it can be seen that more preferred is to appropriately control an addition amount of Li to be smaller than an amount of Fe, in order to prevent unwanted formation of heterogeneously coarsened crystal particles by suppression of inhomogeneous nucleation which may occur upon the first heat treatment.

Figure 11:
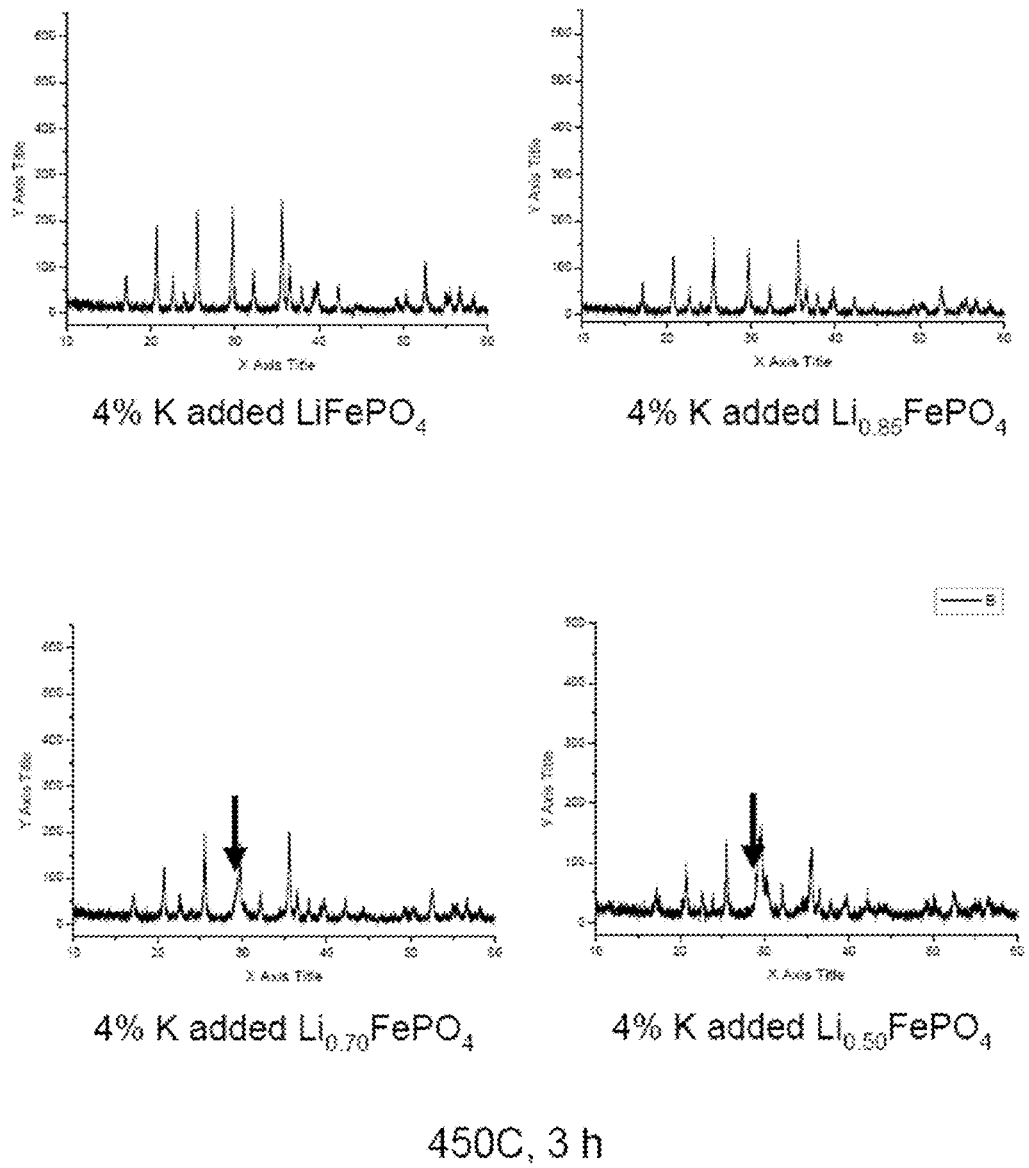
FIG. 11 is a group of graphs showing X-ray diffraction patterns of powder samples obtained after second calcination of $LiFePO_4$ with addition of 4-mol % K at 450° C. with various stoichiometric ratios of lithium in Example 3 of the present invention.

FIG. 11 shows X-ray diffraction patterns of these powder samples subjected to second heat treatment at 450° C. for 3 hours. As shown in FIG. 11, the $Li_{0.85}FePO_4$ powder with 15% Li-deficiency exhibited X-ray diffraction results of a single phase without formation of any secondary phase. On the other hand, it can be seen that formation of a secondary phase corresponding to $Fe_2P_2O_7$ occurs as indicated by an arrow, from the $Li_{0.70}FePO_4$ powder with 30% Li-deficiency. In other words, upon considering the fact that the $Li_{0.85}FePO_4$ powder with about 15% Li-deficiency also exhibits no formation of any secondary phase, it can be seen that the difference in charge disproportionation is compensated by transition of valance state of 15% of Fe ions from $2^+$ to $3^+$. Therefore, these results show a close relationship with the fact that an excellent electrical conductivity is achieved by the electron hole transfer, as mentioned before.

In order to examine heat treatment conditions and crystal grain sizes for various kinds of nanoparticle powders prepared in the present Example 3, a size of crystal grains was calculated with main diffraction peaks within the range of 20 to 40 degrees, among X-ray diffraction patterns, using the same Scherrer equation as in Example 1. The results thus obtained are summarized in Table 3 below. In particular, a decrease in an amount of added lithium leads to a decrease in a size of crystal grains. Therefore, in order to prepare particles having a smaller particle size, it is preferable to appropriately control an amount of lithium.

TABLE 3

| Composition | First calcination | Second heat treatment | Particle size (nm) |
| --- | --- | --- | --- |
| $K_{0.04}LiFePO_4$ | 350° C. 5 h, Ar | 450° C. 2 h, Ar | 36-41 |
| $K_{0.04}Li_{0.85}FePO_4$ | 350° C. 5 h, Ar | 450° C. 3 h, Ar | 34-45 |
| $K_{0.04}Li_{0.70}FePO_4$ | 350° C. 5 h, Ar | 450° C. 3 h, Ar | 23-47 |
| $K_{0.04}Li_{0.70}FePO_4$ | 350° C. 5 h, Ar | 600° C. 5 h, Ar | 27-47 |
| $K_{0.04}Li_{0.50}FePO_4$ | 350° C. 5 h, Ar | 450° C. 3 h, Ar | 12-22 |
| $K_{0.04}Li_{0.50}FePO_4$ | 350° C. 5 h, Ar | 600° C. 5 h, Ar | 12-25 |

Example 4

This example is intended to illustrate a process for preparing nanocrystalline particles of lithium metal phosphate containing a transition metal other than Fe, such as Mn, Co, and the like, in addition to nanocrystalline particles of lithium metal phosphates exemplified in Examples 1 to 3. That is, this example illustrates a process for preparing nanoparticles of lithium transition metal phosphate having a starting composition of $(Li_{1-x}A_y)MPO_4$ (A=K, Na or a lanthanide element, M=Fe, Mn or Co, $0<x\leq0.1$, and $0<y\leq0.1$) with addition of an alkali element such as K or Na or a lanthanide element as an additive.

Starting material powders used for preparation of nanoparticles of lithium transition metal phosphate were $Li_2CO_3$, $FeC_2O_4(2H_2O)$, and $NH_4H_2PO_4$, as in Examples 1 and 2. $MnC_2O_4(2H_2O)$ and $CoC_2O_4(2H_2O)$ were used as source materials of Mn and Co, respectively. Further, the powder used as an additive was $K_2CO_3$. The starting material powders and the additive powder were all 99.5% pure or higher.

In the present Example 4, nanocrystalline particles of lithium metal phosphates each with addition of 5-mol % K and containing a different transition metal, e.g. $Li_{0.95}FePO_4$, $Li_{0.95}MnPO_4$, and $Li_{0.95}CoPO_4$, were synthesized. For this purpose, mixed powders were prepared according to the same procedure as in Examples 1 and 2. First, in order to synthesize a $Li_{0.95}FePO_4$ powder with addition of 5-mol % K, a mixed powder of $Li_2CO_3$, $FeC_2O_4(2H_2O)$ and $NH_4N_2PO_4$ in a molar ratio of 0.475:1:1 was prepared. Second, in order to synthesize a $Li_{0.95}MnPO_4$ powder with addition of 5-mol % K, a mixed powder of $Li_2CO_3$, $MnC_2O_4(2H_2O)$ and $NH_4H_2PO_4$ in a molar ratio of 0.475:1:1 was prepared. Third, in order to synthesize a $Li_{0.95}CoPO_4$ powder with addition of 5-mol % K, a mixed powder of $Li_2CO_3$, $CoC_2O_4(2H_2O)$ and $NH_4H_2PO_4$ in a molar ratio of 0.475:1:1 was prepared. As exhibited in Example 3, a decrease in an amount of added lithium leads to a decrease in a size of crystal grains. Therefore, a non-stoichiometry of lithium was appropriately adjusted to a value of 0.95 to thereby achieve formation and growth of nuclei having a uniform particle size during the heat treatment process.

Then, three mixed powders thus prepared in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of three mixtures thus prepared was ground in the glove box using a mortar and pestle, in the same manner as in Examples 1 and 2. Thereafter, each of the mixed powders was placed in an alumina crucible and subjected to first calcination at 350° C. for 5 hours. In order to prevent oxidation of Fe, Mn or Co ions due to inflow of oxygen, the heat treatment was carried out with introduction of >99.9% pure argon gas at a flow rate of 400 cc/min, thereby obtaining a first synthetic powder.

In such a manner, the starting materials were subjected to the first heat treatment at 350° C., and the aggregated materials were ground. In order to achieve more uniform distribution of the additives, this was followed by additional grinding for several minutes using a mortar and pestle. Then, the thus-prepared powder was subjected to a second heat treatment at a temperature of 450° C. for 1 to 2 hours with introduction of argon at the same flow rate of 400 cc/min, as in the first calcination.

Figure 12:
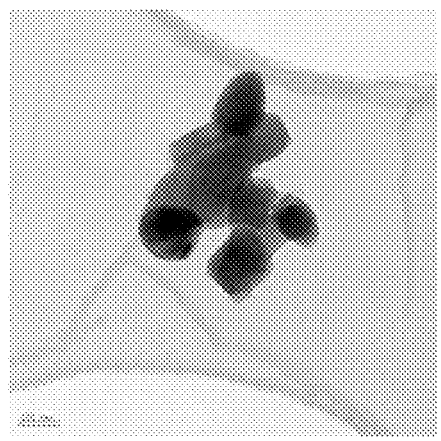
FIG. 12 shows TEM images of nanoparticle samples obtained after second heat treatment of lithium iron phosphate, lithium manganese phosphate and lithium cobalt phosphate each with addition of 5-mol % Na at 450° C. in Example 4 of the present invention.
Figure 12:
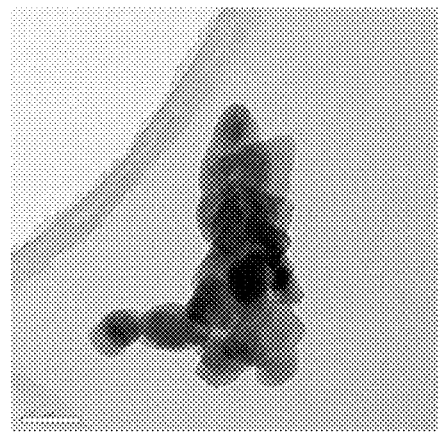
Figure 12:
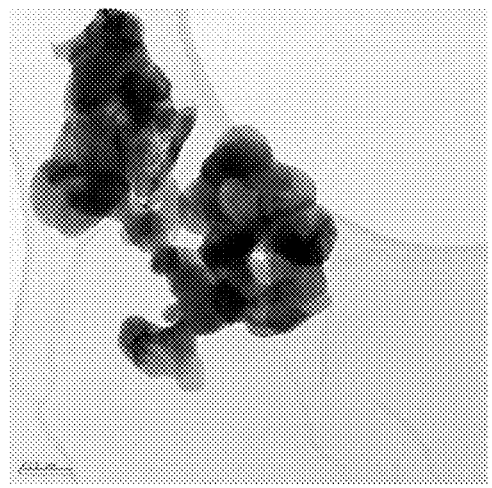

FIG. 12 shows TEM images for nanocrystalline particles of lithium metal phosphates of $Li_{0.95}FePO_4$, $Li_{0.95}MnPO_4$, and $Li_{0.95}CoPO_4$ each with addition of 5-mol % K prepared in the present Example 4. As shown in FIG. 12, it can be seen that all the samples exhibited formation of nanoparticles having an average particle size of less than 100 nm. Therefore, it is possible to easily prepare fine nanoparticles of lithium transition metal phosphate ($LiMPO_4$) having a particle size of less than 100 nm by a heat treatment process at a low temperature for a very short period of time via the addition of alkali elements such as Na and K and lanthanide elements, unlike a conventional method.

Figure 13:
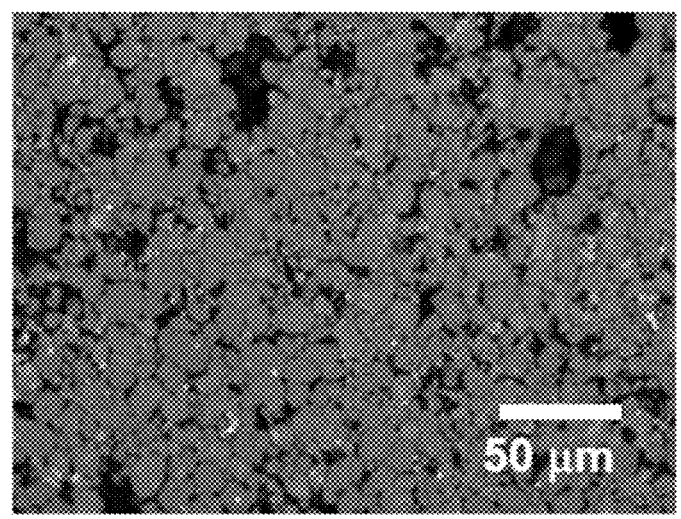
FIG. 13 is an optical micrograph image showing a microstructure of polycrystals obtained after second sintering of lithium cobalt phosphate with addition of 4-mol % Na at 700° C. in Example 4 of the present invention.

Further, consistently with the results of Example 1, additives such as alkali elements (including Na and K) and lanthanide elements serve to facilitate growth of particles as the second heat treatment temperature increases. FIG. 13 is a light micrograph showing a microstructure of polycrystals of lithium cobalt phosphate prepared according to the same manner. That is, $LiCO_{0.98}PO_4$ with addition of 4-mol % Na was subjected to the second heat treatment at 700° C. for 20 hours to thereby prepare polycrystals having a homogeneous microstructure. As shown in FIG. 13, it was confirmed that the thus-prepared dense pellet samples have a particle size of several tens of μm. These results were consistent with a microstructure photograph of Example 1 as shown in FIG. 7.

In order to examine heat treatment conditions and crystal grain sizes for various kinds of nanoparticle powders prepared in this Example 4, a size of crystal grains was calculated with main diffraction peaks within the range of 20 to 40 degrees, among X-ray diffraction patterns, using the same Scherrer equation as in Example 1. The results thus obtained are summarized in Table 4 below.

TABLE 4

| Composition | First calcination | Second heat treatment | Particle size (nm) |
| --- | --- | --- | --- |
| $Li_{0.95}Na_{0.05}FePO_4$ | 350° C. 5 h, Ar | 450° C. 2 h, Ar | 39-44 |
| $Li_{0.95}Na_{0.05}CoPO_4$ | 350° C. 5 h, Ar | 450° C. 1 h, Ar | 64-72 |
| $Li_{0.95}Na_{0.05}MnPO_4$ | 350° C. 5 h, Ar | 450° C. 2 h, Ar | 42-56 |
| $LiMn_{0.95}Na_{0.05}PO_4$ | 350° C. 8 h, Ar | 500° C. 2 h, Ar | 47-52 |
| $LiCo_{0.98}Na_{0.04}PO_4$ | 350° C. 2 h, Ar | 450° C. 3 h, Ar | 49-61 |

Analysis Example 1

This example demonstrates through direct observation that it is possible to easily prepare nanoparticles of lithium transition metal phosphate ($LiMPO_4$) (M=Fe, Mn, Co, Ni, Ti, Cu or any combination thereof) with addition of alkali elements and lanthanide elements as proposed by the present invention. For this purpose, in-situ TEM observation was directly carried out for formation of nanoparticles of $LiFePO_4$ at a heat treatment temperature above 400° C.

As a powder sample used in the present Analysis Example 1, one of the powders prepared in Example 1 was selected. As the $LiFePO_4$ with addition of 4-mol % K, a powder sample, which was subjected to a first heat treatment at 350° C. for 5 hours, was directly observed for formation and growth of nanoparticles with TEM in real time at a high temperature. For such an analysis, in situ high-resolution images were continuously taken at 450 C under an electron microscope with an accelerating voltage of 1,250 keV, using a specimen holder including a device for heating a specimen to a high temperature.

Figure 14:
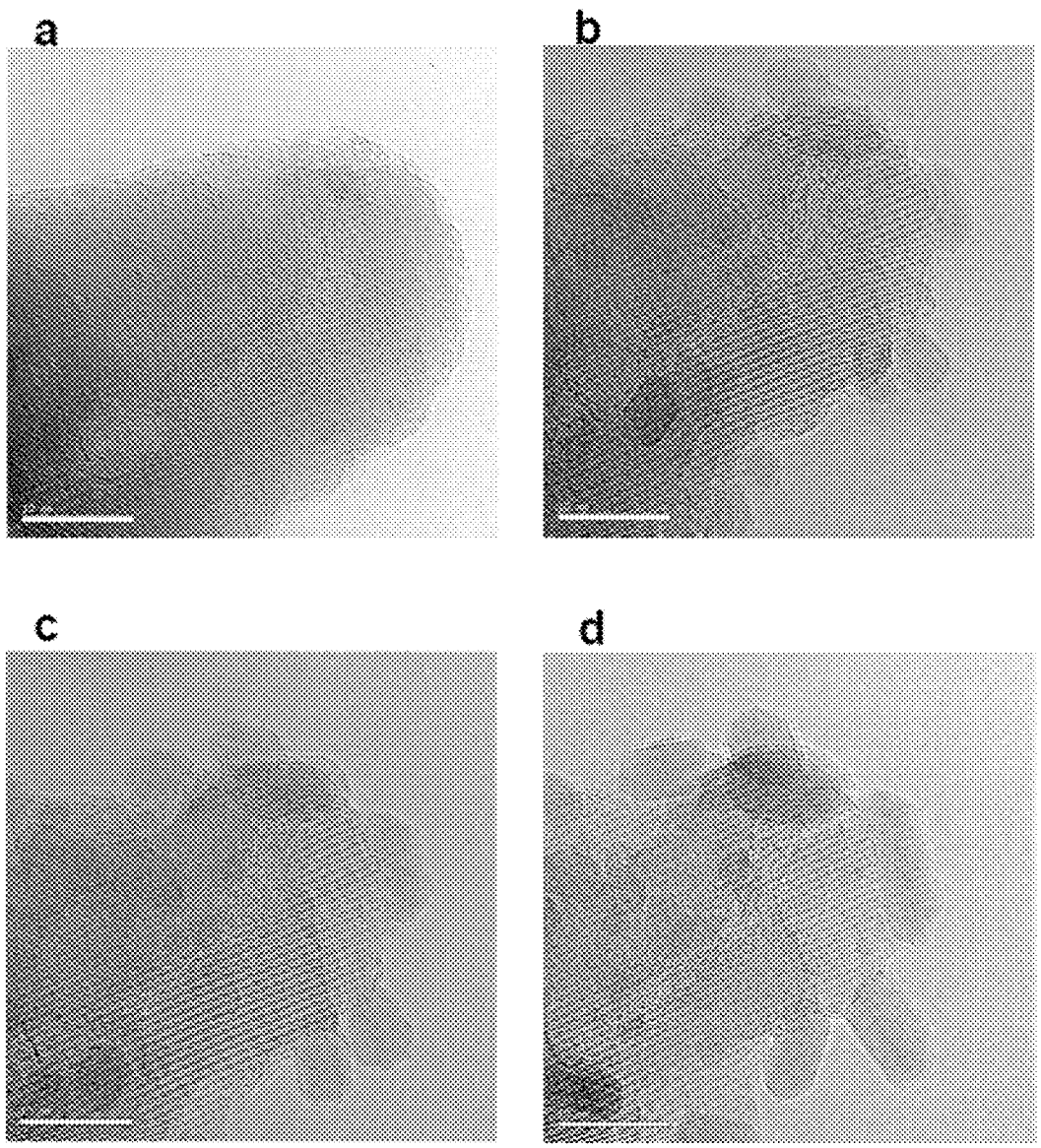
FIG. 14 shows HRTEM images representing a formation process of nanoparticles taken under a transmission electron microscope in Analysis Example 1 of the present invention.

FIG. 14 shows a series of high-resolution images observed in real time for formation and growth of nanoparticles at 450° C. under a transmission electron microscope, using a powder sample of amorphous $LiFePO_4$ with addition of 4-mol % K, which was subjected to the first heat treatment at 350° C. for 5 hours. In order to stabilize the drift of the sample due to thermal expansion at a high temperature, Image "a" was obtained after the sample was maintained for 20 min. FIGS. 14b, 14c and 14d are high-resolution images taken for the same region after 15 min, 20 min and 35 min, respectively. As shown in FIG. 14a, it can be seen that formation and differentiation of crystalline nuclei having a size of several nanometers take place within the entire amorphous phase at the initial stage of heat treatment. Further, FIGS. 14b, 14c and 14d directly demonstrate that such nuclei undergo gradual and uniform growth with heat-treatment time, thereby forming crystal particles having a particle size of several tens of nanometers.

Analysis Example 2

As mentioned hereinbefore, in the unit lattice of the LiMPO4 (M=Fe, Mn, Co, Ni, Ti, Cu or any combination thereof), Li is positioned in oxygen octahedral interstitials of the M' site, and M is positioned in oxygen octahedral interstitials of the M' site, thus forming an ordered olivine structure. Therefore, if transition metal ions are positioned in the M' sites where Li ions are present, this may interfere with migration of Li ions in the b-axis direction, which thereby inhibits fast diffusion of Li ions during the intercalation reaction. Consequently, such anti-site defects cause deterioration of discharge capacity and output power properties when the lithium transition metal phosphates are used as electrode materials in the lithium-ion secondary batteries. Accordingly, it is very important to prepare the $LiMPO_4$ having a crystallographically ordered cation arrangement.

In connection with particles of the $LiMPO_4$ with addition of alkali elements and lanthanide elements, prepared by the process of the present invention, the present Analysis Example 2 presents the direct atomic-level observation for an ordered arrangement between cations inside the crystal lattices, using a high-angle annular dark field (HAADF) scanning TEM imaging which is one of the most up-to-date electron microscopy techniques. The present Analysis Example 2 is intended to demonstrate that crystalline particles of the $LiMPO_4$ prepared in the present invention have excellent cation ordering between Li and M.

As the specimen for the HAADF-STEM examination, one of the powder samples prepared in Example 1 was used. A powder sample of $LiFePO_4$ with addition of 4-mol % K subjected to the first calcination at 350° C. for 5 hours was put into a metal mold, and compacted into a disk having a diameter of 9 mm and a thickness of 1 mm by application of 6 MPa pressure. For the second heat treatment, the thus-prepared powder compact was sintered at 700° C. under the same argon atmosphere for 5 hours to thereby prepare polycrystalline samples having a homogeneous microstructure. Based on the typical TEM specimen preparation of polycrystalline samples, a densely sintered pellet was ground up to a thickness of 100 μm and then ultrasonically cut into a disk having a diameter of 3 mm. The resulting disk samples were subjected to dimpling and finally ion-milling to thereby prepare a thin section for electron transparency for TEM.

The high-resolution lattice image, which can be observed with conventional TEM, may exhibit different lattice patterns even for the same specimen, depending upon a specimen thickness and a defocus length of an objective lens (D. B. Williams and C. B. Carter, "Transmission Electron Microscopy, A Textbook for Materials Science (Part 3. Imaging)", Plenum Press, 1996). Therefore, in order to correctly probe a position of atomic columns, an atomic-level observation should be made using Z-contrast STEM based on HAADF imaging which enables to visualize the atomic columns of the lattice (M. Varela et ah, Annu. Rev. Mater. Res., Vol. 35, p. 539 (2005)). This method, literally, shows the contrast of the image according to the atomic number, Z, and can identify crystal lattices at the atomic level, because a heavier atom, e.g, an atom with a higher atomic number, exhibits a brighter contrast.

Figure 15:
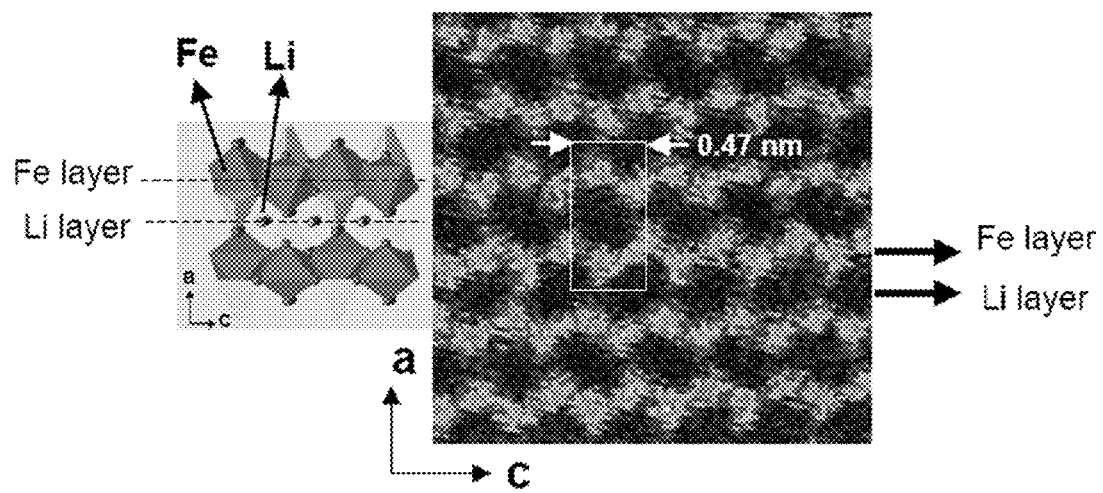
FIG. 15 is a crystal lattice image of $LiFePO_4$ taken using a High-Angle Annular Dark Field (HAADF) scanning TEM in Analysis Example 2 of the present invention.

FIG. 15 shows a crystal lattice image of $LiFePO_4$ taken using a HAADF STEM imaging in Analysis Example 2 in accordance with the present invention. The left image in FIG. 15 schematically shows crystal lattice of the $LiFePO_4$. As shown in FIG. 15, the $LiFePO_4$ should have a crystal structure wherein lithium and iron ions are regularly arranged on M' and M' sites, respectively. Further, the right image of FIG. 15 shows a Z-contrast STEM image of the crystal lattice obtained using a HAADF mode in the present Analysis Example 2. An open rectangle indicated in the image represents a unit cell for the [010] projection. For better examination of an ordered arrangement of lithium and iron ions, the particle orientation was adjusted such that the [010] direction, i.e. b-axis, is projected. Lithium has an atomic number of three, which is lower than that of oxygen, and therefore can have no contrast on the image, thus appearing as a black color. On the other hand, iron has a very high atomic number of 26 and shows a bright contrast to thereby form an ordered array in the image. From the fact that the lithium sites exhibit no bright contrast, as observed in the image of FIG. 15, it can be directly confirmed that the $LiFePO_4$ has, as shown in the left schematic view, the well-ordered olivine structure without random intermixing of iron ions in the lithium sites. Therefore, it can be seen that it is possible to prepare crystalline particles of $LiMPO_4$ having excellent cation ordering via the present invention.

Test Example 1

Using $(Li_{1-x}A_x)(M_{1-y}B_y)PO_4$ and $(LiA_x)(MB_y)PO_4$ (A or B=Na, K, La, Ce, Pr, Nd, Sm, Gd, or Er, $0<x<0.1$, $0<x<0.1$, $0<y<0.1$, and M=Fe, Mn, Co, Ni, Ti, Cu, or any combination thereof) powders having various compositions prepared in previous Examples, electrical resistance was measured for sintered samples of the powders. The present Test Example 1 demonstrates that the lithium transition metal phosphates prepared according to the present invention exhibit a high electrical conductivity, as compared to those prepared by a conventional method.

Samples for measurement of the electrical conductivity were prepared in the same manner as described before, such that they have a microstructure as shown in FIGS. 7 and 13. That is, powders subjected to first calcination at 350° C. for 2 to 5 hours were put into a metal mold, and compacted into a disk having a diameter of 9 mm and a thickness of 1 mm by application of 6 MPa pressure. For the second heat treatment, the thus-prepared molded materials were heat-treated at a temperature of 700 to 850° C. under the same argon atmosphere for 5 to 10 hours to thereby prepare polycrystals having a homogeneous structure.

Surfaces of the thus-prepared polycrystalline sintered materials were ground with SiC sand paper (#1200). Using a multimeter, the electrical resistance for the surface of sintered materials was measured at room temperature by positioning electrodes at a distance of 1 cm apart on the surface. The electrical resistance was non-measurable (out of scale) in pure $LiFePO_4$, $LiCoPO_4$ and $LiMnPO_4$ to which no additives were added, due to intrinsically high electrical resistivity as mentioned hereinbefore. On the other hand, other lithium transition metal phosphates prepared by the present invention were found to have a low resistance value of several tens of $k\Omega$ to several hundreds of $k\Omega$ preferably 20 $k\Omega$ to 800 $k\Omega$. As used herein, the term "non-measurable" means that the electrical resistance is at least 100 $M\Omega$. Compositions, sintering conditions of second heat treatment and surface electrical resistance values for the samples measured in the present Test Example 1 are summarized in Table 5 below.

TABLE 5

| Composition | First calcination | Second sintering | Electrical resistance ($K\Omega$) |
|---|---|---|---|
| $LiFePO_4$ (undoped) | 350° C. 8 h, Ar | 700° C. 20 h, Ar | Out of scale (at least 100 $M\Omega$) |
| $LiFe_{0.98}Na_{0.04}PO_4$ | 350° C. 8 h, Ar | 700° C. 20 h, Ar | 600-800 |
| $LiCo_{0.98}Na_{0.04}PO_4$ | 350° C. 8 h, Ar | 700° C. 18 h, Ar | 20-90 |
| $LiFe_{0.98}K_{0.04}PO_4$ | 350° C. 8 h, Ar | 700° C. 12 h, Ar | 200-500 |
| $LiK_{0.04}FePO_4$ | 350° C. 5 h, Ar | 800° C. 8 h, Ar | 20-50 |
| $Li_{0.85}K_{0.04}FePO_4$ | 350° C. 5 h, Ar | 800° C. 8 h, Ar | 20-30 |
| $Li_{0.70}K_{0.04}FePO_4$ | 350° C. 5 h, Ar | 800° C. 8 h, Ar | 40-50 |
| $Li_{0.50}K_{0.04}FePO_4$ | 350° C. 5 h, Ar | 800° C. 8 h, Ar | 20-40 |
| $LiFe_{0.98}Na_{0.04}PO_4$ | 350° C. 5 h, Ar | 800° C. 5 h, Ar | 50-200 |
| $Li_{0.95}Na_{0.05}FePO_4$ | 350° C. 8 h, Ar | 850° C. 5 h, Ar | 30-100 |
| $Li_{0.95}Na_{0.05}FePO_4$ | 350° C. 5 h, Ar | 800° C. 5 h, Ar | 50-300 |

Test Example 2

This example is intended to demonstrate that a low electrical resistance value of the samples measured in Test Example 1 arises from a decreased electrical resistance of crystal lattices per se, not as a result dependent upon the presence of other secondary phases in the grain boundaries. For this purpose, the sintered polycrystalline pellets were finely polished, and Pt microelectrodes were deposited on the surface, followed by measurement of current-voltage characteristics.

The dense polycrystalline sample used in the present Test Example 2 was $LiFePO_4$ with addition of 4-mol % K, which was prepared in Test Example 1 and then sintered at 850° C. for 10 hours. First, in order to examine a microstructure of the lithium iron phosphate, the sintered samples were mounted by using polyester resin. This was followed by fine polishing of the samples, using a micron-graded diamond abrasive in order of 6 μm, 3 μm and 1 μm. The thus-prepared samples were subjected to chemical etching for 5 sec in distilled water containing 3 vol % of HCl dissolved therein.

Figure 16:
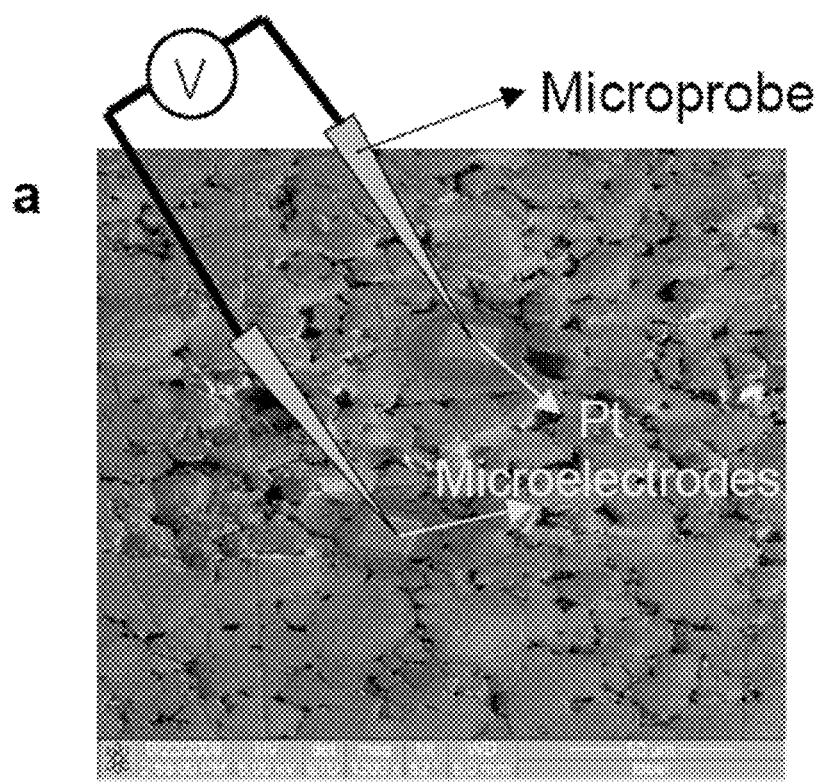
FIG. 16 is a scanning electron micrograph showing a typical microstructure of a polycrystalline $LiFePO_4$ sample used in Test Example 2 of the present invention.

FIG. 16 is a scanning electron micrograph showing a typical microstructure of the polycrystalline $LiFePO_4$ sample used in the present Test Example 2. As shown in FIG. 16, square-shaped Pt microelectrodes having each side length of 20 μm were deposited on the single grains having a size of 40 to 50 μm. It can be seen that such Pt-microelectrodes have a smaller size than the individual single grains of lithium iron phosphate and therefore have a structure which is very useful to investigate current-voltage characteristics for the inside of particles, irrespective of the grain boundaries. Further, as shown in FIG. 16, microprobes having a diameter of 1 μm were positioned on the microelectrodes, and current changes were measured with application of a gradually increasing voltage of up to 6V.

Figure 17:
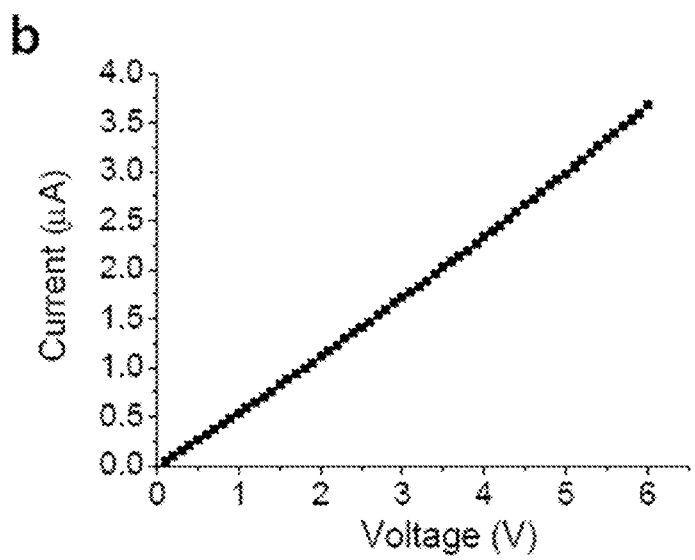
FIG. 17 is a graph showing a current-voltage relationship between particles, measured using a microprobe and platinum (Pt) microelectrodes in Test Example 2 of the present invention.

FIG. 17 is a graph showing a current-voltage relationship between grains, measured using a microprobe and Pt microelectrodes in Test Example 2 of the present invention. Therefore, it can be seen that the sample of $LiFePO_4$ with addition of 4-mol % K prepared by the present invention exhibits a flow of a high current of several μA (10-6 A), as shown in FIG. 17, while a conventional LiFePO$_4$ exhibits a current of only several tens of pA (10-14 A) in current-voltage characteristics (S.-Y. Chung and Y.-M. Chiang, Electrochem. Solid-State Lett., Vol. 6, p. A278 (2003)).

In conclusion, it can be seen that it is possible to easily prepare the lithium transition metal phosphate having low electrical resistance and excellent electrical conductivity, through the results of Test Examples 1 and 2.

Test Example 3

Electrochemical performance was measured for nanocrystalline particles of lithium transition metal phosphates prepared according to the present invention. More specifically, charge/discharge characteristics were tested for applicability of the lithium transition metal phosphate as a cathode material for a lithium ion secondary battery. The results show through Test Example 3 that nanoparticles of lithium transition metal phosphate prepared in the present invention have a high energy density as well as an excellent power density.

In order to measure electrochemical charge/discharge characteristics in the present Test Example 3, LiFePO$_4$ nanopowder with addition of 4-mol % Na and LiFePO$_4$ nanopowder with addition of 4-mol % K were selected from powder samples prepared in previous Examples.

First, in order to fabricate an electrode, the LiFePO$_4$ nanopowder with addition of 4-mol % Na, Ketjen black carbon, and polyvinylidene difluoride (PVDF, KynarFlex 2801, Elf Atochem) were mixed in a weight ratio of 80:10:10. N-methyl-2-pyrrolidone (NMP) was used as a solvent. In order to ensure homogeneous mixing, the materials were mixed using a mixer equipped with a homogenizer rotating at 3000 rpm. The resulting slurry was applied to aluminum foil, and dried in a vacuum oven to thereby prepare a cathode coating.

Fabrication of a cell for a battery test was carried out by a conventional method known in the art. A lithium metal foil was used as an anode and Celgard 2400 (Hoechst Celanese Corp.) as a separator was disposed between the cathode and the anode. As an electrolyte, a mixed solution of ethylene carbonate (EC) and diethyl carbonate (DEC) or dimethyl carbonate (DMC) containing 1 M LiPF$_6$ was used.

Figure 18:
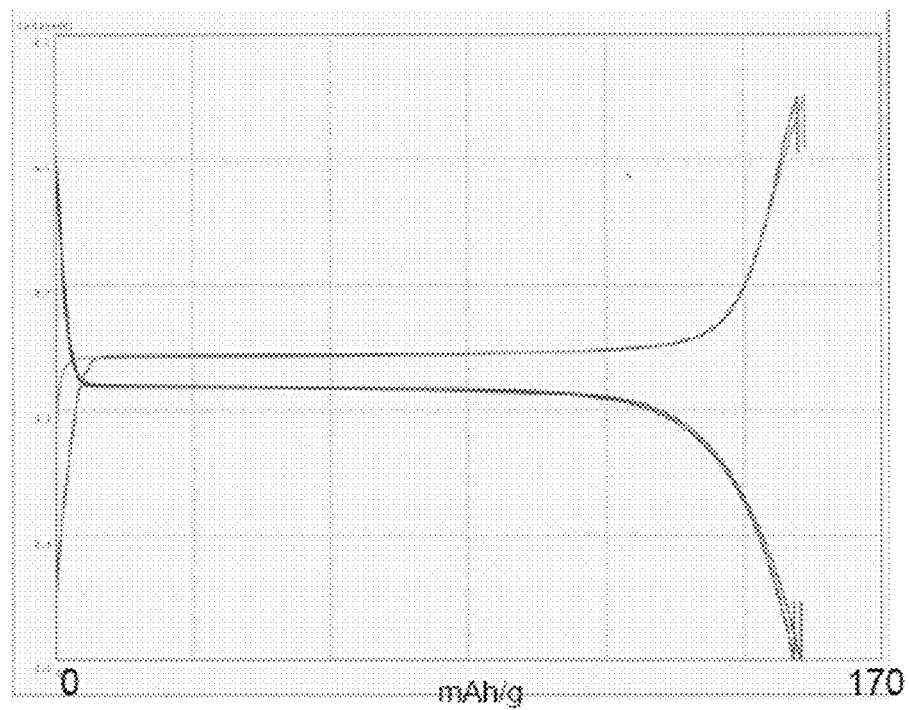
FIG. 18 is a graph showing cell test results for charge/discharge characteristics in Test Example 3, performed using nanoparticles of LiFePO4 with addition of 4-mol % Na prepared in Example 1 of the present invention.

Test results for the thus-fabricated electrode assembly are shown in FIG. 18. That is, FIG. 18 shows charge/discharge curves calculated when galvanostatic measurement was carried out at a current of 32 mA/g, i.e. a current rate of 0.2 C, on the assumption that a theoretical capacity is 160 mAh/g. Upon measurement at a voltage of 2.5 to 4.3 V, the capacity was about 150 mAh/g. Therefore, it can be seen that the LiFePO$_4$ nanopowder prepared in the present invention exhibits an excellent capacity approximate to the theoretical capacity.

Further, the LiFePO$_4$ nanopowder with addition of 4-mol % K, Ketjen black carbon, and polyvinylidene difluoride (PVDF) (KynarFlex 2801) were mixed in a weight ratio of 80:10:10. According to the same procedure, an electrode coating was prepared and then a test cell was assembled. Charge of the cell in this test was carried out by a constant current/constant voltage (CC/CV) charge method, at a charge current of 0.5 C, e.g. 80 mA/g and a voltage of 4.3 V. For a discharge test, output power characteristics obtainable upon rapid discharge were examined by application of various discharge currents to the test cell, using a conventional galvanostatic constant current (CC) method.

Figure 19:
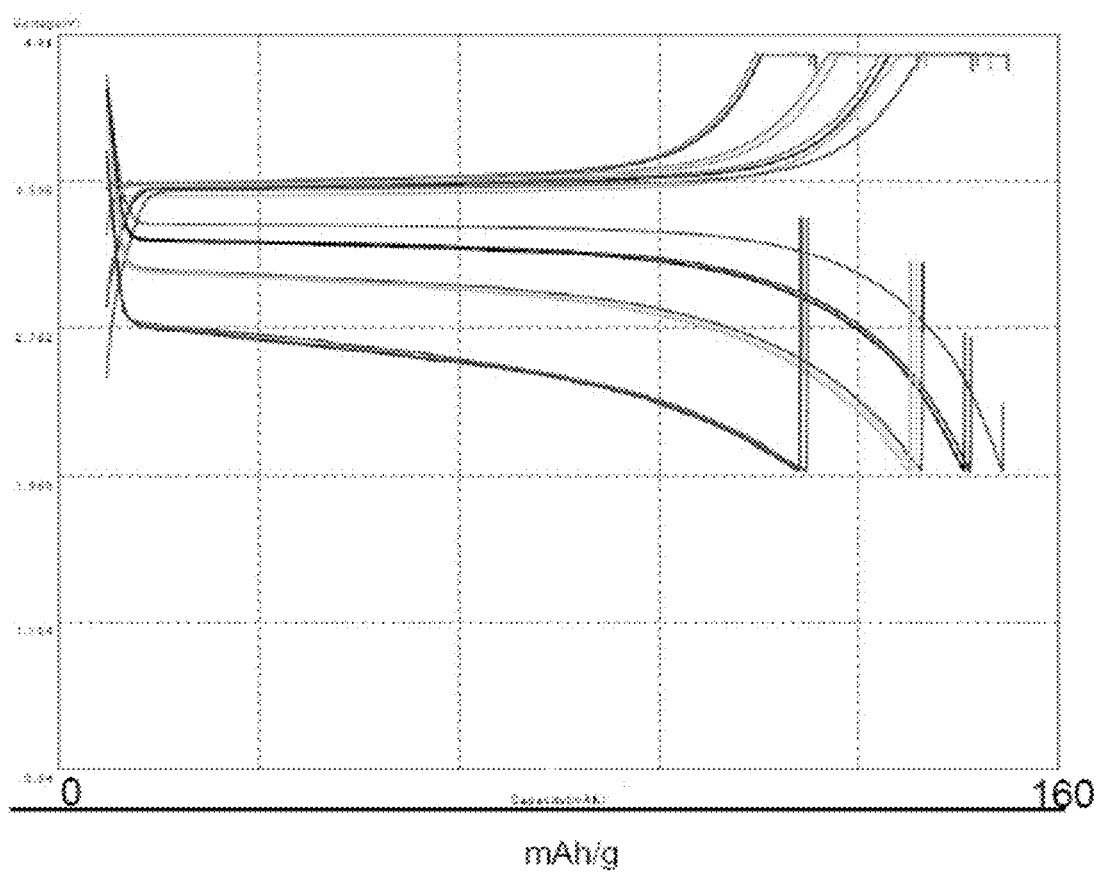
FIG. 19 is a graph showing cell test results for charge/discharge characteristics in Test Example 3, performed using nanoparticles of $LiFePO_4$ with addition of 4-mol % K prepared in Examples 1 and 3 of the present invention.

FIG. 19 shows the test results for charge/discharge characteristics of the battery cell, performed under various conditions, using the LiFePO$_4$ nanopowder with addition of 4-mol % K. As shown in FIG. 19, it can be seen that the cell exhibits about 150 mAh/g, similar to that shown by the previous test, under a sufficiently slow current discharge condition of 0.2 C, thus providing an excellent energy density. More importantly, it can be confirmed that the cell is capable of retaining a very high capacity of more than about 110 mAh/g even upon rapid discharge at a high current rate of more than 10 C. Therefore, these results directly indicate that the nanopowder of the present invention can be applied as a cathode material for a high-power lithium battery, due to the capability to discharge large amounts of current within a short period of time.

Figure 20:
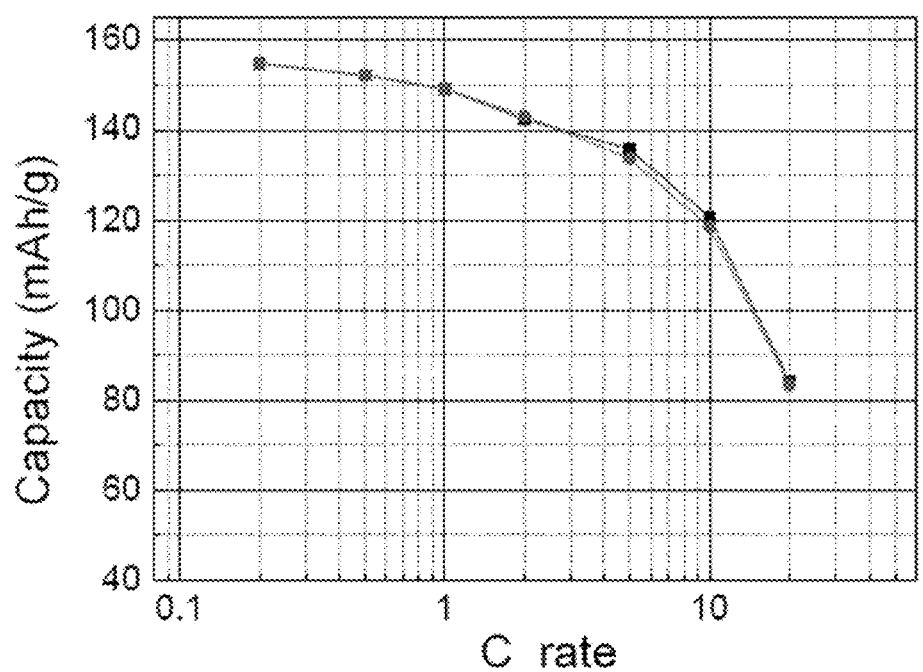
FIG. 20 is a graph showing changes in discharge capacity with various discharge rates, for results of a cell test performed using nanoparticles of $LiFePO_4$ with addition of 4-mol % Na prepared in Example 1 of the present invention.

FIG. 20 is a graph showing a discharge capacity of the battery with a varying discharge rate, obtained when a battery test was carried out in the same manner as above, using the 4-mol % Na-added LiFe$_{0.98}$PO$_4$ nanopowder. As shown in FIG. 20, the battery cell exhibited a high capacity of about 155 mAh/g corresponding to substantially the theoretical capacity, at a low discharge rate of 0.2 C and maintained an excellent discharge capacity of more than 80 mAh/g particularly even at a rapid discharge rate of 20 C. Upon calculation of a power density from the results at a discharge rate of 20 C on the basis of a lithium metal anode, it was confirmed that the battery cell exhibits a very high output power of more than 9,900 W/kg.

Accordingly, the present Test Example 3 demonstrates that the nanoparticles of lithium transition metal phosphate prepared in the present invention can be employed as a lithium battery cathode material capable of realizing excellent energy density and power density.

As illustrated above, it can be seen that the present invention enables easy and convenient production of nanoparticles of lithium transition metal phosphate having a uniform particle size of less than 100 nm at a low temperature of less than 500° C. within a short period of time of less than 5 hours, via a simple solid-state synthesis. In particular, the method of the present invention is a synthesis method which does not involve liquid-state raw materials or complicated and difficult coating processes and employs inexpensive solid salts, so it is advantageously possible to achieve industrial-scale production of a desired product. In addition, the nanoparticles of lithium transition metal phosphate thus synthesized have an excellent electrical conductivity and no anti-site intermixing defects between lithium ions and transition metal ions within crystal lattices, and therefore can advantageously exhibit excellent electrochemical performance. Therefore, upon practical application of the nanoparticles of the present invention as a cathode active material for a lithium ion secondary battery, it is possible to exert a high energy density due to an excellent discharge capacity. More importantly, it can be seen that it is possible to fabricate a battery having a very high power density, based on charge/discharge performance during a short period of time.

Next, lithium transition metal phosphates and a method of preparing the same according to the present invention will be described.

A method of preparing lithium transition metal phosphate according to the present invention includes, adding any one selected from the group consisting of an alkali element and an element that has a valence of 5$^+$ or any combination thereof to a solid salt including lithium, transition metals, and phosphorus as a starting material to produce a first intermediate material; subjecting the first intermediate to a first heat treatment at a temperature of approximately 250° C. to approximately 400° C. to produce a second amorphous material; and cooling the second intermediate material to room temperature, followed by a second heat treatment at a temperature of approximately 400° C. to approximately 800° C. to produce a final material in which the cation-distribution defect is locally clustered and the distribution has a 1D-oriented arrangement parallel to any one axis direction in the crystal.

The alkali element is preferably sodium (Na) or potassium (K), and the element that has a valence of $5^+$ is preferably niobium (Nb) or tantalum (Ta).

The starting material is preferably any one selected from the group consisting of carbonates, oxalates, acetates, and ammonium phosphates.

The carbonate may be lithium carbonate ($Li_2CO_3$), the oxalate may be $MC_2O_4(2H_2O)$, the acetate may be $M(CO_2CH_3)_2$, and the ammonium phosphate may be ammonium dihydrogen phosphate ($NH_4N_2PO_4$).

Any one element selected from the group consisting of Na, K, Nb, and Ta, or any combination thereof is preferably added to the starting material in an amount of less than 5 mol %.

The first intermediate material may have a stoichiometric composition of $(Li_{1-x}A_x)(M_{1-y}By)PO_4$ or $(LiA_x)(MB_y)PO_4$ (A or B=Na, K, Nb, Ta or any combination thereof, M=Fe, Mn, Co, Ni, Ti, Cu, or any combination thereof, $0<x\leq0.05$, and $0<y\leq0.05$).

The first and second heat treatments are preferably carried out under a gas atmosphere of any one selected from argon (Ar), nitrogen (N2), and carbon monoxide/carbon dioxide ($CO/CO_2$) at a flow rate of approximately 100 to approximately 500 cc/min.

It is preferred that an additive for Na includes sodium carbonate ($Na_2CO_3$), an additive for K includes potassium carbonate ($K_2CO_3$), and an additive for Nb includes $Nb(OCH_2CH_3)_5$. Further, an additive for Ta preferably includes $Ta(OCH_3CH_3)_5$ or $Ta(OCH_3)_5$.

The first and second heat treatments are preferably carried out for approximately 1 to approximately 10 hours. In particular, when the additive includes an alkali elements, the second heat treatment is more preferably carried out at a temperature of approximately 400° C. to approximately 700° C. for approximately 1 to approximately 10 hours. When the additive includes an element that has a valence of $5^+$, the second heat treatment is more preferably carried out at a temperature of approximately 500° C. to approximately 800° C. for approximately 2 to approximately 10 hours.

The lithium transition metal phosphate according to the present invention includes at least one selected from the group consisting of an alkali element or an element that have a valence of $5^+$, the cation-distribution defect is locally clustered in the crystal, and the distribution has a 1D-oriented arrangement parallel to any one axial direction in the crystal.

Preferably, the any one axis is crystallographically the b-axis.

At least one of the alkali element or the element that has a valence of $5^+$ is preferably 5 mol % or less.

Further, the crystal structure of the crystal is preferably an olivine structure.

Figure 22:
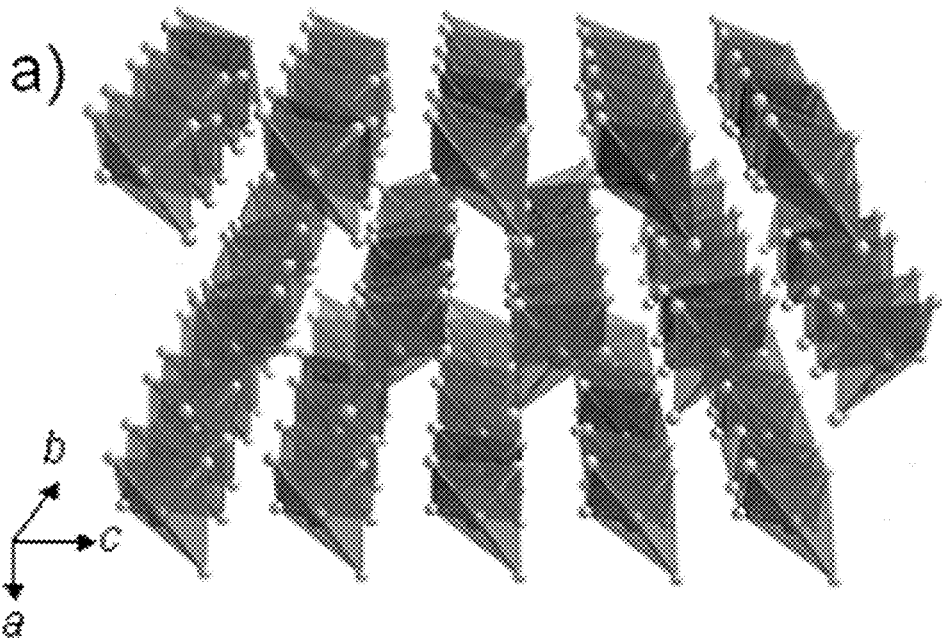
FIG. 22 shows a schematic diagram a) showing a typical cation-site defect distribution and a schematic diagram b) showing comparison with lithium transition metal phosphate prepared by a method according to the present invention, respectively.
Figure 22:
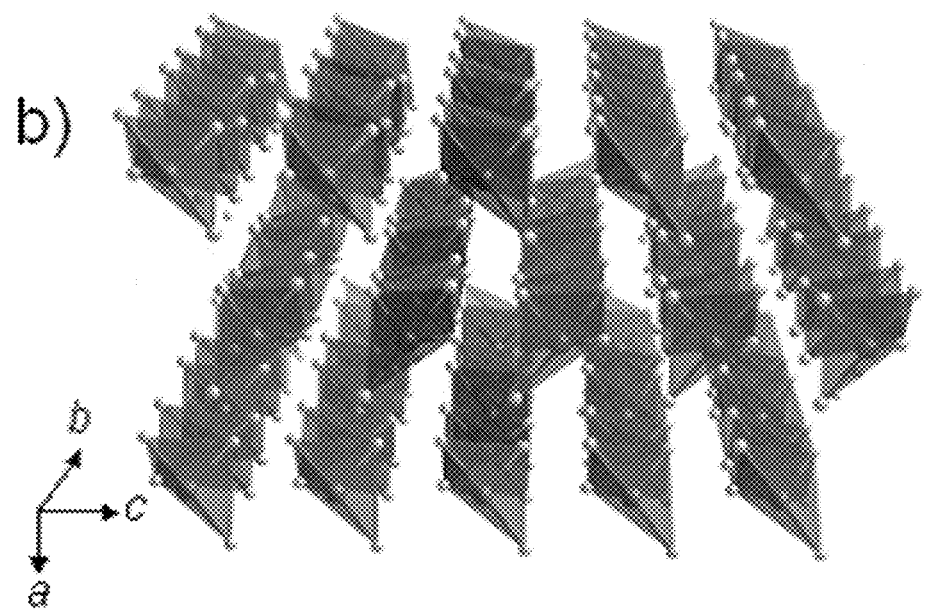

The present invention controls the anti-site defect distribution between Li ion in the M1 site and transitional metal ion (M) in the M2 site in the crystal lattice of lithium transition metal phosphate ($LiMPO_4$) having an ordered olivine structure, at the atomic level. More specifically, it is described schematically as in FIG. 22. That is, the anti-site defect distribution of transition metal (M) ion in the M1 site, substituted by Li ion is maximally inhibited, is maximally inhibited to prevent a formation of an irregular distribution in the crystal lattice, as shown in FIG. 22a). In particular, ions are clustered to be locally associated as shown in FIG. 22b), and at the same time the distribution is controlled to have a 1-D oriented arrangement parallel to any one axis direction, for example, the b-axis (y-axis) direction in the crystal.

Figure 31:
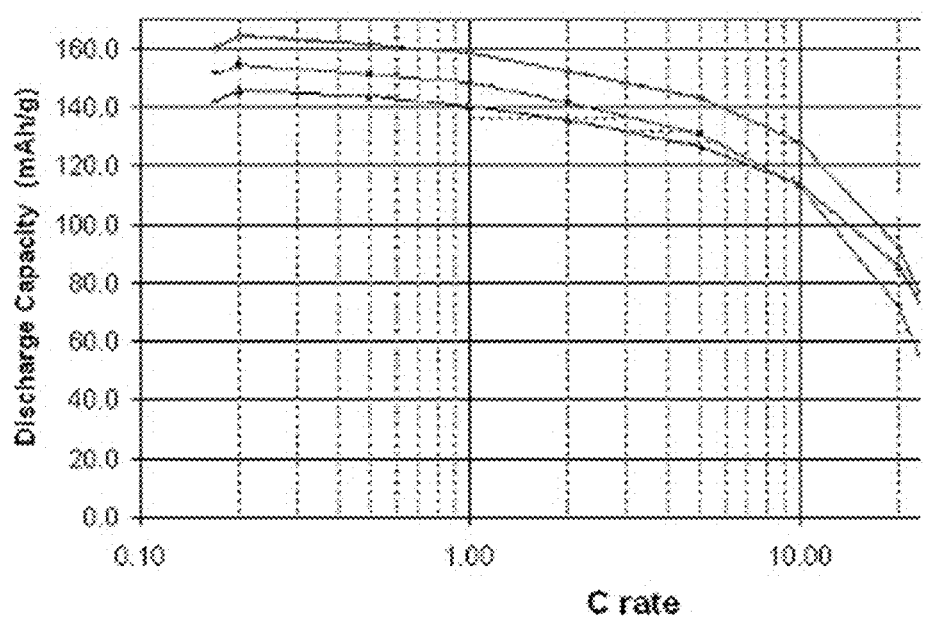
FIG. 31 is a graph showing changes in discharge capacity with various discharge rates, for results of three cell tests performed using nanoparticles of $LiFePO_4$ with addition of 4-mol % Na prepared in Example 5 of the present invention.
Figure 32:
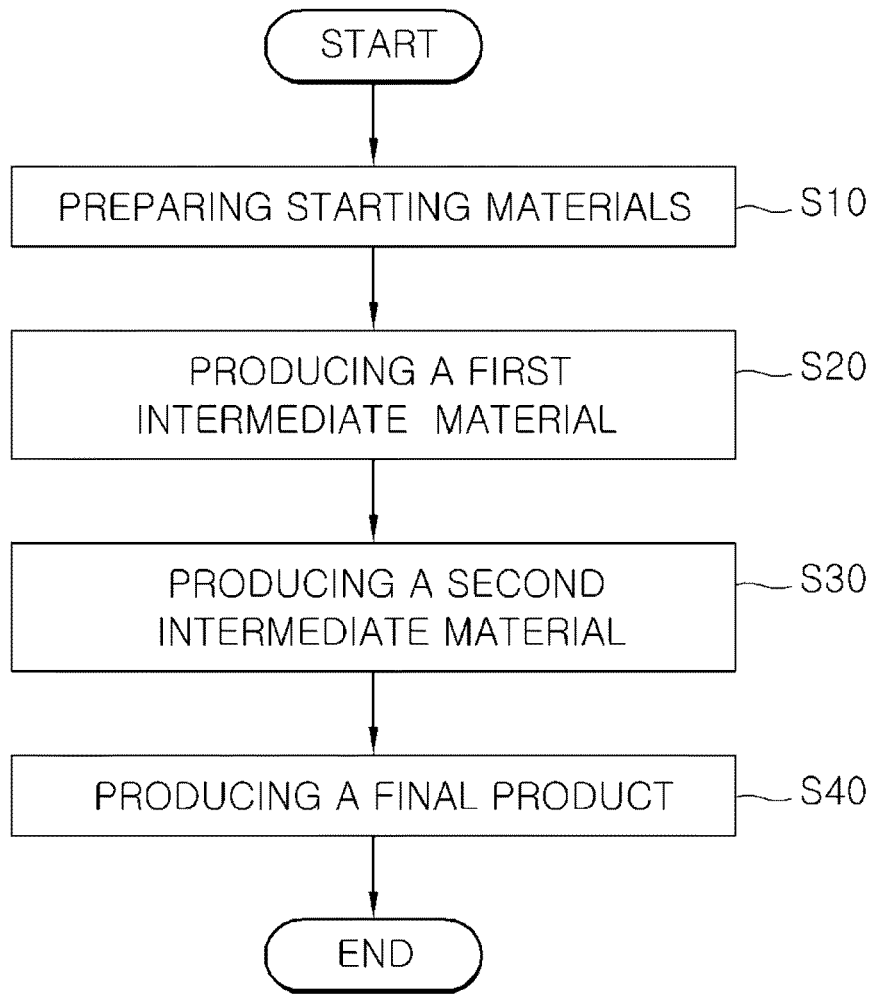
FIG. 32 is a flowchart showing a method for preparing lithium transition metal phosphate according to the present invention.

As shown in FIG. 31, a method of preparing lithium transition metal phosphate according to the present invention includes preparing a starting material (S10), producing a first intermediate material (S20), producing a second intermediate material (S30), and producing a final material (S40).

S10. Producing a Starting Material

In a preparation method of the present invention, solid state salts including lithium, transition metals, and phosphors are used as starting materials. In particular, the salt preferably includes, as a material of solid and a small amount of liquid, any one selected from the group consisting of carbonates, oxalates, acetates, and ammonium phosphates.

It is preferred that the carbonate includes lithium carbonate ($Li_2CO_3$), the oxalate includes $MC_2O_4(2H_2O)$, and the acetate includes $M(CO_2CH_3)_2$ (M=Fe, Mn, Co, Ni, Ti, Cu or any combination thereof). Further, the ammonium phosphate preferably includes ammonium dihydrogen phosphate ($NH_4H_2PO_4$).

S20. Producing a First Intermediate Material

A first intermediate material is produced by suction-mixing the starting materials and additives in acetone as a solvent and drying the mixture. Then, the additives include an alkali element such as K and Na, or an element that has a valence of 5+, such as Nb and Ta. Further, the additives may include a mixture of the elements.

The additive including Na is preferably sodium carbonate ($Na_2CO_3$), the additive including K is preferably potassium carbonate ($K_2CO_3$), and the additive that has a valence of 5+, including Nb and Ta, is preferably $Nb(OCH_2CH_3)_5$, $Ta(OCH_2CH_3)_5$, or $Ta(OCH_3)_5$. Further, an additive including any one selected from the group consisting of Na, K, Nb, and Ta, and any combination thereof is preferably added in an amount of 5 mol % or less to the starting material.

By adding the additives, the cation anti-stie defects between lithium (Li) and transition metals (M) in lithium transition metal phosphate ($LiMPO_4$) may grow a crystal arranged only in a 1D crystal orientation. Then, when the additive is present in an amount of more than 5 mol %, the arrangement of the cation anti-site defects between lithium and transition metals in the 1D crystal orientation is not effectively generated.

The first intermediate material has preferably an initial stoichiometric composition of $(Li_{1-x}A_x)(M_{1-y}By)PO_4$ or $(LiA_x)(MB_y)PO_4$. A or B is any one selected from the group consisting of an alkali element and an element that has a valence of $5^+$, or any combination thereof. In particular, it is any one element selected from the group consisting of Na, K, Nb, and Ta, or any combination thereof. Further, M is any one element selected from the group consisting of Fe, Mn, Co, Ni, Ti, and Cu, or any combination thereof, and $0<x\leq0.05$, and $0<y\leq0.05$.

S30. Producing a Second Intermediate Material

The first intermediate material is subjected to a first heat treatment at a temperature of approximately 250° C. to approximately 400° C. to produce a second amorphous material. Then, the first heat treatment is carried out under a gas atmosphere of any one selected from argon (Ar), nitrogen (N2), and carbon monoxide/carbon dioxide ($CO/CO_2$) at a flow rate of approximately 100 to approximately 500 cc/min. During the first heat treatment, carbon (C), hydrogen (H), oxygen (O) and ammonium (NH4) contained in starting materials, for example, carbonates, oxalates, and ammonium phosphates is decomposed to form an amorphous lithium transition metal phosphate.

When the heat treatment is performed at a temperature of less than 250° C., a chemical reaction is not effectively carried out. When the heat treatment is performed at 400° C. or higher for 10 hours or more, crystalline nuclei from the amorphous material are gradually formed, finally leading to formation of undesired large and coarse particles. Therefore, in order to suppress this, temperature and time must be controlled as above. The heat treatment is preferably controlled at a temperature of approximately 330° C. to approximately 350° C. for approximately 4 to approximately 6 hours. More preferably, the treatment is controlled at approximately 350° C. for approximately 5. Even when the first heat treatment is carried out for less than 1 hour, a chemical reaction is not effectively carried out. When the treatment is carried out for more than 10 hours, formation of undesired large and coarse particles occurs. Therefore, the first heat treatment is preferably carried out for approximately 1 to approximately 10 hours.

S40. Producing a Final Material

The second intermediate material is cooled to room temperature, a second heat treatment is performed at a temperature of approximately 400° C. to approximately 800° C. to produce a final material in which the cation defect distribution is locally clustered and the distribution has a 1D orientated arrangement parallel to any one axis direction in the crystal. Then, the second heat treatment is performed under the same atmosphere as in the first heat treatment. That is, the heat treatment is carried out under a gas atmosphere of any one selected from argon (Ar), nitrogen (N2), and carbon monoxide/carbon dioxide ($CO/CO_2$) at a flow rate of approximately 100 to approximately 500 cc/min. The temperature of approximately 400° C. to approximately 800° C. is the one necessary for production of crystalline nuclei from the amorphous state. For the same reason as in the first heat treatment, the second heat treatment is preferably carried out for approximately 1 to approximately 10 hours.

Through the second heat treatment, crystalline nuclei are produced from the amorphous phase, leading to growth of crystalline particles from the thus-formed crystalline nuclei. Then, lithium transition metal phosphate may be prepared by appropriately controlling the temperature and time of the second heat treatment so that the atomic level distribution of the anti-site defect may be arranged parallel to any one axis (for example, b-axis).

For example, when the additive includes an alkali element such as K and Na, the second heat treatment is preferably carried out at a temperature of approximately 400° C. to approximately 700° C. for approximately 1 to approximately 10 hours. When the additive includes an element that has a valence of $5^+$, such as Nb and Ta, the second heat treatment is preferably carried out at a temperature of approximately 500° C. to approximately 800° C. for approximately 2 to approximately 10 hours. The more detailed temperature and time conditions will be described later in the description of Examples.

An aspect of the present invention relates to a method for preparing lithium transition metal phosphate. Therefore, it is necessary to confirm whether the crystal lattice of the lithium transition metal phosphate prepared according to the present invention can be controlled through direct observation. For this purpose, the direct atomic-level observation for cation anti-site defects using a high-angle annular dark field (HAADF) scanning TEM imaging which is one of the most up-to-date electron microscopy techniques was carried out for confirmation of a 1D crystal orientation.

The high-resolution lattice image, which can be observed with conventional Transmission Electron Microscopy, may exhibit different lattice patterns even for the same specimen, depending upon a specimen thickness and a defocus length of an objective lens. Therefore, in order to correctly probe a position of atoms, an atomic-level observation should be made using Z-contrast STEM based on HAADF imaging which is one the most up-to-date analysis techniques.

This method literally shows the contrast of the image according to the atomic number, Z, and can identify crystal lattices at the atomic level, because a heavier atom, e.g, an atom with a higher atomic number, exhibits a brighter contrast.

Figure 21:
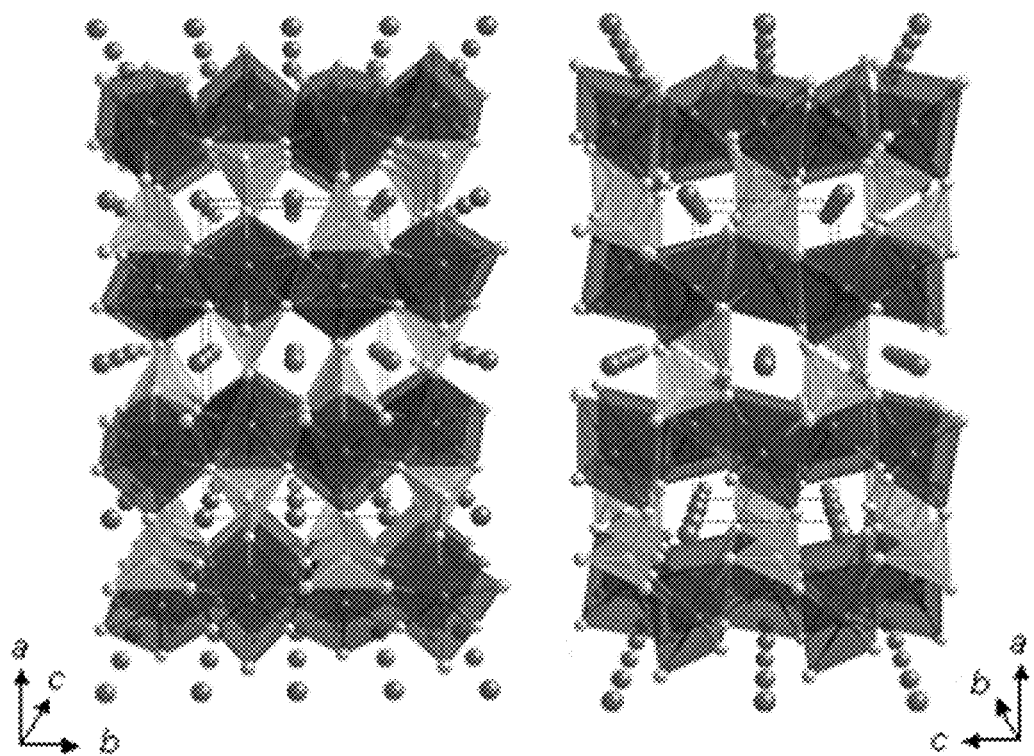
FIG. 21 is a schematic diagram showing the crystal structure of lithium transition metal phosphate.

Referring to FIG. 21, each of a) and b) is a schematic diagram showing the crystal structure of lithium transition metal phosphate in the direction projected parallel to the c-axis and b-axis, respectively. As shown in the drawing, lithium and iron ions are each well ordered in the M1 and M2 sites, respectively, resulting in an ordered olivine structure. Further, phosphorus (P) and oxygen (O) participate in the formation of a strong covalent bond to thereby result in a formation of a thermally and chemically very stable framework structure.

Lithium transition metal phosphate to be obtained by a preparation method of the present invention is shown in FIG. 22. For a rapid understanding, only an oxygen octahedron of the M1 site is shown in the crystal structure of lithium transition metal phosphate that has an ordered olivine structure. In lithium transition metal phosphate that has an ordered olivine structure as described above, diffusion of Li ions during the intercalation reaction occurs in the direction parallel to any one axis (for example, b-axis). That is, the migration of Li ions occurs 1-dimensionally. Therefore, an anti-site defect such as the presence of transition metal (M) in the M1 site where lithium (Li) should be positioned would interfere with the migration of lithium ions in the b-axis direction, and these defects must be controlled for maximal inhibition. When these defects are present, these should be clustered and maximally controlled to be locally distributed. FIG. 22a) shows a general case in which transition metal (M) is randomly positioned in the M1 site where Li should be present.

Unlike these, according to a method of the present invention, anti-site defects where transition metal (M) is positioned in the M1 site are locally positioned as shown in FIG. 22b). Therefore, the number of atomic columns to inhibit the migration of Li ions in the axis direction may be greatly decreased.

Further, the preparation method of the present invention is based on a solid phase reaction using a powder of a solid phase material which may be easily processed. When this solid phase reaction is directly observed at a corresponding high temperature using a TEM, characteristics completely different from a conventionally known crystallization behavior are observed. That is, amorphous lithium transition metal phosphate does not go through a direct phase transition into a crystal with an ordered olivine structure, but has a finally stable crystal structure after several phase transitions into metastable intermediate phases. This fact was confirmed through several experiments.

Figure 23:
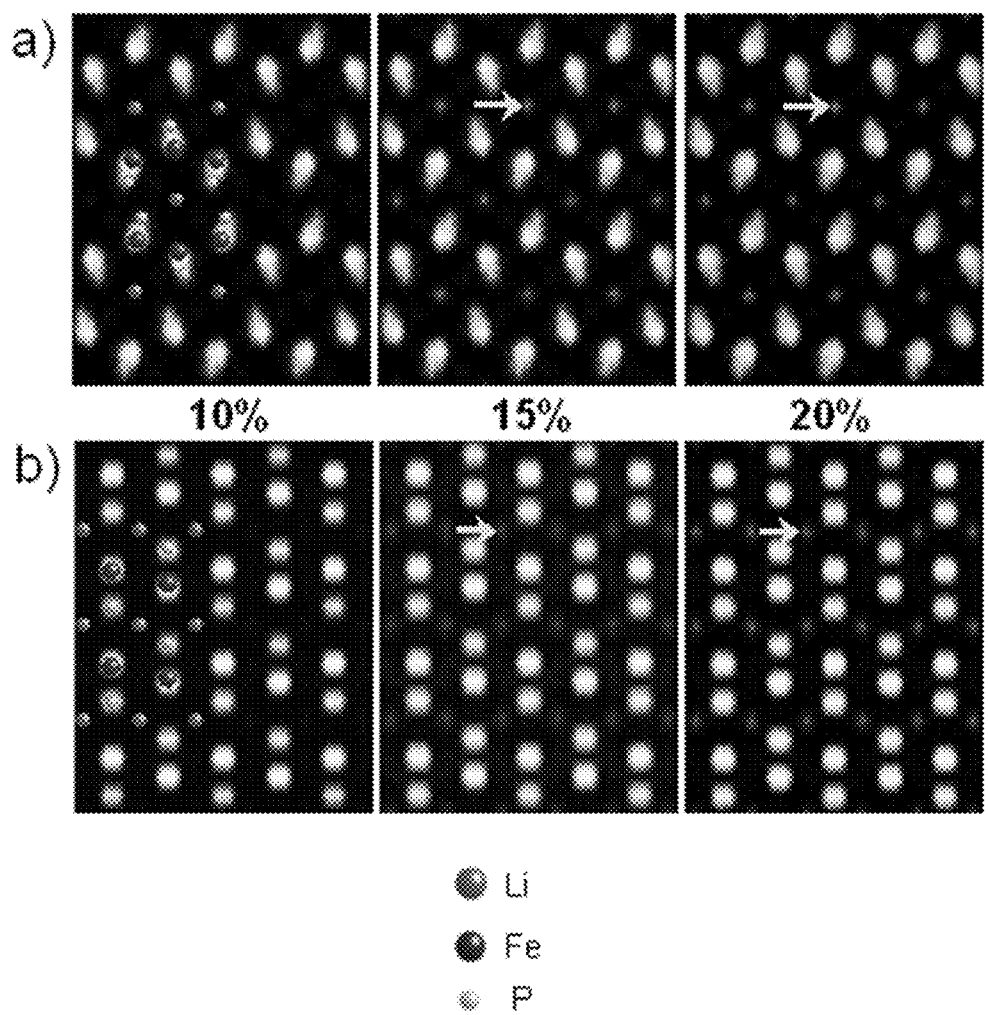
FIG. 23 is Z-contrast scanning transmission electron micrograph (STEM) images obtained in a computer simulation Example according to the present invention, showing comparison of image changes according to changes in anti-site defect.

FIG. 23 sequentially shows high temperature real-time TEM images confirming this fact. Therefore, in order to control the cation distribution inside the crystal so that atomic unit distribution of anti-site defects may be rapidly out of the intermediate phase crystal state and arranged parallel to any one axis (b-axis), it is important to select additive elements and temperature and time of heat treatment appropriately.

Most of the melting points of salts including an alkali metal ion such as $Na_2CO_3$ and $K_2CO_3$ are very low. Therefore, these additives serve to effectively react other material salts including lithium transition metals and phosphorus at a relatively low temperature of approximately 250° C. to approximately 400° C. during the first heat treatment. Because crystal particles grow around the uniformly formed crystal nuclei during the second heat treatment performed at higher temperatures, temperature and time of the heat treatment may be appropriately controlled to prepare lithium transition metal phosphate having a desired cation distribution from the amorphous phase. Further, it was found through several experiments that Na or K as well as Nb or Ta having a valence of $5^+$ shows the same effects.

Therefore, upon the first heat treatment, it is the most important to maintain and control the amorphous phase not to produce an undesirable intermediate particles. That is, additives including these alkali metal ions or metal ions that have a valence of $5^+$ reduce the melting points of the starting materials during the first heat treatment to easily become an amorphous state and serves to maximally suppress the phase transition into the intermediate crystal. Uniform production of crystal nuclei from the amorphous phase by the relatively high temperature second heat treatment enables preparation of lithium transition metal phosphate having an ordered olivine structure where the anti-site defects inside the crystal are arranged in one direction.

In particular, a recent study has reported that the formation energy for such random anti-site defects in $LiFePO_4$ is lower than the formation energy for other ionic vacancies (M. S. Islam, D. J. Driscoll, C. A. J. Fisher, and P. R. Slater, Chem. Mater., Vol. 17, p. 5085 (2005)). Thus, it can be seen that the anti-site defects are one of the most probably defects that may easily occur upon high-temperature heat treatment in $LiMPO_4$. If transition metal ions are positioned in the M' site where lithium ions are occupied when these crystals are used as cathode materials in the lithium-ion secondary batteries, the presence of transition metal ions on a migration path of lithium ions upon a charge/discharge reaction interferes with migration of lithium ions in the crystal lattice, which consequently decreases a discharge capacity and also inhibits rapid diffusion of lithium ions, thus deteriorating output power properties of the cells. However, by a method of preparing lithium transition metal phosphate according to the present invention, anti-site defects in the crystallographically 1D orientation are produced, enhancing discharge capacity and output power properties.

From the image of the $LiMPO_4$ prepared according to the present invention using high-angle annular dark field (HAADF) scanning transmission electron microscopy (STEM), it was confirmed that the anti-site defects have an arrangement in the 1D crystal orientation. In particular, it was also confirmed that even when particles are prepared to have a lithium ion:transition metal ion ratio of 1-x:1 or 1:1-x ($0<x<0.1$) as well as an exact stoichiometry of 1:1 in the initial composition of the product upon synthesis of the $LiMPO_4$, all the arrangements are controlled in the same manner. That is, it was found that even upon synthesis of nanoparticles starting from the ratio of lithium ion:transition metal ion which is not 1:1, there is no effect of such an ionic ratio on arrangement or size and electrochemical properties of final defects. Therefore, since nanoparticles will have a significantly broader range of a non-stoichiometric ratio due to no need for precise control of the cation ratio upon preparation of nanoparticles, it is possible to take a significant advantage associated with the convenience for synthesis of the nanoparticles.

Due to these various advantages, when such particles of the present invention are used as a cathode material for electrochemical cells such as lithium-ion secondary batteries, it is possible to obtain a charge/discharge capacity value approximate to a theoretical capacity of 160 mAh/g. Further, particles of the present invention can involve fast migration of lithium ions within the crystal lattices, and therefore can also exhibit excellent electrochemical properties capable of being charged/discharged within several minutes, i.e. a high power density.

Hereinafter, preferred embodiments of the present invention will be described in more detail with reference to the following Examples, Analysis Examples and Test Examples in conjunction with the accompanying drawings. These and other objects, advantages and features of the present invention will become apparent from the detailed embodiments given below which are made in conjunction with the following Examples.

For reference, the embodiments disclosed herein are provided only for helping those skilled in the art understand them which are embodied in different forms and should not be construed as limiting the scope and spirit of the present invention. It should be understood that various modifications, additions and substitutions are possible without departing from the scope and spirit of the invention, and other equivalent examples are possible.

As used herein, the term "C rate" means that measurement conditions are controlled upon performing a battery test, such that charge or discharge can be carried out for 1 hour. More generally, the term "C/n rate" means that current is controlled such that charge or discharge can be carried out for n hours.

Computer Simulation Example

In the computer simulation example, in order to confirm an ordered 1D crystal orientation of cation anti-site defects through the direct atomic-level observation using a high-angle annular dark field (HAADF) scanning TEM which is one of the most up-to-date electron microscopy techniques, results from direct observation of the anti-site defect distribution are compared with results theoretically predicted. Through this, it is confirmed that the method of preparing lithium transition metal phosphate according to the present invention has effects.

In the Computer Simulation Example, HAADF STEM images, which can be theoretically obtained in the crystal of lithium iron phosphate ($LiFePO_4$), were obtained using a computer simulation program based on a multislice method. Electrons contributing to the HAADF-STEM images were considered as scattering electrons at between 60 and 200 mrad. In particular, it was confirmed in the computer simulation example what kinds of changes can occur depending on various degrees of site exchanges between Li ions in the M1 site and Fe ions in the M2 site.

FIG. 23 shows simulation results performed in the Example. FIG. 23a) and FIG. 23b) show results of computer-simulated HAADF-STEM images projected in the [010] and [001] crystal orientations, respectively. Because the image brightness in these HAADF-STEM images is proportional to the square of the atomic number (Z) unlike that in conventional HRTEM, bright atomic columns directly indicate the position of the corresponding atom. Therefore, in the first projection image in FIG. 23a), Fe and P are so close with each other that they are expressed as one bright ellipse. In the first projection image in FIG. 23b), Fe and P are so displaced from each other that they may be differentiated. That is, brighter columns correspond to Fe while slightly darker columns correspond to P atomic columns. However, Li ions in both cases have such a small atomic number that Li atomic columns in the M1 site are not imaged but expressed as the black color in the background. In order to help the understanding at the atomic level, the corresponding atomic arrangement with respect to each projection was overlapped on the image.

In these HAADF-STEM images, when anti-site defects between Li and Fe were produced at a rate of 10%, 15%, and 20%, bright changes in image were computer-simulated. When anti-site defects are produced at 15% in both the projection directions as shown in FIG. 23, detectable bright contrasts may be observed in the atomic column of the Li site represented by an arrow. Therefore, when compared with real images experimentally obtained in the following Examples, it can be confirmed that Fe ions have an anti-site orientation.

Example 5

In Example 5, preparation examples of preparing LiFePO$_4$ having a starting composition of (Li$_{1-x}$A$_y$)FePO$_4$ or Li(Fe$_{1-x}$A$_y$)PO$_4$ (A=Na or K, $0 \leq x \leq 0.05$, and $0 < y \leq 0.05$) with addition of an alkali element such as K or Na and a cation defect distribution controlled at the atomic level will be described.

Starting material powders used for preparation of these were Li$_2$CO$_3$, FeC$_2$O$_4$(2H$_2$O)), and ammonium dihydrogen phosphate (NH$_4$N$_2$PO$_4$). The powders used as additives were K$_2$CO$_3$ and Na$_2$CO$_3$. Three starting material powders and additive powders were 99.5% pure or higher.

First, in order to synthesize LiFePO$_4$ powder with addition of K or Na, a powder of Li$_2$CO$_3$, FeC$_2$O$_4$(2H$_2$O) and NH$_4$H$_2$PO$_4$ in a constant molar ratio was prepared. Then, these materials in conjunction with zirconia ceramic balls were placed in a zirconia milling jar and wet-milled in an acetone (99.9% pure) solvent for approximately 24 hours, followed by grinding and mixing. Immediately after drying to completely remove the acetone solvent, the contents were placed and stored in a glove box filled with argon so as to prevent oxidation of the materials which may occur upon contact with the air. In particular, the mixed powders having different stoichiometric ratios of Li and Fe were prepared and compared to each other.

First, in order to synthesize LiFePO$_4$ powder with addition of 4-mol % K, a mixed powder of Li$_2$CO$_3$, FeC$_2$O$_4$(2H$_2$O) and NH$_4$H$_2$PO$_4$ in a molar ratio of 0.5:1:1 was prepared. Second, in order to synthesize LiFe$_{0.98}$PO4 powder with addition of 4-mol % K, a mixed powder of Li$_2$CO$_3$, FeC$_2$O$_4$(2H$_2$O) and NH$_4$H$_2$PO$_4$ in a molar ratio of 0.5:0.98:1 was prepared. Third, in order to synthesize LiFe$_{0.98}$PO$_4$ powder with addition of 4-mol % Na, a mixed powder of Li$_2$CO$_3$, FeC$_2$O$_4$(2H$_2$O) and NH$_4$H$_2$PO$_4$ in a molar ratio of 0.5:0.98:1 was prepared. Lastly, in order to synthesize Li$_{0.95}$FePO$_4$ powder with addition of 5-mol % Na, a mixed powder of Li$_2$CO$_3$, FeC$_2$O$_4$(2H$_2$O) and NH$_4$H$_2$PO$_4$ in a molar ratio of 0.475:1:1 was prepared.

In order to add 4- to 5-mol % K or Na to four mixed powders thus prepared, K$_2$CO$_3$ and Na$_2$CO$_3$ were used. According to the same procedure as in preparation of a pure LiFePO$_4$ powder, mixing, milling and drying processes were carried out and the powder mixtures were stored in a glove box filled with argon.

Then, each powder aggregate of four mixtures thus prepared was ground in the glove box using a mortar and pestle. Thereafter, each of the mixed powders was placed in an alumina crucible and subjected to first calcination at approximately 350° C. for approximately 2 to approximately 5 hours. In order to prevent oxidation of iron ions due to inflow of oxygen, the heat treatment was carried out with introduction of >99.9% pure argon gas at a flow rate of approximately 400 cc/min, thereby obtaining first synthetic powders.

The powders were subjected to the heat treatment at approximately 350° C., and then the powders were additionally ground for several minutes using a mortar and pestle in order to grind the aggregated materials and achieve more uniform distribution of the additives. Then, the thus-prepared powder was subjected to a second heat treatment at approximately 450° C. to approximately 500° C. for approximately 2 to approximately 10 hours with introduction of argon at the same flow rate of approximately 400 cc/min, as in the first calcination. The second heat treatment causes gradual formation of crystalline nuclei for a phase transition from an amorphous phase to a crystalline phase, followed by growth of crystals from the thus-formed crystalline nuclei. During this step, a crystal with a finally ordered olivine structure was prepared after metastable intermediate phases, and anti-site defects inside the crystal had a 1D orientation. Therefore, in order to inhibit inhomogeneous coarsening of unnecessary particles while minimizing a residual amount of the amorphous phase, it is preferable to carry out the heat treatment at a temperature below 500° C. for less than 10 hours.

In order to examine the concentration of the whole cation anti-site defects of lithium iron phosphate (LiFePO$_4$) crystal powder with addition of an alkali element such as K or Na obtained in the present Example 5, X-ray diffraction analysis and neutron diffraction experiments were performed. First, the formation of crystal particles with an ordered olivine structure was confirmed through X-ray diffraction analysis. The results were summarized in the following Table 6.

TABLE 6

| Composition | First calcination | Second heat treatment |
| --- | --- | --- |
| LiFe$_{0.98}$K$_{0.04}$PO$_4$ | 350° C., 8 h, Ar | 450° C., 4 h, Ar |
| LiFe$_{0.98}$K$_{0.04}$PO$_4$ | 350° C., 8 h, Ar | 500° C., 4 h, Ar |
| LiFe$_{0.98}$K$_{0.04}$PO$_4$ | 350° C., 8 h, Ar | 500° C., 10 h, Ar |
| LiFe$_{0.98}$Na$_{0.04}$PO$_4$ | 350° C., 8 h, Ar | 500° C., 10 h, 95N$_2$—5H$_2$ |
| LiFe$_{0.98}$Na$_{0.04}$PO$_4$ | 350° C., 2 h, Ar | 450, 3 h, Ar |
| LiFe$_{0.98}$Na$_{0.04}$PO$_4$ | 350° C., 2 h, Ar | 500, 2 h, Ar |
| Li$_{0.95}$Na$_{0.05}$FePO$_4$ | 350° C., 5 h, Ar | 450, 2 h, Ar |
| K$_{0.04}$LiFe PO$_4$ | 350° C., 5 h, Ar | 450, 2 h, Ar |

Scattering factors for X-ray on Li ions with a low atomic number are so low that the occupation factor for Li ion in any cation site in the corresponding crystal structure can not be exactly obtained. Therefore, using a neutron diffraction instead of X-ray, the occupation factors in the M1 and M2 sites of a crystal having an ordered olivine structure by Li and Fe was obtained by the Rietveld refinement method. For neutron diffraction analysis, a crystal powder of LiFePO$_4$ with addition of 4 mol % K was used. That is, mixed powder samples having an initial composition of K$_{0.04}$LiFePO$_4$ was subjected to first calcination at approximately 350° C. for approximately 5 hours, and then crystal powder samples were prepared after second treatment at approximately 450° C., approximately 600° C., and approximately 800° C., respectively. It was confirmed that all the three samples had LiFePO$_4$ crystals having an ordered olivine structure. In particular, the rate of anti-site defects where Fe is positioned in the Li site was calculated at 3% or less by the Rietveld refinement method, and as the temperature for the second heat treatment increases, the concentrations of these anti-site defects were significantly decreased. When a second heat treatment was performed at approximately 800° C., it was confirmed that the concentration of the anti-site defects was 1% or less, which was very low.

More importantly, it was confirmed that when lithium iron phosphate was prepared by mixing starting materials with addition of K or Na element as shown in the present Example, it was possible to control anti-site defects at the atomic level even without precise adjustment of the Li:Fe ratio to 1:1. Accordingly, there is a significantly broad non-stoichiometric margin in a chemical composition upon a practical manufacturing process, so advantageously it is possible to synthesize LiFePO$_4$ crystalline particles much more easily and conveniently.

Analysis Example 3

In connection with particles of the LiMPO$_4$ with addition of an alkali element, prepared by the process of the present invention, the present Analysis Example 3 is intended to present a direct atomic-level observation for an ordered arrangement between cations inside the crystal lattices, using a high-angle annular dark field (HAADF) technique. In particular, the present Analysis Example is intended to demonstrate at the atomic level that cation-site defects are well arranged at the 1D orientation within crystalline particles of the LiMPO$_4$ using HAADF-STEM images.

As the specimen for the HAADF-STEM examination, one of the powder samples prepared in Example 5 was used, That is, a powder sample of LiFePO$_4$ with addition of 4-mol % K subjected to the first calcination at approximately 350° C. for approximately 5 hours was put into a metal mold, and compacted into a disk having a diameter of 9 mm and a thickness of 1 mm. For the second heat treatment, the thus-prepared powder compact was sintered at approximately 600° C. under the same argon atmosphere for approximately 5 hours to thereby prepare polycrystalline samples having a homogeneous microstructure. Based on the typical TEM specimen preparation of polycrystalline samples, a sintered sample was ground up to a thickness of 100 μm and then ultrasonically cut into a disk having a diameter of 3 mm. The resulting disk samples were subjected to dimpling and finally ion-milling to thereby prepare a thin section for observation by STEM.

An atomic-level observation should be made using Z-contrast Scanning Transmission Electron Microscopy (STEM) based on HAADF imaging which can correctly probe a position of atoms. This method, literally, shows the contrast of the image according to the atomic number, Z because a heavier atom, e.g, an atom with a higher atomic number, exhibits a brighter contrast.

Figure 24:
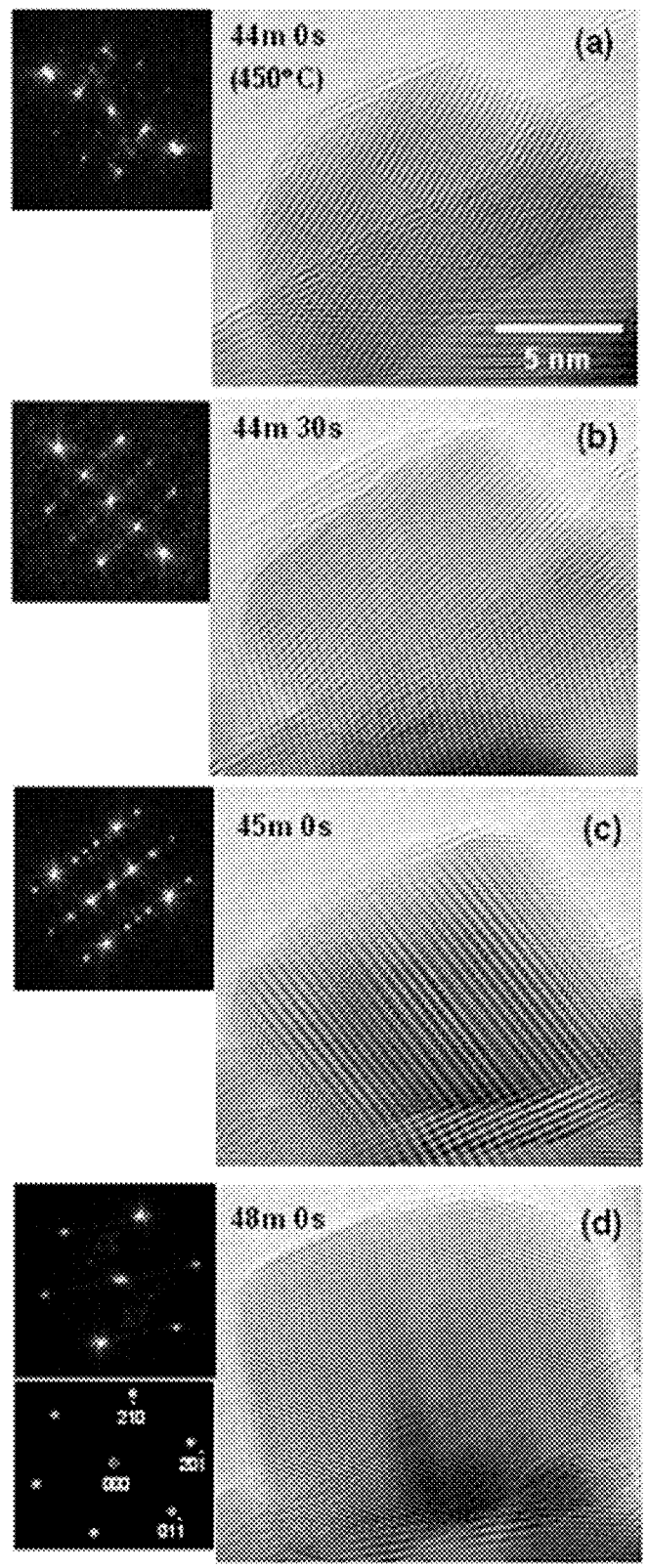
FIG. 24 shows high resolution transmission electron micrograph (TEM) images obtained continuously from a powder of $LiFePO_4$ with addition of 4-mol % K in real time at 450° C.

FIG. 24 shows a crystal lattice image of Z-contrast STEM taken using a HAADF mode imaging in the present Analysis Example. For better examination of an ordered arrangement of lithium and iron ions, the crystalline particle orientation was adjusted such that the [010] direction in the sample of polycrystalline lithium iron phosphate (LiFePO$_4$), i.e. b-axis, is projected perpendicular to the surface. For better indication of exact position of atoms, a schematic view of a crystalline lattice with respect to each projection was overlapped on the corresponding image.

It can be seen that the same image was obtained compared with FIG. 23a) shown in the Computer Simulation Example. That is, Li in the M1 site had a dark image because it had no contrast on the image due to the atomic number of 3 smaller than that of oxygen, while Fe in the M2 site has a bright diffraction image due to a very large atomic number of 26 of Fe.

The most remarkable fact in FIG. 24 showing a Z-contrast STEM lattice image is that it was possible to visualize Fe ions exchanged in the Li sites. Atomic columns in the Li sites as indicated by a solid line arrow exhibited a brighter contrast than other atomic columns. Therefore, it can be seen that at least 15% of Fe ions are exchanged and positioned in the sites compared with the results of the image computer simulation. Further, when Li ions are exchanged and positioned in the Fe sites as indicated by a broken line arrow, it can be seen that it is even possible to observe these anti-site defects at the atomic level from a rather diminished bright contrast.

In order to confirm a 1D orientation of cation anti-site defects inside the crystal lattice, HAADF-STEM lattice images of the [010] as well as the [001] projections were observed. FIG. 26a) and FIG. 26b) each show STEM images of the [010] and [001] projections, respectively. In the image in the [010] direction in FIG. 25a), some of atomic columns where Li was positioned exhibited a bright contrast as indicated by an arrow. Therefore, it is evident that there must be anti-site defects inside the crystal.

Figure 25:
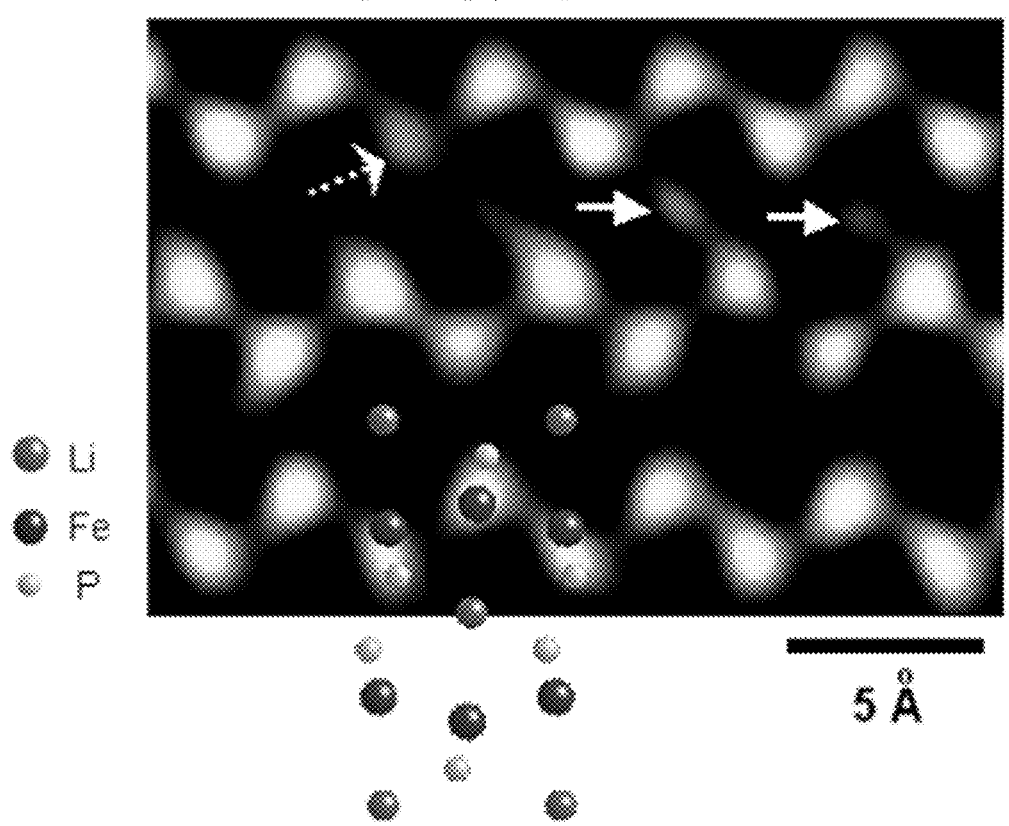
FIG. 25 shows a Z-contrast STEM image obtained from a crystal of $LiFePO_4$ with addition of 4-mol % K in the [010] projection.

However, when observed in the [001] projection in FIG. 25b), a bight contrast in the Li site was seldom found. The difference can be more clearly understood compared with the results shown in FIG. 23 in the Computer Simulation Example. That is, if Fe anti-site defects positioned in the Li sites are randomly arranged in 3D space, the same changes in bright contrast must be detected even when the defects are observed in any crystal direction. However, because these anti-site defects are 1-dimensionally arranged in any one axis (b-axis) direction, the concentration of Fe anti-site defects in the Li sites was relatively low as indicated in a schematic diagram in FIG. 22b) when the crystal was observed in the [001] projection. Therefore, changes in bright contrast according to these defects can not be detected on the image.

In conclusion, the present Analysis Example clearly demonstrates that the arrangement of Fe anti-site defects in the Li sites typically has a 1D orientation in the b-axis direction. Therefore, it can be seen that the method of preparing lithium transition metal phosphate according to the present invention is very effective.

Example 6

The present Example 6 is intended to describe a preparation example of particularly lithium iron phosphate where the defect distribution of the cation produced from a starting material of $(Li_{1-x}A_y)FePO_4$ (A is Nb or Ta, $0 \leq x \leq 0.05$, and $0 < y \leq 0.05$) among lithium transition metal phosphate (LiMPO$_4$) crystals with addition of Nb or Ta that has a valence of 5$^+$.

Starting material powders used for preparation of these were Li$_2$CO$_3$, FeC$_2$O$_4$(2H$_2$O), and NH$_4$H$_2$PO$_4$. The powders used as additives were Nb(OCH$_2$CH$_3$)$_5$, Ta(OCH$_3$CH$_3$)$_5$, or Ta(OCH$_3$)$_5$. Three starting material powders and additive powders were 99.5% pure or higher.

In order to synthesize LiFePO$_4$ powder with addition of Nb and Ta, mixed powders were prepared according to the same procedure as in Example 5. In particular, the mixed powders having different stoichiometric ratios of Li and Fe were prepared and compared to each other.

First, in order to synthesize Li$_{0.95}$FePO$_4$ powder with addition of 5-mol % Nb, a mixed powder of Li$_2$CO$_3$, FeC$_2$O$_4$ (2H$_2$O) and NH$_4$H$_2$PO$_4$ in a molar ratio of 0.475:1:1 was prepared. Second, in order to synthesize LiFePO$_4$ powder with addition of 4-mol % Nb, a mixed powder of Li$_2$CO$_3$, FeC$_2$O$_4$(2H$_2$O) and NH$_4$H$_2$PO$_4$ in a molar ratio of 0.5:1:1 was prepared. Third, in order to synthesize LiFe$_{0.97}$PO$_4$ powder with addition of 3-mol % Ta, a mixed powder of Li$_2$CO$_3$, FeC$_2$O$_4$(2H$_2$O) and NH$_4$H$_2$PO$_4$ in a molar ratio of 0.485:1:1 was prepared. Lastly, in order to synthesize Li$_{0.95}$FePO$_4$ powder with addition of 5-mol % Ta, a mixed powder of Li$_2$CO$_3$, FeC$_2$O$_4$(2H$_2$O) and NH$_4$H$_2$PO$_4$ in a molar ratio of 0.475:1:1 was prepared.

In order to add 3- to 5-mol % Nb or Ta to four mixed powders thus prepared, Nb(OCH$_2$CH$_3$)$_5$, Ta(OCH$_3$CH$_3$)$_5$, or Ta(OCH$_3$)$_5$ were used. According to the same procedure as in preparation of a pure LiFePO$_4$ powder in Example 5, mixing, milling and drying processes were carried out and the powder mixtures were stored in a glove box filled with argon.

Then, each powder aggregate of four mixtures thus prepared was again ground in the glove box using a mortar and pestle. Thereafter, each of the mixed powders was placed in an alumina crucible and subjected to first calcination at approximately 350° C. for approximately 2 to approximately 5 hours. In order to prevent oxidation of iron ions due to inflow of oxygen, the heat treatment was carried out with introduction of >99.9% pure argon gas at a flow rate of approximately 400 cc/min, thereby obtaining first synthetic powders.

The powders were subjected to the heat treatment at 350° C., and then the powders were additionally ground for several minutes using a mortar and pestle in order to grind the aggregated materials and achieve more uniform distribution of the additives. Then, the thus-prepared powder was subjected to a second heat treatment at approximately 600° C. to approximately 800° C. for approximately 2 to approximately 10 hours with introduction of argon at the same flow rate of approximately 400 cc/min, as in the first calcination. The second heat treatment causes gradual formation of crystalline nuclei for a phase transition from an amorphous phase to a crystalline phase, followed by growth of crystals from the thus-formed crystalline nuclei. During this step, a crystal with a finally ordered olivine structure was prepared after metastable intermediate phases, and anti-site defects inside the crystal had a 1D orientation.

Therefore, in order to inhibit inhomogeneous coarsening of unnecessary particles while finally minimizing a residual amount of the amorphous phase, it is preferable to carry out the heat treatment at a temperature below 800° C. for less than 10 hours.

Heat treatment conditions for a 1D distribution control of cation anti-site defects in crystal powder of lithium iron phosphate with addition of an alkali element such as Nb or Ta obtained in the present Example 6 are summarized in the following Table 7.

TABLE 7

| Composition | First calcination | Second sintering |
|---|---|---|
| Nb$_{0.05}$Li$_{0.95}$FePO$_4$ | 350° C., 5 h, Ar | 800° C., 2 h, Ar |
| Nb$_{0.04}$LiFePO$_4$ | 350° C., 5 h, Ar | 750° C., 10 h, Ar |
| Ta$_{0.03}$Li$_{0.97}$FePO$_4$ | 350° C., 5 h, Ar | 800° C., 6 h, Ar |
| Ta$_{0.05}$Li$_{0.95}$FePO$_4$ | 350° C., 5 h, Ar | 700° C., 8 h, Ar |

Results of specific defect distribution at a 1D orientation at the atomic level will be described in the following Analysis Example 4. It was confirmed that when lithium iron phosphate was prepared by mixing starting materials with addition of an element such as Nb or Ta, it was possible to control anti-site defects at the atomic level even without precise adjustment of the Li:Fe ratio to 1:1. Accordingly, there is a significantly broad non-stoichiometric margin in a chemical composition upon a practical manufacturing process, so advantageously it is possible to control the defects inside the crystal much more easily and conveniently.

Analysis Example 4

In connection with particles of the LiMPO$_4$ with addition of an element that has a valence of 5$^+$, prepared by the process of the present invention, the present Analysis Example 4 is intended to present a direct atomic-level observation for an ordered arrangement between cations inside the crystal lattices, using a high-angle annular dark field (HAADF) technique. In particular, the present Analysis Example is intended to directly demonstrate at the atomic level that cation-site defects are well ordered in a 1D orientation within crystalline particles of the LiMPO$_4$ using HAADF-STEM images.

As the specimen for the HAADF-STEM examination, one of the powder samples prepared in Example 5 was used, That is, a powder sample of LiFePO$_4$ with addition of 4-mol % Nb subjected to the first calcination at approximately 350° C. for approximately 5 hours was put into a metal mold, and compacted into a disk having a diameter of 9 mm and a thickness of 1 mm. For the second heat treatment, the thus-prepared powder compact was subjected to a heat treatment at approximately 750° C. under the same argon atmosphere for approximately 5 hours to thereby prepare polycrystalline samples having a homogeneous microstructure. Based on the typical TEM specimen preparation of polycrystalline samples, the sintered polycrystalline sample was ground up to a thickness of 100 μm and then ultrasonically cut into a disk having a diameter of 3 mm. The resulting disk samples were subjected to dimpling and finally ion-milling to thereby prepare a thin section for observation by STEM.

Figure 26:
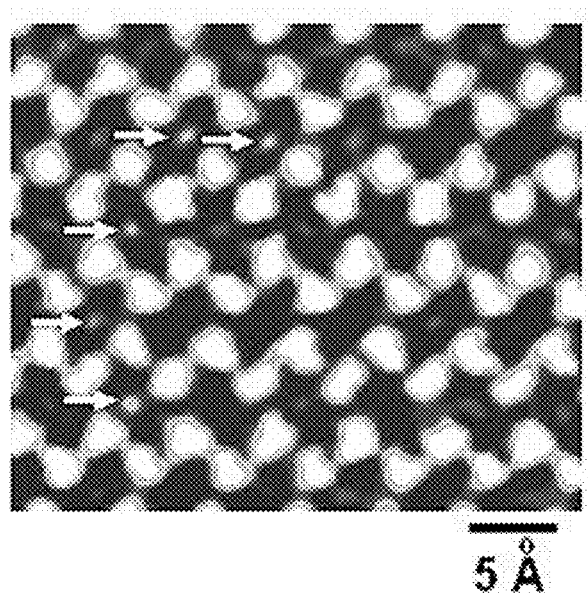
FIG. 26 is a group of Z-contrast scanning transmission electron micrograph (STEM) images obtained from a crystal of $LiFePO_4$ with addition of 4-mol % K prepared in Example 5 according to the present invention in the [010] and [001] projections, respectively, showing brightness contrast differences by 1D anti-site defects.
Figure 26:
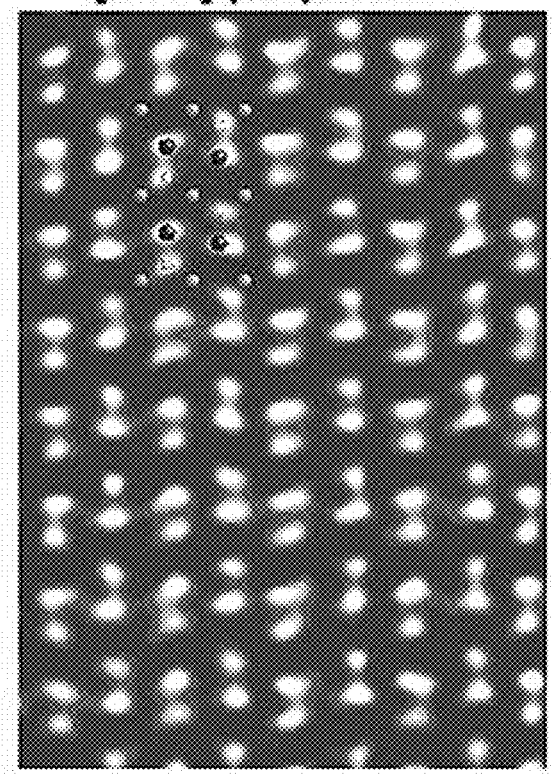

FIG. 26 shows a crystal lattice image of Z-contrast STEM taken using a HAADF mode in the Analysis Example. For better examination of an ordered arrangement of lithium and iron ions in FIG. 26a), the crystalline particle orientation was adjusted such that the [010] projection in the sample of polycrystalline lithium iron phosphate (LiFePO$_4$), i.e. b-axis, is projected perpendicular to the surface. In FIG. 26b), the crystal particle orientation was coordinated and observed such that the [001] projection, that is, the c-axis may be perpendicular to the surface. For better indication of exact position of atoms, a schematic view of a crystalline lattice with respect to each projection was overlapped on the corresponding image.

It can be seen that both the images had the same results as the computer simulation images compared with FIG. 23 shown in the previously-described Computer Simulation Example. That is, Li in the M1 site had a dark image because it had no contrast on the image due to the atomic number of 3 smaller than that of oxygen, while Fe in the M2 site had a bright diffraction image due to a very large atomic number of 26. Further, it was confirmed through energy dispersive spectroscopy (EDS) that the added Nb ion was introduced for substitution inside the crystal lattice.

Figure 27:
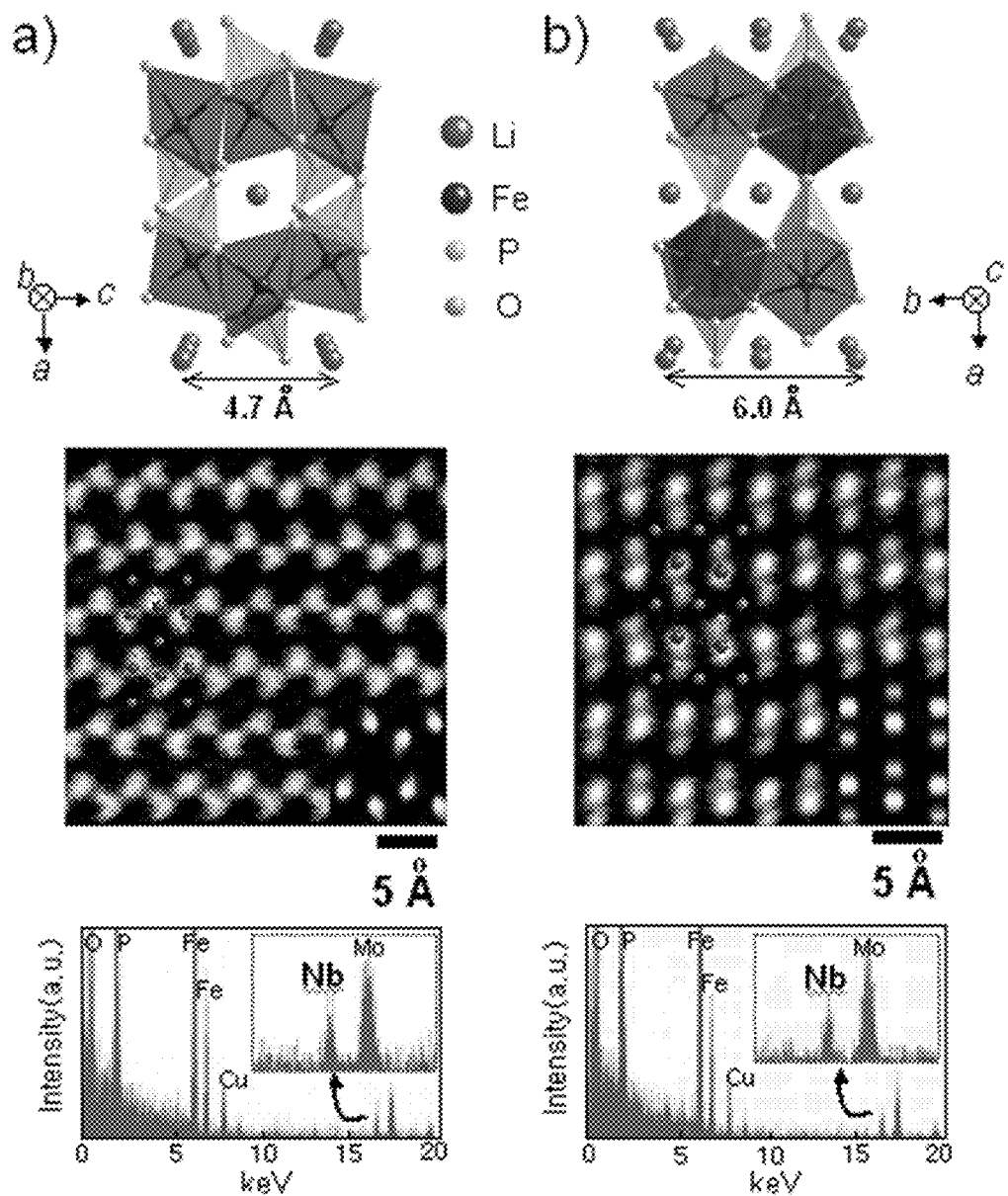
FIG. 27 shows Z-contrast scanning transmission electron micrograph (STEM) images obtained from a crystal of $LiFePO_4$ with addition of 4-mol % Nb prepared in Example 6 by the present invention in the [010] and [001] projections, schematic diagrams of the crystal structure, and results of EDS composition analysis.

In order to confirm a 1D orientation of the cation anti-stie defects inside the crystal lattice, HAADF-STEM lattice images of the [010] as well as the [001] projections were observed in the same manner as in the Analysis Example 3. FIG. 27a) and FIG. 27b) each show STEM images of the [010] and [001] projections, respectively. In the image in the [010] direction in FIG. 25a), some of atomic columns where Li was positioned exhibited a bright contrast. Therefore, it can be seen that there must be anti-site defects inside the crystal. However, when observed in the [001] projection in FIG. 27b), a bight contrast in the Li site was seldom found. The difference can be more clearly understood when compared with the results shown in FIG. 23 in the Computer Simulation Example. That is, if Fe anti-site defects positioned in the Li sites are randomly arranged in 3D space, the same changes in bright contrast must be detected even when the defects are observed in any crystal direction. However, because these anti-site defects are 1-dimensionally arranged in any one axis (b-axis) direction, the concentration of Fe anti-site defects in the Li sites was relatively low as indicated in a schematic diagram in FIG. 22b) when the crystal was observed in the [001] projection. Therefore, changes in bright contrast according to these defects can not be detected on the image.

In conclusion, the present Analysis Example very clearly demonstrates that the arrangement of Fe anti-site defects in the Li sites typically has a 1D orientation in the b-axis direction. Therefore, it can be seen that the method of preparing lithium transition metal phosphate where the cation defect distribution according to the present invention is controlled at the atomic level is very effective.

Figure 28:
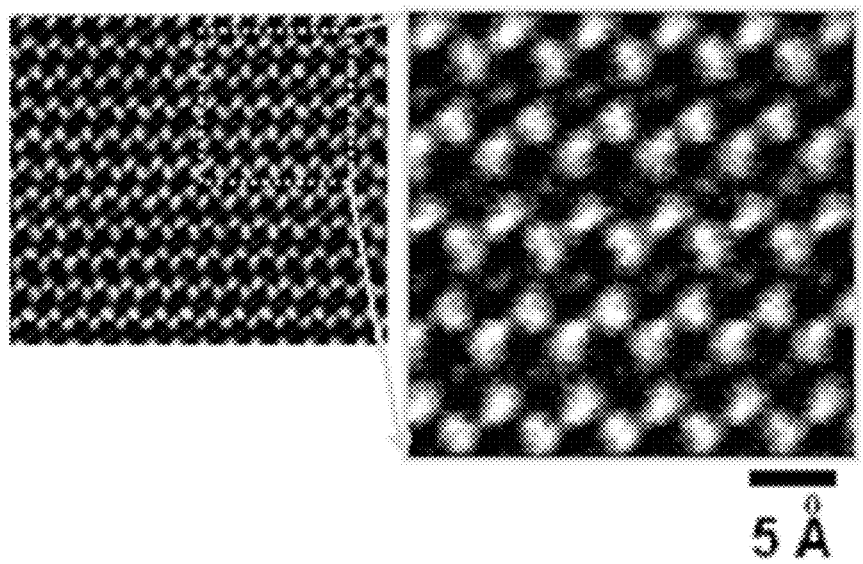
FIG. 28 is a group of Z-contrast scanning transmission electron micrograph (STEM) images obtained from a crystal of $LiFePO_4$ with addition of 4-mol % Nb prepared in Example 6 according to the present invention in the [010] and [001] projections, respectively, showing brightness contrast differences by 1D anti-site defects.
Figure 28:
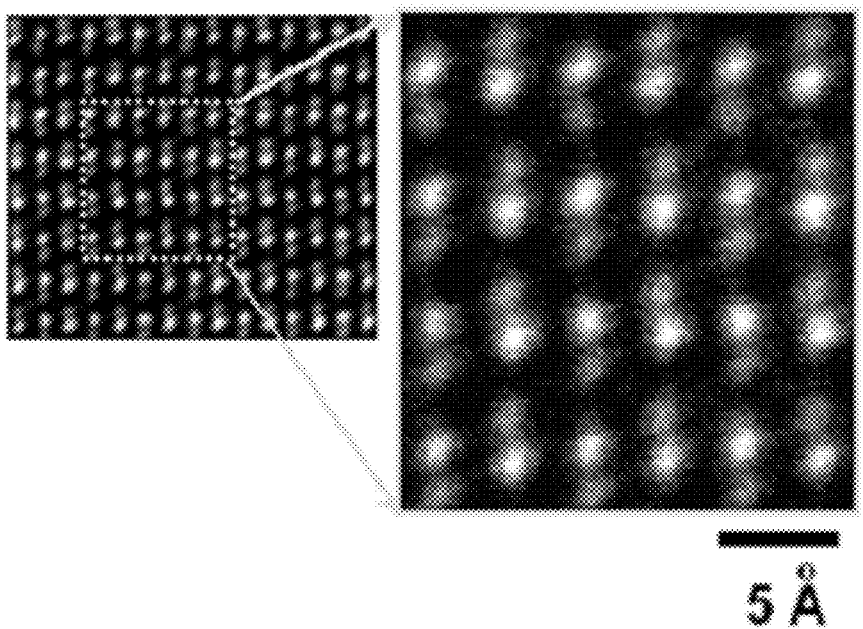

FIG. 28 is a schematic diagram of a 1D arrangement of crystal defects implemented by the present invention, showing lithium transition metal phosphate according to the present invention.

Lithium transition metal phosphate according to the present invention includes at least one of an alkali element or an element that has a valence of $5^+$, and anti-site defects between Li and transition metal inside the crystal are locally clustered to be distributed in a 1D oriented arrangement parallel to any one axis direction. Then, the any one axis is, for example, crystallographically the b-axis.

Example 7

In addition to Examples 5 and 6, a preparation example of lithium transition metal phosphate including other transition metals such as manganese and cobalt besides iron will be described. That is, lithium transition metal phosphate produced from a starting material of $(Li_{1-x}A_y)FePO_4$ with addition of an alkali element such as K or Na, or an element such as Nb and Ta (A is K, Na, Nb, or Ta, M is Fe, Mn, Co, or any combination thereof, $0 \leq x \leq 0.1$, and $0 < y \leq 0.1$) will be also described.

Starting material powders used for preparation of these were $Li_2CO_3$, $FeC_2O_4(2H_2O)$, and $NH_4H_2PO_4$ as in Examples 5 and 6. $MnC_2O_4(2H_2O)$ and $CoC_2O_4(2H_2O)$ were used as source materials of Mn and Co, respectively. Further, the powder used as an additive was $K_2CO_3$. The starting material powders and the additive powder were all 99.5% pure or higher.

In the present Example, nanocrystalline particles of lithium metal phosphates each with addition of 5-mol % K and containing a different transition metal, e.g. $Li_{0.95}FePO_4$, $Li_{0.95}MnPO_4$, and $Li_{0.95}CoO_4$, were synthesized. For this purpose, mixed powders were prepared according to the same procedure as in Examples 5 and 6. First, in order to synthesize a $Li_{0.95}FePO_4$ powder with addition of 5-mol % K, a mixed powder of $Li_2CO_3$, $FeC_2O_4(2H_2O)$ and $NH_4H_2PO_4$ in a molar ratio of 0.475:1:1 was prepared. Second, in order to synthesize a $Li_{0.95}MnPO_4$ powder with addition of 5-mol % K, a mixed powder of $Li_2CO_3$, $MnC_2O_4(2H_2O)$ and $NH_4H_2PO_4$ in a molar ratio of 0.475:1:1 was prepared. Third, in order to synthesize a $Li_{0.95}CoO_4$ powder with addition of 5-mol % K, a mixed powder of $Li_2CO_3$, $CoC_2O_4(2H_2O)$ and $NH_4H_2PO_4$ in a molar ratio of 0.475:1:1 was prepared. As exhibited in the Examples, a decrease in an amount of added lithium leads to a decrease in a size of crystal grains. Therefore, a non-stoichiometry of lithium was appropriately adjusted to a value of 0.95 to thereby achieve formation and growth of nuclei having a uniform particle size during the heat treatment process.

Then, three mixed powders thus prepared in conjunction with zirconia ceramic balls were placed in a zirconia milling jar and wet-milled in an acetone (99.9% pure) solvent for approximately 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of three mixtures thus prepared was ground in the glove box using a mortar and pestle, in the same manner as in Examples 5 and 6. Thereafter, each of the mixed powders was placed in an alumina crucible and subjected to first calcination at approximately 350° C. for approximately 5 hours. In order to prevent oxidation of Fe, Mn or Co ions due to inflow of oxygen, the heat treatment was carried out with introduction of >99.9% pure argon gas at a flow rate of approximately 400 cc/min, thereby obtaining a first synthetic powder.

The starting materials were subjected to the first heat treatment at approximately 350° C., and then the aggregated materials were ground. In order to achieve more uniform distribution of the additives, this was followed by additional grinding for several minutes using a mortar and pestle. Then, the thus-prepared powder was subjected to a second heat treatment at a temperature of approximately 450° C. for approximately 1 to approximately 2 hours with introduction of argon at the same flow rate of approximately 400 cc/min, as in the first calcination.

Heat treatment conditions for various kinds of crystalline particle powders prepared in the present Example 7 are summarized in the following Table 8.

TABLE 8

| Composition | First calcination | Second heat treatment |
| --- | --- | --- |
| $Li_{0.95}Na_{0.05}FePO_4$ | 350° C., 5 h, Ar | 450° C., 2 h, Ar |
| $Li_{0.95}Na_{0.05}CoPO_4$ | 350° C., 5 h, Ar | 450° C., 1 h, Ar |
| $Li_{0.95}Na_{0.05}MnPO_4$ | 350° C., 5 h, Ar | 450° C., 2 h, Ar |
| $LiMn_{0.95}Na_{0.05}PO_4$ | 350° C., 8 h, Ar | 500° C., 2 h, Ar |
| $LiCo_{0.98}Na_{0.04}PO_4$ | 350° C., 2 h, Ar | 450° C., 3 h, Ar |

Test Example 4

Electrochemical performance was measured for lithium transition metal phosphates prepared according to the present invention. More specifically, charge/discharge characteristics were tested for applicability of the lithium transition metal phosphate as a cathode material for a lithium ion secondary battery. The results show through Test Example 4 that crystal particles of lithium transition metal phosphate prepared in the present invention have a high energy density as well as an excellent power density.

In order to measure electrochemical charge/discharge characteristics in the present Test Example 4, $LiFePO_4$ crystal powder with addition of 4-mol % Na and $LiFePO_4$ crystal powder with addition of 4-mol % K were selected from powder samples prepared in previous Examples.

First, in order to fabricate an electrode, the $LiFePO_4$ crystal powder with addition of 4-mol % Na, Ketjen black carbon, and polyvinylidene difluoride (PVDF, KynarFlex 2801, Elf Atochem) were mixed in a weight ratio of 80:10:10. N-methyl-2-pyrrolidone (NMP) was used as a solvent. In order to ensure homogeneous mixing, the materials were mixed using a mixer equipped with a homogenizer rotating at approximately 3000 rpm. The resulting slurry was applied to aluminum foil, and dried in a vacuum oven to thereby prepare a cathode coating.

Fabrication of a cell for a battery test was carried out by a conventional method known in the art. A lithium metal foil was used as an anode and Celgard 2400 (Hoechst Celanese Corp.) as a separator was disposed between the cathode and the anode. As an electrolyte, a mixed solution of ethylene carbonate (EC) and diethyl carbonate (DEC) or dimethyl carbonate (DMC) containing 1 M $LiPF_6$ was used.

Further, the $LiFePO_4$ crystal powder with addition of 4-mol % K, Ketjen black carbon, and polyvinylidene difluoride (PVDF) (KynarFlex 2801) were mixed in a weight ratio of 80:10:10. According to the same procedure, an electrode coating was prepared and then a test cell was assembled. Charge of the cell in this test was carried out by a constant current constant voltage (CCCV) charge method, at a charge current of approximately 0.5 C, e.g. approximately 80 mA/g and a voltage of approximately 4.3 V. For a discharge test, output power characteristics obtainable upon rapid discharge were examined by application of various discharge currents to the test cell, using a conventional galvanostatic constant current (CC) method.

Figure 29:
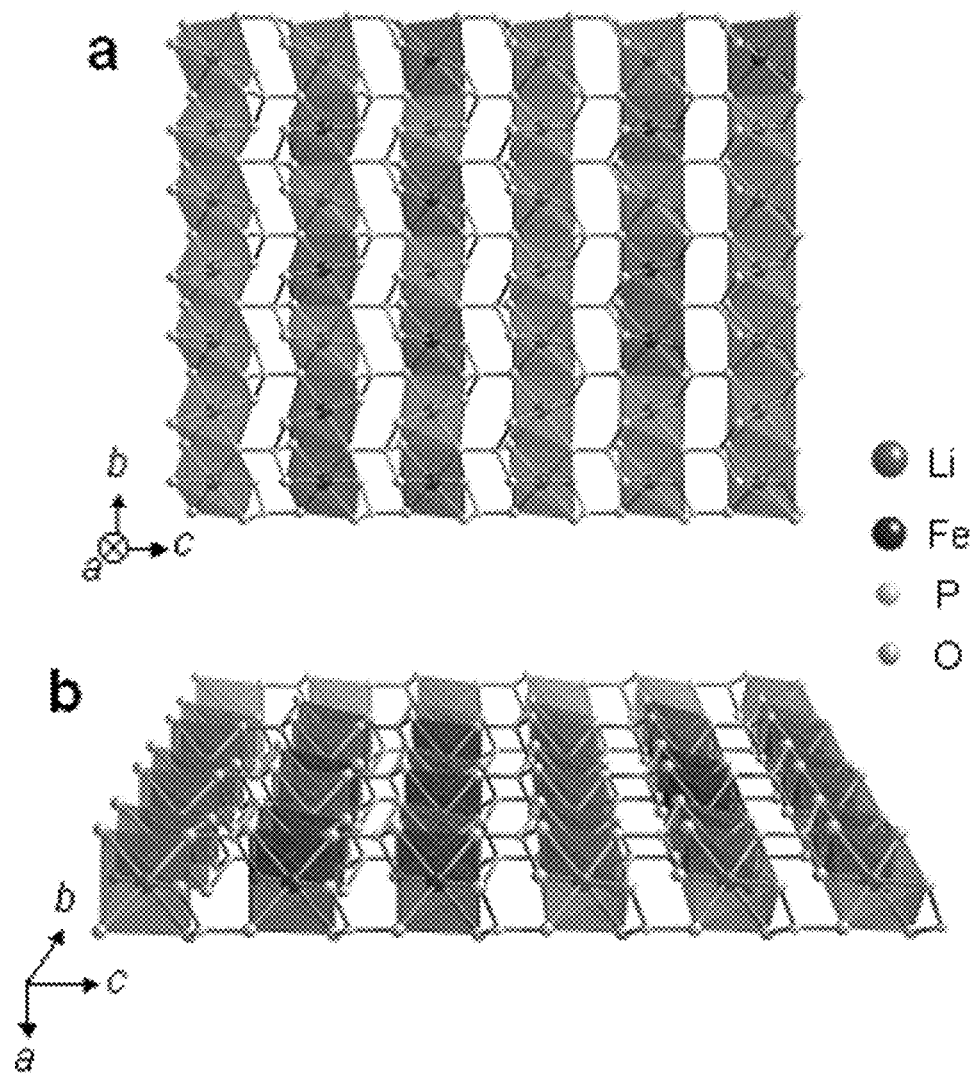
FIG. 29 is a group of schematic diagrams showing a 1D arrangement for cation anti-site defects, analyzed in Analysis Examples 3 and 4 according to the present invention.

FIG. 29 shows the test results for charge/discharge characteristics of the battery cell, performed under various conditions from low currents, e.g. approximately 0.2 C to high currents, e.g. approximately 5 C, approximately 10 C, and approximately 20 C, using the $LiFePO_4$ nanopowder with addition of 4-mol % K in this way. It can be seen that the cell exhibits about 150 mAh/g, similar to that shown by the previous test, under a slow current discharge condition of a sufficiently low current, e.g. approximately 0.2 C, thus providing an excellent energy density. More importantly, it can be confirmed that the cell is capable of retaining a very high capacity of more than about 110 mAh/g even upon rapid discharge at a high current rate of more than 10 C. Therefore, these results directly indicate that the nanopowder of the present invention can be applied as a cathode material for a high-power lithium battery, due to the capability to discharge large amounts of current within a short period of time.

Figure 30:
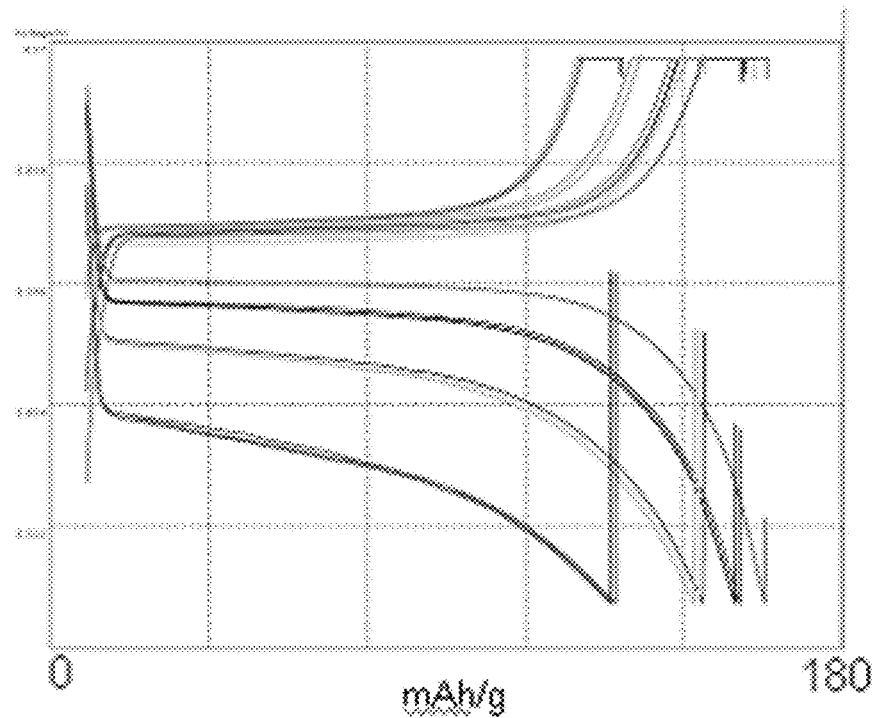
FIG. 30 is a graph showing cell test results for charge/discharge characteristics in Test Example 3, performed using nanoparticles of $LiFePO_4$ with addition of 4-mol % K prepared in Examples 5 of the present invention.

FIG. 30 is a graph showing a discharge capacity of the battery with a varying discharge rate, obtained when a battery test was carried out in the same manner as above, using the 4-mol % Na-added $LiFe_{0.98}PO_4$ nanopowder. As shown in FIG. 30, the battery cell exhibited a high capacity of about 155 mAh/g corresponding to substantially the theoretical capacity, at a low discharge rate of approximately 0.2 C and maintained an excellent discharge capacity of more than 80 mAh/g particularly even at a rapid discharge rate of approximately 20 C. Upon calculation of a power density from the results at a discharge rate of approximately 20 C on the basis of a lithium metal anode, it was confirmed that the battery cell exhibits a very high output power of more than 9,900 W/kg.

Accordingly, the present Test Example 4 demonstrates that the crystal particles of lithium transition metal phosphate prepared in the present invention can be employed as a lithium battery cathode material capable of realizing excellent energy density and power density.

As illustrated above, it can be seen that the method of preparing nanoparticles of lithium transition metal phosphates according to the present invention enables easy and convenient production of nanoparticles of lithium transition metal phosphate having a uniform particle size of less than 100 nm at a low temperature of less than 600° C. within a short period of time of less than 5 hours, via a simple solid-state synthesis.

Further, through lithium transition metal phosphates and a method of preparing the same according to the present invention, the arrangement of the cation anti-site defects inside the crystal lattice of lithium transition metal phosphate may be 1-dimensionally controlled using a relatively simple solid-state synthesis. In particular, crystal defects may be easily controlled at the atomic level without any expensive equipment. Because a method of controlling a synthesis using inexpensive solid salts without performing any complicated process is performed, it has advantage that mass production is possible. Further, crystal particles of the lithium transition metal phosphate thus-prepared exhibit electrochemically excellent Li intercalation performance because the migration of Li ions is not inhibited upon Li intercalation reaction due to a specific defect arrangement in the crystal lattice. When such particles are used as a cathode material for lithium-ion secondary batteries, the particles can have a high energy density due to improved discharge capacity, and enables preparation of batteries showing a very high output density based on charge/discharge performance for a short period of time.

Although the method of preparing nanoparticles of lithium transition metal phosphates, lithium transition metal phosphates, and method of preparing the same have been described with reference to the accompanying drawings and specific embodiments, they are not limited thereto. Therefore, it will be readily understood by those skilled in the art that various modifications and changes can be made thereto without departing from the spirit and scope of the present invention defined by the appended claims.

What is claimed is:

1. A method of preparing lithium transition metal phosphate, the method comprising,
   adding an alkali element, as an additive, to a solid salt comprising lithium, transition metals, and phosphorus as a starting material to produce a first intermediate material;
   subjecting the first intermediate to a first heat treatment at a temperature of approximately 250° C. to approximately 400° C. to produce a second amorphous material; and
   cooling the second intermediate material to room temperature, followed by a second heat treatment at a temperature of approximately 400° C. to approximately 800° C. to produce a final material in which cation-distribution defects are locally clustered and a distribution of the defects has a 1D-oriented arrangement parallel to any one axis direction in a crystal of lithium transition metal phosphate.

2. The method of claim 1, wherein the alkali element is sodium (Na) or potassium (K).

3. The method of claim 1, wherein the starting material is any one selected from the group consisting of carbonates, oxalates, acetates, ammonium phosphates and any combination thereof.

4. The method of claim 3, wherein the carbonate is lithium carbonate ($Li_2CO_3$), the oxalate is $MC_2O_4(2H_2O)$ (M=Fe, Mn, Co, Ni, Ti, Cu or any combination thereof), the acetate is $M(CO_2CH_3)_2$ (M=Fe, Mn, Co, Ni, Ti, Cu or any combination thereof), and the ammonium phosphate is ammonium dihydrogen phosphate ($NH_4H_2PO_4$).

5. The method of claim 1, wherein the alkali element is added to the starting material in an amount of greater than 0 mol % and approximately 5 mol % or less.

6. The method of claim 1, wherein the first intermediate material has a stoichiometric composition of $(Li_{1-x}A_x)(M_{1-y}B_y)PO_4$ or $(LiA_x)(MB_y)PO_4$ (A or B=Na, K or any combination thereof, M=Fe, Mn, Co, Ni, Ti, Cu, or any combination thereof, and $0<x\leqq0.05$, and $0<y\leqq0.05$).

7. The method of claim 1, wherein the first and second heat treatments are carried out under a gas atmosphere of any one selected from argon (Ar), nitrogen (N2), and carbon monoxide/carbon dioxide ($CO/CO_2$) at a flow rate of approximately 100 to approximately 500 cc/min.

8. The method of claim 1, wherein an additive for Na comprises sodium carbonate ($Na_2CO_3$), and an additive for K comprises potassium carbonate ($K_2CO_3$).

9. The method of claim 1, wherein the first and second heat treatments are carried out for approximately 1 to approximately 10 hours.

10. The method of claim 1, wherein the second heat treatment is carried out at a temperature of approximately 400° C. to approximately 800° C. for approximately 2 to approximately 10 hours.

11. The method of claim 1, wherein the producing of the final material comprises crystallizing the second intermediate material from the amorphous state into a metastable intermediate phase.

12. A lithium transition metal phosphate, comprising:
an alkali element, as an additive, where anti-site defects between lithium and a transition metal are locally clustered in a crystal of the lithium transition metal phosphate and a distribution of the defects has a 1D-oriented arrangement parallel to any one axis direction in the crystal.

13. The phosphate of claim 12, wherein any one axis is crystallograpically the b-axis.

14. The phosphate of claim 12, wherein the alkali element is added in an amount of greater than 0 mol % and approximately 5 mol % or less.

15. The phosphate of claim 12, wherein a crystal structure of the crystal is an olivine structure.

16. The phosphate of claim 12, where the alkali element comprises at least one of Na and K.

* * * * *